(12) United States Patent
Shin et al.

(10) Patent No.: US 11,503,579 B2
(45) Date of Patent: Nov. 15, 2022

(54) METHOD FOR TRANSMITTING AND RECEIVING DATA IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Seunggye Hwang, Seoul (KR); Seonwook Kim, Seoul (KR); Changhwan Park, Seoul (KR); Hanjun Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 17/050,701

(22) PCT Filed: Apr. 26, 2019

(86) PCT No.: PCT/KR2019/005106
§ 371 (c)(1),
(2) Date: Oct. 26, 2020

(87) PCT Pub. No.: WO2019/209082
PCT Pub. Date: Oct. 31, 2019

(65) Prior Publication Data
US 2021/0243731 A1  Aug. 5, 2021

(30) Foreign Application Priority Data

Apr. 26, 2018  (KR) .................. 10-2018-0048716
Jul. 27, 2018   (KR) .................. 10-2018-0088185
(Continued)

(51) Int. Cl.
*H04W 72/04*  (2009.01)
*H04W 72/12*  (2009.01)

(52) U.S. Cl.
CPC ..... *H04W 72/042* (2013.01); *H04W 72/1289* (2013.01)

(58) Field of Classification Search
CPC .................. H04W 72/1289; H04W 72/042
(Continued)

(56) References Cited

U.S. PATENT DOCUMENTS

2011/0205988 A1   8/2011   Zhang et al.
2016/0353420 A1  12/2016   You et al.
(Continued)

FOREIGN PATENT DOCUMENTS

KR    20180018989       2/2018
WO    WO2018059562      4/2018
WO    WO-2019160476 A1 * 8/2019 ............ H04W 4/06

OTHER PUBLICATIONS

CATR, "Discussion on the remaining details of time domain allocation," R1-1800763, 3GPP TSG RAN WG1 Meeting AH 1801, Vancouver, Canada, Jan. 22-26, 2018, 3 pages.
(Continued)

*Primary Examiner* — Peter G Solinsky
(74) *Attorney, Agent, or Firm* — Fish & Richardson P.C.

(57) ABSTRACT

The present disclosure provides a method for a terminal to receive a physical downlink shared channel (PDSCH) in a wireless communication system supporting a narrow band-internet of things (NB-IoT). Specifically, the terminal receives a first physical downlink control channel (PDCCH) including first downlink control information (DCI) from a base station and receives a first PDSCH on the basis of the first DCI. Here, the first PDSCH may include indication information indicating whether a multi transport block is scheduled. The terminal receives a plurality of PDSCHs from the base station, wherein at least one PDSCH of the
(Continued)

plurality of PDSCHs may be received without receiving a separate DCI according to the indication information.

20 Claims, 24 Drawing Sheets

(30) Foreign Application Priority Data

Sep. 21, 2018 (KR) .......................... 10-2018-0114474
Nov. 2, 2018 (KR) .......................... 10-2018-0133979

(58) Field of Classification Search
USPC ......................................................... 370/329
See application file for complete search history.

(56) References Cited

U.S. PATENT DOCUMENTS

2018/0048985 A1   2/2018  Park et al.
2018/0077690 A1   3/2018  Park et al.

OTHER PUBLICATIONS

Huawei, HiSilicon, "Remaining issues on resource allocation and TBS," R1-1803709, 3GPP TSG RAN WG1 Meeting #92bis, Sanya, China, Apr. 16-20, 2018, 9 pages.

Nokia, Nokia Shanghai Bell, "On blind/HARQ-less PDSCH repetition," R1-1804587, 3GPP TSG-RAN WG1 Meeting #92bis, Sanya, P.R. China, Apr. 16-20, 2018, 6 pages.

PCT International Search Report in International Appln. No. PCT/KR2019/005106, dated Aug. 23, 2020, 9 pages (with English translation).

Extended European Search Report in European Appln. No. 19793737.8, dated Dec. 22, 2021, 7 pages.

Huawei et al., "Consideration on simultaneous multi-TB transmission," 3GPP TSG-RAN WG2 NR Ad Hoc, R2-1706458, Qingdao, China, Jun. 27-29, 2017, 3 pages.

Office Action in Korean Application No. 10-2020-7031820, dated Sep. 19, 2022, 5 pages (with English translation).

Sierra Wireless, "NB-IOT Multiple Transport Block Grant Design," 3GPP TSG RAN WG1 Meeting #94bis, R1-1810488, Chengdu, China, Oct. 8-12, 2018, 4 pages.

ZTE, "Consideration on scheduling enhancement for NB-IoT," 3GPP TSG RAN WG1 Meeting #94bis, R1-1810510, Chengdu, China, Oct. 8-12, 2018, 8 pages.

ZTE, "Summary on Multiple TB scheduling enhancement for NB-IoT," 3GPP TSG RAN WG1 Meeting #94bis, R1-1811660, Chengdu, China, Oct. 8-12, 2018, 8 pages.

* cited by examiner (a)

(b)

METHOD FOR TRANSMITTING AND RECEIVING DATA IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2019/005106, filed on Apr. 26, 2019, which claims the benefit of Korean Application No. 10-2018-0133979, filed on Nov. 2, 2018, Korean Application No. 10-2018-0114474, filed on Sep. 21, 2018, Korean Application No. 10-2018-0088185, filed on Jul. 27, 2018, and Korean Application No. 10-2018-0048716, filed on Apr. 26, 2018. The disclosures of the prior applications are incorporated by reference in their entirety.

TECHNICAL FIELD

The present disclosure relates to a method for transmitting/receiving data in a wireless communication system, and more particularly, to a method for transmitting/receiving data through scheduling of a multi transport block (TB) in a wireless communication system supporting NarrowBand-Internet of Things (NB-IoT) and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An embodiment of the present disclosure provides a method for transmitting/receiving data in a wireless communication system supporting NarrowBand-Internet of Things (NB-IoT).

Furthermore, an embodiment of the present disclosure provides a method for transmitting/receiving data through scheduling of a multi transport block in a wireless communication system supporting NarrowBand-Internet of Things (NB-IoT).

Furthermore, an embodiment of the present disclosure provides a method for transmitting/receiving a plurality of data through one DCI by transmitting scheduling information related to whether to schedule a multi transport block.

Technical problems to be solved by the disclosure are not limited by the above-mentioned technical problems, and other technical problems which are not mentioned above can be clearly understood from the following description by those skilled in the art to which the disclosure pertains.

Technical Solution

In the present disclosure, a method for receiving, by a user equipment (UE), a physical downlink shared channel (PDSCH) in a wireless communication system supporting a narrow band-Internet of things (NB-IoT) includes: receiving, from a base station, a first Physical Downlink Control Channel (PDCCH) including first Downlink Control Information (DCI); receiving a first PDSCH based on the first DCI, in which the first PDSCH includes indication information indicating whether a multi transport block is scheduled; and receiving a plurality of PDSCHs, in which at least one PDSCH of the plurality of PDSCHs is received without receiving a separate DCI according to the indication information.

Furthermore, in the present disclosure, the first DCI includes scheduling information related to reception of the plurality of PDSCHs.

Furthermore, in the present disclosure, when the indication information indicating scheduling of the multi transport block, the at least one PDSCH is received without receiving the separate DCI.

Furthermore, in the present disclosure, when the indication information does not indicate the scheduling of the multi transport block, receiving the separate DCI, and the separate DCI includes one scheduling information of the at least one PDSCH.

Furthermore, in the present disclosure, the first PDCCH is a control channel for a single cell-multicast control channel (SC-MCCH), and the first PDSCH is a shared channel for the SC-MCCH.

Furthermore, in the present disclosure, the method further includes receiving a second PDCCH for a single cell-traffic channel (SC-MTCH) and the plurality of PDSCHs is the shared channel for the SC-MTCH.

Furthermore, in the present disclosure, the second PDCCH includes a second DCI for scheduling the plurality of PDSCHs, and the plurality of PDSCHs is received based on the second DCI and the first PDSCH.

Furthermore, in the present disclosure, the first PDCCH is the control channel for the single cell-traffic channel (SC-MTCH), and the first PDSCH is the shared channel for the SC-MTCH.

Furthermore, in the present disclosure, the method further includes receiving a second PDCCH for the single cell-multicast control channel (SC-MCCH), in which the second PDCCH includes a second DCI for scheduling a second PDSCH for the SC-MCCH; and receiving the second PDSCH for the SC-MCCH based on the second DCI, in which the plurality of PDSCHs is received based on the first DCI and the first PDSCH.

Furthermore, in the present disclosure, the first PDCCH is received based on the SC-MCCH.

Furthermore, in the present disclosure, the plurality of PDSCHs includes one legacy PDSCH and at least one enhanced PDSCH, and the at least one enhanced PDSCH is a PDSCH for the UE capable of being scheduled with the multi transport block.

Furthermore, in the present disclosure, the first DCI includes scheduling information for the legacy PDSCH and the at least one enhanced PDSCH.

Furthermore, in the present disclosure, the scheduling information includes at least one of gap information indicating a subframe gap from a transmission terminating time of the legacy PDSCH up to a transmission time of the at least one enhanced PDSCH transmitted after transmission of the legacy PDSCH or delay information indicating a scheduling delay of the at least enhanced PDSCH.

Furthermore, in the present disclosure, the first DCI further includes number information indicating the number of the at least one PDSCH.

Furthermore, the present disclosure provides a method including: transmitting, to a user equipment (UE), a first Physical Downlink Control Channel (PDCCH) including first Downlink Control Information (DCI); receiving a first PDSCH based on the first DCI, in which the first PDSCH includes indication information indicating whether a multi transport block is scheduled; and repeatedly transmitting a plurality of PDSCHs to the UE according to the indication information, in which the plurality of repeatedly transmitted PDSCHs is scheduled through one DCI.

Furthermore, the present disclosure provides a UE including: a radio frequency (RF) module for transmitting and receiving a radio signal; and a processor functionally connected to the RF module, in which the processor is configured to: receive, from a base station, a first Physical Downlink Control Channel (PDCCH) including first Downlink Control Information (DCI), receive a first PDSCH based on the first DCI, in which the first PDSCH includes indication information indicating whether a multi transport block is scheduled, and receive a plurality of PDSCHs, and in which at least one PDSCH of the plurality of PDSCHs is received without receiving a separate DCI according to the indication information.

Advantageous Effects

According to an embodiment of the present disclosure, there is an effect that a plurality of physical downlink shared channels (PDSCHs) or a plurality of physical uplink shared channels (PUSCHs) can be transmitted/received through one DCI by transmitting information related to whether to schedule a multi transport block and scheduling information.

Furthermore, according to an embodiment of the present disclosure, there is an effect that when downlink control information (DCI) for scheduling the multi transport block cannot be received, the plurality of physical downlink shared channels (PDSCHs) or the plurality of physical uplink shared channels (PUSCHs) can be transmitted/received through DCI transmitted subsequently.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

MODE FOR INVENTION

Figure 1:
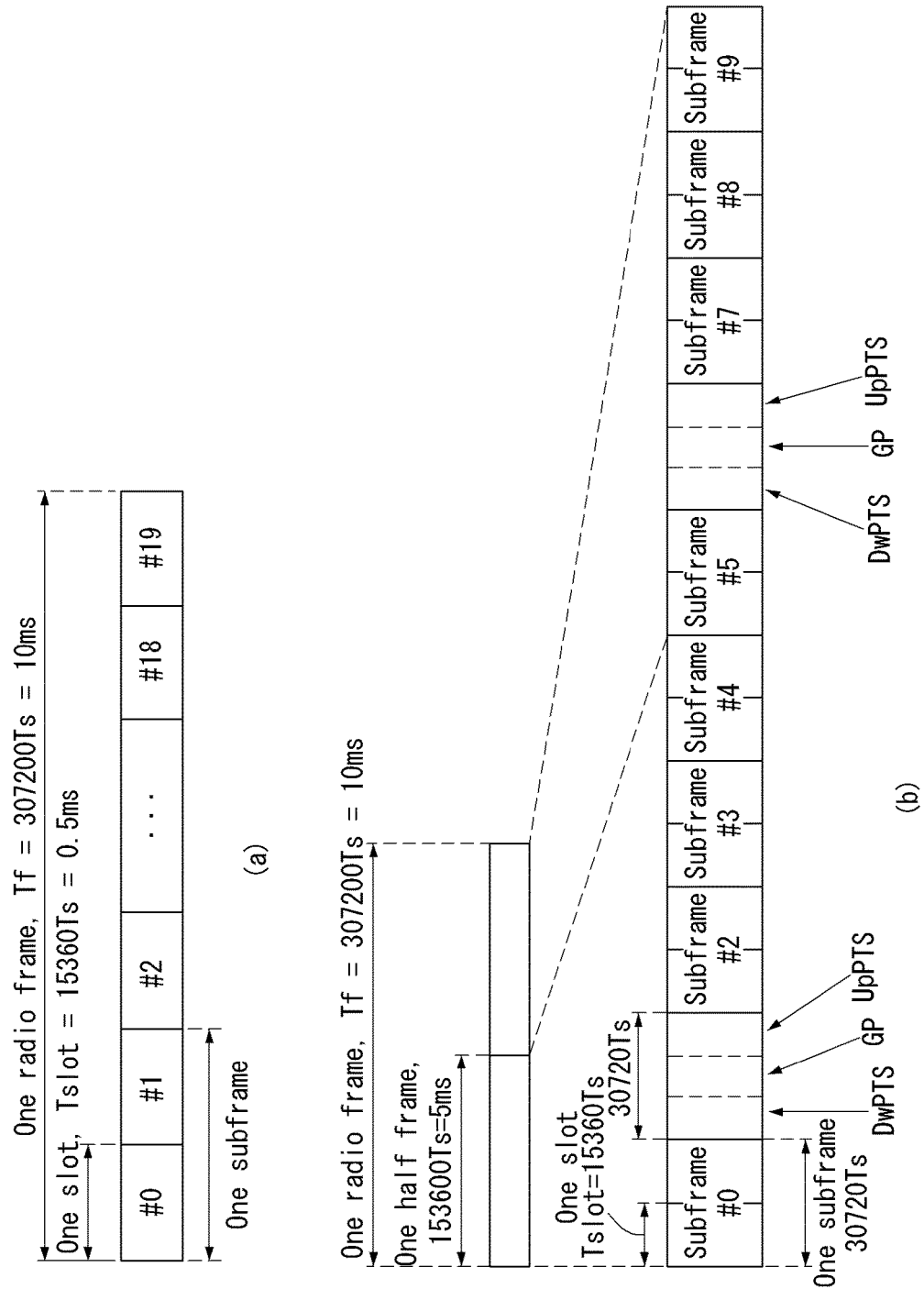
FIG. 1 illustrates the structure of a radio frame in a wireless communication system to which the present disclosure may be applied.

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure can be carried out without the details.

In some cases, in order to prevent a concept of the disclosure from being ambiguous, known structures and devices may be omitted or illustrated in a block diagram format based on core functions of each structure and device.

In the disclosure, a base station (BS) means a terminal node of a network directly performing communication with a terminal. In the disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the disclosure, and may be changed to other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

5G new radio (NR) defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5NR supports various subcarrier spacings and supports CP-OFDM on downlink and CP-OFDM and DFT-s-OFDM (SC-OFDM) on uplink.

Embodiments of the disclosure may be supported by standard documents disclosed in at least one of IEEE 802, 3GPP, and 3GPP2 which are the wireless access systems. That is, steps or parts in the embodiments of the disclosure which are not described to clearly show the technical spirit of the disclosure may be supported by the standard documents. Further, all terms described in this document may be described by the standard document.

3GPP LTE/LTE-A/New RAT (NR) is primarily described for clear description, but technical features of the disclosure are not limited thereto.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: corresponds to one subcarrier spacing in the frequency domain. Different numerologies may be defined by scaling the reference subcarrier spacing with the integer N.

NR: NR radio access or New Radio.

General System

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

Referring to FIG. 1, the size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes contiguous two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms A UL transmission and a DL transmission in the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, CD' represents a subframe for a DL transmission, 'U' represents a subframe for UL transmission, and CS' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
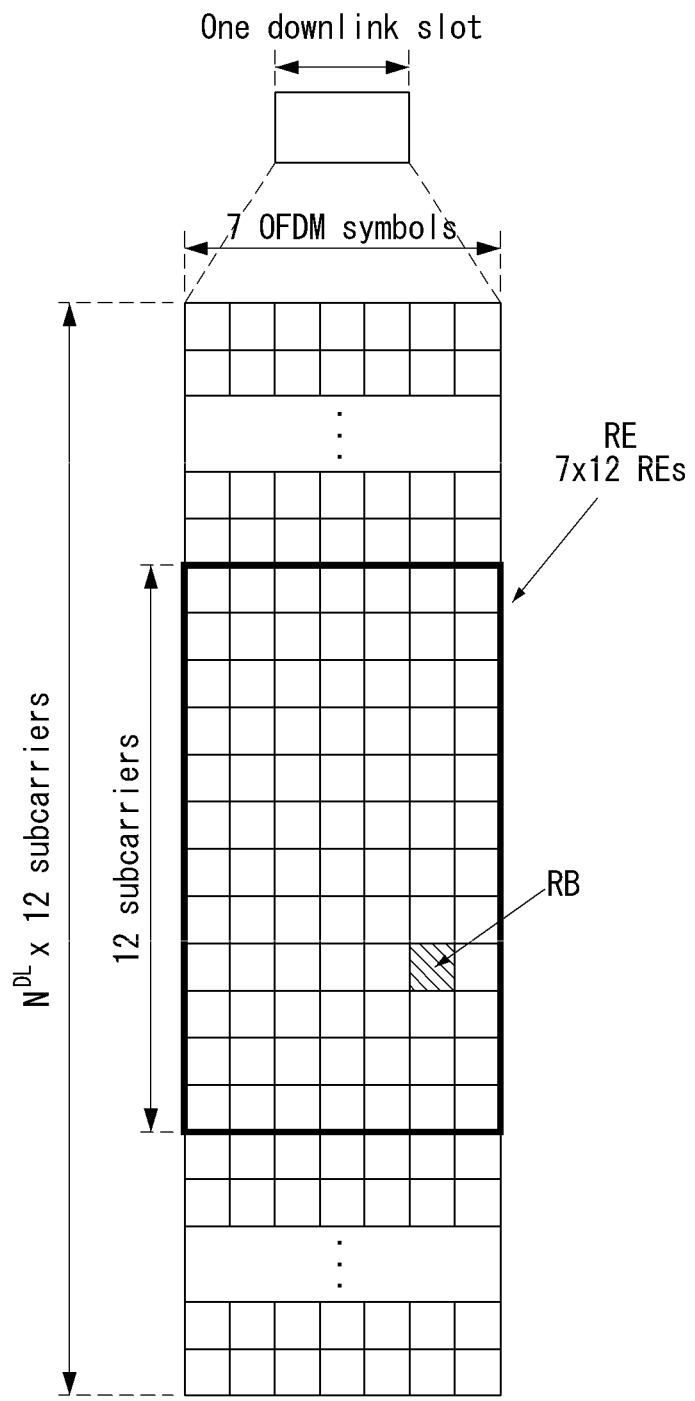
FIG. 2 is a diagram illustrating a resource grid for a downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
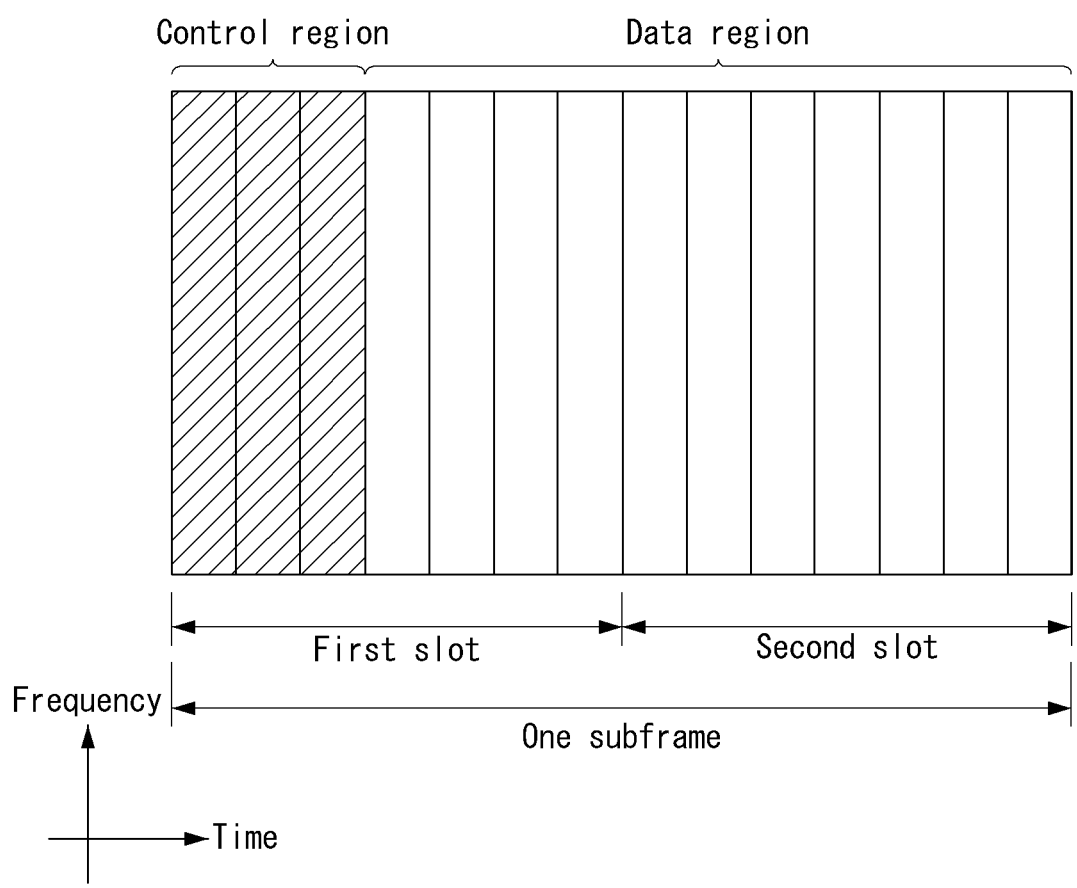
FIG. 3 illustrates a structure of downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource v and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

An enhanced PDCCH (EPDCCH) carries a UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be set in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be set in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

Figure 4:
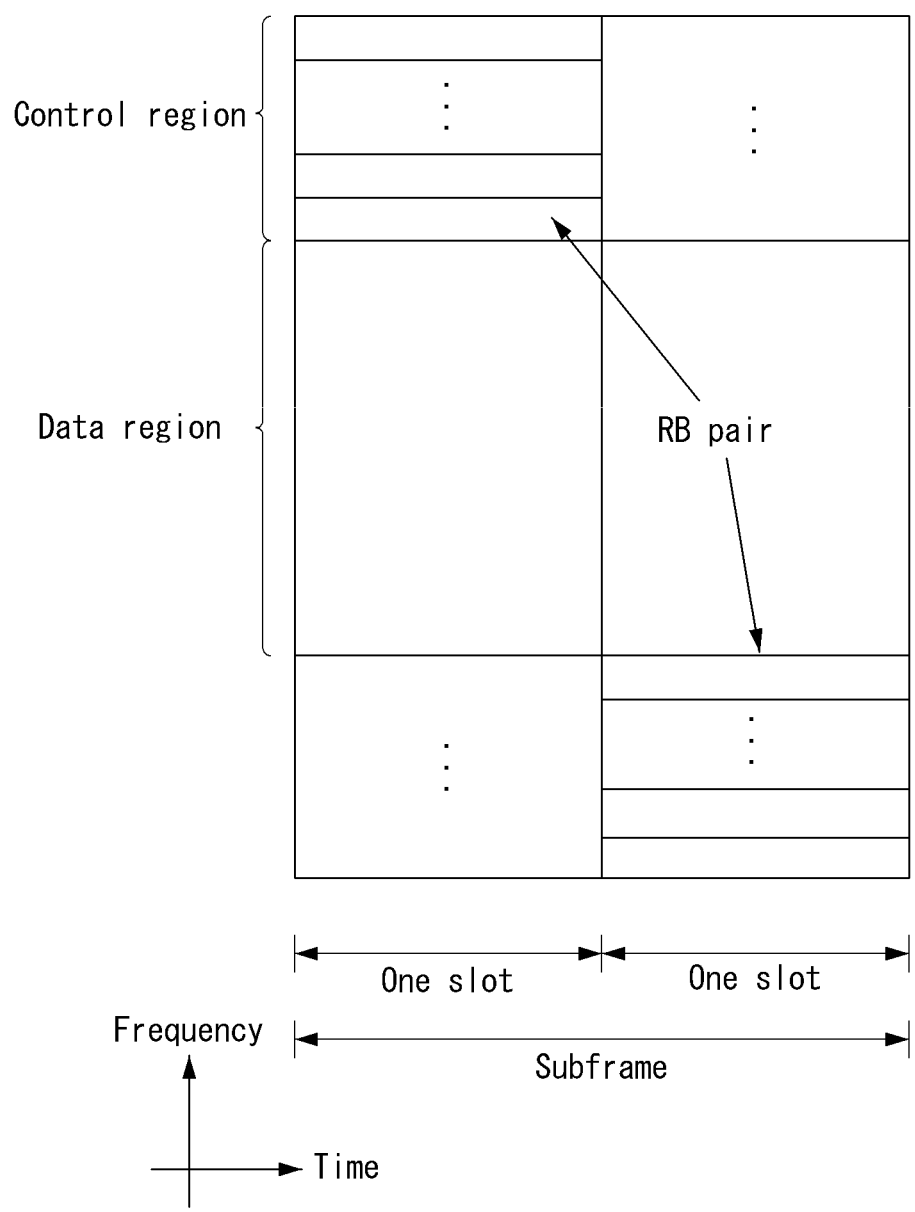
FIG. 4 illustrates a structure of uplink subframe in a wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

General Carrier Aggregation

A communication environment considered in embodiments of the present disclosure includes multi-carrier supporting environments. That is, a multi-carrier system or a carrier aggregation system used in the present disclosure means a system that aggregates and uses one or more component carriers (CCs) having a smaller bandwidth smaller than a target band at the time of configuring a target wideband in order to support a wideband.

In the present disclosure, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 5:
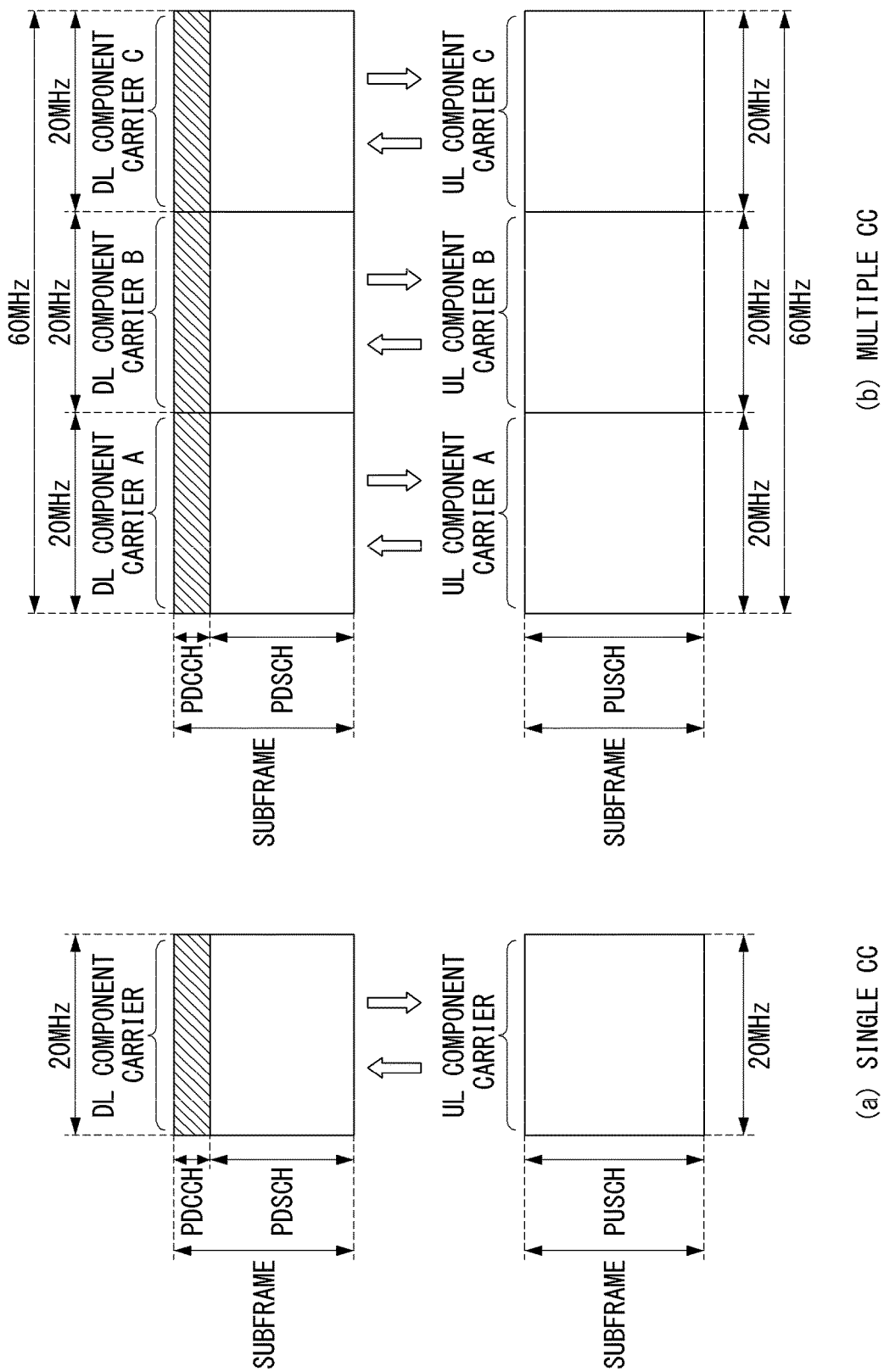
FIG. 5 illustrates examples of component carriers and carrier aggregation in a wireless communication system to which the present disclosure may be applied.

FIG. 5 illustrates examples of a component carrier and carrier aggregation in the wireless communication system to which the present disclosure can be applied.

FIG. 5(a) illustrates a single carrier structure used in an LTE system. The component carrier includes the DL CC and the UL CC. One component carrier may have a frequency range of 20 MHz.

FIG. 5(b) illustrates a carrier aggregation structure used in the LTE system. In the case of FIG. 5(b), a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 6:
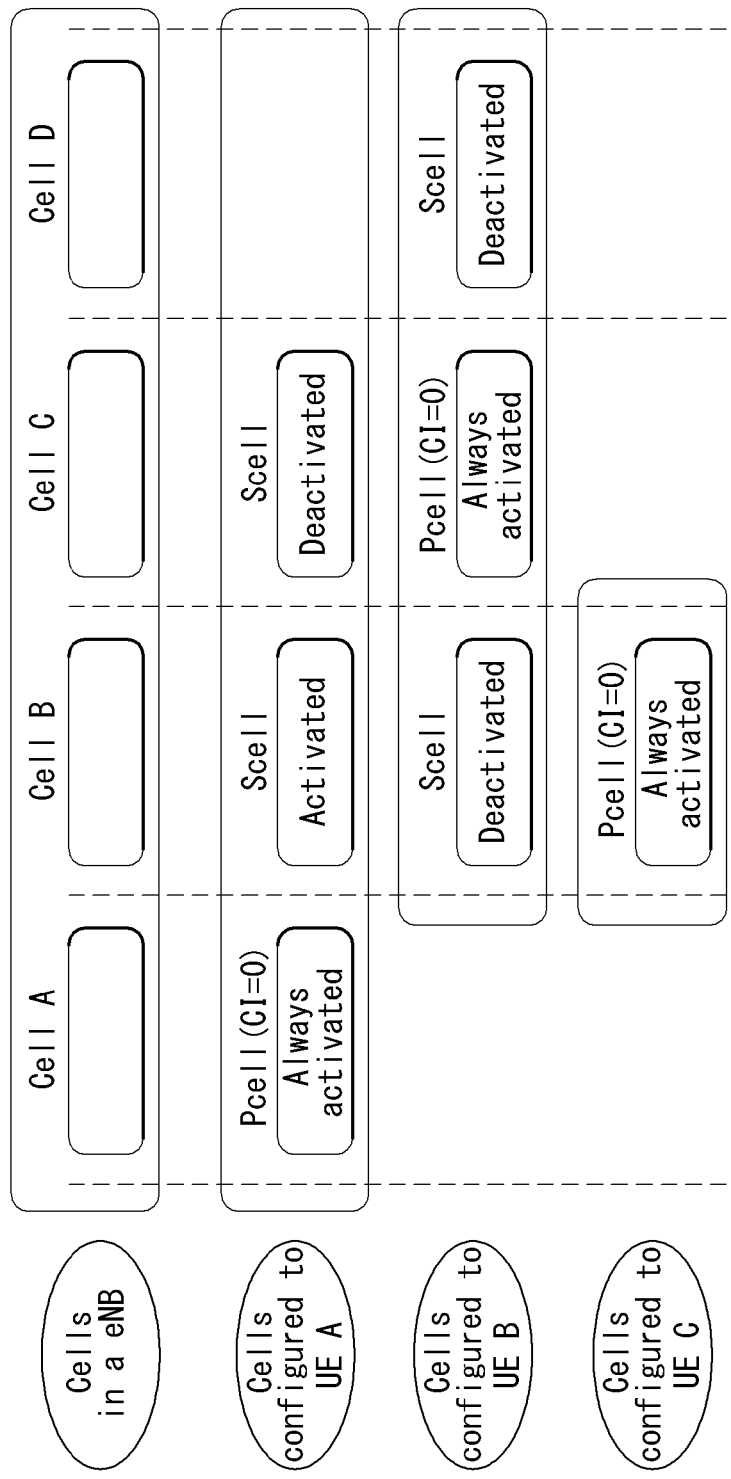
FIG. 6 is a diagram illustrating division of cells in a system that supports the carrier aggregation.

FIG. 6 is a diagram illustrating division of cells in a system that supports the carrier aggregation.

Referring to FIG. 6, a configured cell as a cell that may perform carrier aggregation based on a measurement report among cells of a base station as illustrated in FIG. 5 may be configured for each UE. The configured cell may reserve resources for ack/nack transmission for PDSCH transmission in advance. An activated cell as a cell configured to transmit a PDSCH/PUSCH among the configured cells performs Channel State Information (CSI) reporting and (Sounding Reference Signal (SRS) transmission for PDSCH/PUSCH transmission. A de-activated cell as a cell that prevents PDSCH/PUSCH transmission due to a command of the base station or a timer operation may also stop the CSI reporting and the SRS transmission.

Procedure Related to Downlink Control Channel in NB-IoT

A procedure related to a Narrowband Physical Downlink Control Channel (NPDCCH) used in an NB-IoT will be described.

The UE needs to monitor NPDCCH candidates (i.e., a set of NPDCCH candidates) according to a configuration by a higher layer signaling for control information. Here, the monitoring may imply attempting to decode each of the MPDCCHs in the set according to all monitored DCI formats. The set of the NPDCCH candidates to be monitored may be defined as an NPDCCH search space. In this case, the UE may perform monitoring by using an identifier (e.g., C-RNTI, P-RNTI, SC-RNTI, or G-RNTI) corresponding to the corresponding NPDCCH search space.

In this case, the UE needs to monitor at least one of a) Type1-NPDCCH common search space, b) Type1A-NPDCCH common search space, c) Type2-NPDCCH common search space, d) Type2-NPDCCH common search space, and e) NPDCCH UE-specific search space.

In this case, the UE need not simultaneously monitor the NPDCCH UE-specific search space and the Type1-NPDCCH common search space. Furthermore, the UE need not simultaneously monitor the NPDCCH UE-specific search space and the Type2-NPDCCH common search space. Furthermore, the UE need not simultaneously monitor the Type1-NPDCCH common search space and the Type2-NPDCCH common search space.

The UE need not monitor the Type 1A-NPDCCH common search space or the Type2A-NPDCCH common search space of the subframe of the Type 1-NPDCCH common search space monitored by the UE or the subframe receiving the NPDSCH allocated by the NPDCCH for a DCI CRC scrambled by the P-RNTI.

Furthermore, the UE need not monitor the Type 1A-NPDCCH common search space or the Type2A-NPDCCH common search space of the subframe of the Type 2-NPDCCH common search space monitored by the UE or the subframe receiving the NPDSCH allocated by the NPDCCH for the DCI CRC scrambled by the C-RNTI (or temporary C-RNTI).

Furthermore, the UE need not monitor the Type2A-NPDCCH common search space in the same subframe monitoring the Type1A-NPDCCH common search space.

Furthermore, the UE need not monitor the Type1A-NPDCCH common search space in a subframe in which the UE receives the NPDSCH allocated by the NPDCCH for the DCI CRC scrambled by the SC-RNTI.

Furthermore, the UE need not monitor the Type2A-NPDCCH common search space in a subframe in which the UE receives the NPDSCH allocated by the NPDCCH for the DCI CRC scrambled by the G-RNTI or SC-RNTI.

The NPDCCH search space in an aggregation level and a repetition level is defined by the set of the NPDCCH candidates.

In the case of the NPDCCH UE-specific search, the aggregation and repetition levels defining the corresponding search space and the corresponding monitored NPDCCH candidates may be listed as shown in Table 3 as a value of $R_{MAX}$ is substituted with a parameter npdcch-NumRepetitions configured by the higher layer.

TABLE 3

| $R_{max}$ | R | DCI subframe repetition number | NCCE indices of monitored NPDCCH candidates L' = 1 | L' = 2 |
|---|---|---|---|---|
| 1 | 1 | 00 | {0}, {1} | {0, 1} |
| 2 | 1 | 00 | {0}, {1} | {0, 1} |
|   | 2 | 01 | — | {0, 1} |
| 4 | 1 | 00 | — | {0, 1} |
|   | 2 | 01 | — | {0, 1} |
|   | 4 | 10 | — | {0, 1} |
| >=8 | $R_{max}$ / 8 | 00 | — | {0, 1} |
|   | $R_{max}$ / 4 | 01 | — | {0, 1} |
|   | $R_{max}$ / 2 | 10 | — | {0, 1} |
|   | $R_{max}$ | 11 | — | {0, 1} |

Note 1: {x}, {y} denotes NPDCCH Format 0 candidate with NCCE index 'x' and NPDCCH Format 0 candidate with NCCE index 'y' are monitored
Note 2: {x,y} denotes NPDCCH Format1 candidate corresponding to NCCEs 'x' and 'y' is monitored.

In the case of the Type1-NPDCCH common search space, the aggregation and repetition levels defining the corresponding search space and the corresponding monitored NPDCCH candidates are listed as shown in Table 4 as the value of $R_{MAX}$ is substituted with a parameter npdcch-NumRepetitionPaging for the Type 1-NPDCCH common search space or a parameter npdcch-NumRepetitions-SC-MCCH for the Type1A-NPDCCH common search space configured by the higher layer.

In the case of the Type2-NPDCCH common search space and the Type2A-NPDCCH common search space, the aggregation and repetition levels defining the corresponding search space and the corresponding monitored NPDCCH candidates are listed as shown in Table 5 as the value of $R_{MAX}$ is substituted with a parameter npdcch-NumRepetitions-RA for the Type 2-NPDCCH common search space or a parameter npdcch-NumRepetitions-SC-MTCH for the Type2A-NPDCCH common search space configured by the higher layer.

TABLE 5

| $R_{max}$ | R | DCI subframe repetition number | NCCE indices of monitored NPDCCH candidates L' = 1 | L' = 2 |
|---|---|---|---|---|
| 1 | 1 | 00 | — | {0, 1} |
| 2 | 1 | 00 | — | {0, 1} |
|   | 2 | 01 | — | {0, 1} |
| 4 | 1 | 00 | — | {0, 1} |
|   | 2 | 01 | — | {0, 1} |
|   | 4 | 10 | — | {0, 1} |
| >=8 | $R_{max}$ / 8 | 00 | — | {0, 1} |
|   | $R_{max}$ / 4 | 01 | — | {0, 1} |
|   | $R_{max}$ / 2 | 10 | — | {0, 1} |
|   | $R_{max}$ | 11 | — | {0, 1} |

Note 1:
{x, y} denotes NPDCCH Format1 candidate corresponding to NCCEs 'x' and 'y' is monitored.

In this case, the position of the starting subframe k is given by $k=k_b$. Here, $k_b$ represents a b-th consecutive NB-IoT downlink subframe from the subframe k0 except for a subframe used for transmitting an SI message, the b is u×R, and the u represents 0, 1, . . . $(R_{MAX}/R)-1$. Further, the subframe k0 represents a subframe satisfying Equation 1.

$$(10n_f+\lfloor n_s/2 \rfloor) \bmod T = |\alpha_{offset} \cdot T|, \text{ where } T = R_{max} \cdot G, T \geq 4 \quad \text{[Equation 1]}$$

In the case of the NPDCCH UE-specific search space, G shown in Equation 1 is given by a higher layer parameter nPDCCH-startSF-UESS and $\alpha_{offset}$ is given by a higher layer parameter nPDCCH-startSFoffset-UESS. Furthermore, in the case of the NPDCCH Type2-NPDCCH common search space, G shown in Equation 1 is given by a higher layer

TABLE 4

| $R_{max}$ | R |   |   |   |   |   |   | NCCE indices of monitored NPDCCH candidates L' = 1 | L' = 2 |
|---|---|---|---|---|---|---|---|---|---|
| 1 | 1 | — | — | — | — | — | — | — | {0, 1} |
| 2 | 1 | 2 | — | — | — | — | — | — | {0, 1} |
| 4 | 1 | 2 | 4 | — | — | — | — | — | {0, 1} |
| 8 | 1 | 2 | 4 | 8 | — | — | — | — | {0, 1} |
| 16 | 1 | 2 | 4 | 8 | 16 | — | — | — | {0, 1} |
| 32 | 1 | 2 | 4 | 8 | 16 | 32 | — | — | {0, 1} |
| 64 | 1 | 2 | 4 | 8 | 16 | 32 | 64 | — | {0, 1} |
| 128 | 1 | 2 | 4 | 8 | 16 | 32 | 64 | 128 | {0, 1} |
| 256 | 1 | 4 | 8 | 16 | 32 | 64 | 128 | 256 | {0, 1} |
| 512 | 1 | 4 | 16 | 32 | 64 | 128 | 256 | 512 | {0, 1} |
| 1024 | 1 | 8 | 32 | 64 | 128 | 256 | 512 | 1024 | {0, 1} |
| 2048 | 1 | 8 | 64 | 128 | 256 | 512 | 1024 | 2048 | {0, 1} |
| DCI subframe repetition number | 000 | 001 | 010 | 011 | 100 | 101 | 110 | 111 |  |

Note 1:
{x, y} denotes NPDCCH Format1 candidate corresponding to NCCEs 'x' and 'y' is monitored.

parameter npdcch-StartSF-CSS-RA and $\alpha_{offset}$ is given by a higher layer parameter npdcch-Offset-RA.

In the case of the NPDCCH Type2-NPDCCH common search space, G shown in Equation 1 is given by a higher layer parameter npdcch-startSF-SC-MTCH and $\alpha_{offset}$ is given by a higher layer parameter npdcch-Offset-SC-MTCH.

In the case of the Type1-NPDCCH common search space, k is k0 and is determined from a position of an NB-IoT paging opportunity subframe.

In the case of the Type1A-NPDCCH common search space, k is k0 and k0 is a subframe satisfying a condition of Equation 2 below.

$$(10n_f + \lfloor n_s/2 \rfloor) \mod T = \lfloor \alpha_{offset} \cdot T \rfloor, \text{ where } T = R_{max} \cdot G, T \geq 4 \quad \text{[Equation 2]}$$

In Equation 2, G is given by a higher layer parameter npdcch-StartSF-SC-MCCH and $\alpha_{offset}$ is given by a higher layer parameter npdcch-Offset-SC-MCCH.

When the UE is configured by the higher layer as a PRB for monitoring an NPDCCH UE-specific search area, the UE should monitor the NPDCCH UE-specific search space in an NB-IoT carrier configured by the higher layer. In this case, the UE does not expect that an NPSS, an NSSS, and an NPBCH are received in the corresponding NB-IoT carrier. On the contrary, when the PRB is not configured by the higher layer, the UE should monitor the NPDCCH UE-specific search space on the same NB-IoT carrier as detecting the NPSS/NSSS/NPBCH.

When the NB-IoT UE is configured by the higher layer parameter twoHARQ-ProcessesConfig, the NB-IoT UE detect an NPDCCH having DCI format N0 which is terminated in subframe n and when corresponding NPUSCH format 1 transmission starts in subframe n+k, the UE need not monitor the NPDCCH of a random subframe which starts within a range from subframe n+1 to subframe n+k−1.

When the NB-IoT UE is not configured by the higher layer parameter twoHARQ-ProcessesConfig, the NB-IoT UE detest the NPDCCH having DCI format N0 which is terminated in subframe n or receives an NPDSCH carrying a random access response grant which is terminated in subframe n and when corresponding NPUSCH format 1 transmission starts in subframe n+k, the UE need not monitor the NPDCCH of the random subframe which starts within a range from subframe n+1 to subframe n+k−1.

In the NPDCCH UE-specific search space, when the NB-IoT UE is configured for the higher layer parameter twoHARQ-ProcessesConfig, the NB-IoT UE detects an NPDCCH having DCI format N1 or N2 which is terminated in subframe n and when NPDSCH transmission starts in subframe n+k, the UE need not monitor the NPDCCH of the random subframe which starts within a range from subframe n+k−2 to subframe n+k−1.

In the NPDCCH UE-specific search space, when the NB-IoT UE is not configured for the higher layer parameter twoHARQ-ProcessesConfig, the NB-IoT UE detects the NPDCCH having DCI format N1 or N2 which is terminated in subframe n and when NPDSCH transmission starts in subframe n+k, the UE need not monitor the NPDCCH of the random subframe which starts within a range from subframe n+1 to subframe n+k−1.

When the NB-IoT UE detects the NPDCCH having DCI format N1 which is terminated in subframe n, when the corresponding NPDSCH transmission starts in subframe n+k, and when transmission of the corresponding NPUSCH format 2 starts in subframe n+m, the UE need not monitor the NPDCCH of the random subframe which starts within the range from subframe n+k up to subframe n+k−1.

When the NB-IoT UE detects the NPDCCH having DCI format N1 for "PUCCH order" which is terminated in subframe n and when transmission of the corresponding NPRACH starts in subframe n+k, the UE need not monitor the NPDCCH of the random subframe which starts within the range from subframe n+1 up to subframe n+k−1.

When the NB-IoT UE is configured for the higher layer parameter twoHARQ-ProcessesConfig and when the UE has NPUSCH transmission which is terminated in subframe n, the UE need not receive any transmission in subframe n+1.

When the NB-IoT UE is not configured for the higher layer parameter twoHARQ-ProcessesConfig and when the UE has NPUSCH transmission which is terminated in subframe n, the UE need not receive the NPDCCH of any subframe which starts within a range from subframe n+1 up to subframe n+3.

When the NB-IoT UE receives the NPDSCH which is terminated in subframe n and need not monitor the corresponding NPUSCH format 2, the UE need not monitor the NPDCCH of any subframe which starts within a range from subframe n+1 up to subframe n+12.

When the NB-IoT UE is configured for the higher layer parameter twoHARQ-ProcessesConfig, the UE need not monitor an NPDCCH candidate of the NPDCCH search space when the candidate is terminated in subframe n and the UE is configured to monitor the NPDCCH candidate of another NPDCCH search space having start subframe k0 before subframe n+5.

When the NB-IoT UE is not configured for the higher layer parameter twoHARQ-ProcessesConfig, the UE need not monitor the NPDCCH candidate of the NPDCCH search space when the NPDCCH candidate of the NPDCCH search space is terminated in subframe n and the UE is configured to monitor the NPDCCH candidates of yet another NPDCCH search space having start subframe k0 before subframe n+5.

The UE need not monitor the NPDCCH candidates of the NPDCCH search space during an NPUSCH UL gap.

In connection with an NPDCCH starting position, a starting OFDM symbol for the NPDCCH is given by an index $I_{NPDCCHStart}$ in a first slot of subframe k.

When there is a higher layer parameter eutraControlRegionSize, the index $I_{NPDCCHStart}$ is given by the higher layer parameter eutraControlRegionSize. Unlike this, when the higher layer parameter eutraControlRegionSize is not present, the index $I_{NPDCCHStart}$ is 0.

When consistent control information is not searched, the UE discards the NPDCCH.

Downlink control information (DCI) format

Format 0B

DCI format 0B may be used for scheduling the PUSCH in each of multiple subframes of Licensed-Assisted Access (LLA) SCell and may transmit the following information.

Carrier indicator (e.g., 0 or 3 bits)

PUSCH trigger A: A value of 0 indicates non-triggered scheduling and a value of 1 indicates triggered scheduling (e.g., 1 bit).

Timing offset (e.g., 4 bits): When PUSCH trigger A is 0, a timing offset field indicates an absolute timing offset for PUSCH transmission and if not, first two bits of the field indicate a timing offset for UL offset l and last two bits indicate that scheduling of the PUSCH through triggered scheduling is valid or a time window.

Number of scheduled subframes (e.g., 1 or 2 bits): When maxNumberOfSchedSubframes-Format0B-r14 is constituted by two by the higher layer, a 1-bit field is applied and if not, a 2-bit field is applied.

Table 6 below shows an example in which a bit value of a field of the number of scheduled subframes is determined.

TABLE 6 maxNumberOfSchedSubframes-Format0B-r14   ENUMERATED {sf2, sf3, sf4}
Max SF2 → 1 bit (SF1 or SF2)
Max SF3 → 2 bits (SF1 or SF2 or SF3 or reserved)
Max SF4 → 2 bits (SF1 or SF2 or SF3 or SF4)

Resource block assignment: 5 or 6 bits provide resource assignment in a UL subframe.
Modulation and coding scheme (e.g., 5 bits)
HARQ process number (e.g., 4 bits): 4 bits are applied to a first scheduled subframe.

Table 7 below shows an example of an HARQ process number.

TABLE 7

HARQ process ID$^{mod\ (nHARQ\_ID+i\cdot NHARQ)}$, $i = 0, 1, \ldots, N - 1$, N from Number of scheduled subframes, $N_{HARQ} = 16$;

New data indicator: maxNumberOfSchedSubframes-Format0B-r14 bits. Each scheduled PUSCH corresponds to 1 bit.
Redundancy version: maxNumberOfSchedSubframes-Format0B-r14 bits. Each scheduled PUSCH corresponds to 1 bit.

Table 8 below shows an example of the redundancy version.

TABLE 8

For a LAA SCell and DCI format 0B/4B, the redundancy version ($rv_{idx}$) to use in the physical uplink shared channel is given by $rv_{idx} = 2 \cdot rv$. → $rv_{idx}$ is 0 or 2

TPC command for scheduled PUSCH (e.g., 2 bits)
Cyclic shift for DM RS and OCC index (e.g., 3 bits)
CSI request: 1, 2, or 3 bits. A 2-bit field is applied to UE constituted by 5 or less DL cells, UEs constituted for one or more DL cells and mapped to a UE specific search space in which a corresponding DCI format is given by the C-RNTI, UE constituted by higher layers having one or more CSI processes and mapped to the UE specific search space in which the corresponding DCI format is given by the C-RNTI, and UEs constituted by two CSI measurement sets by a higher layer having a parameter csi-MeasSubframeSet and mapped to the UE specific search space in which the corresponding DCI format is given by the C-RNTI.
A 3-bit field is applied to UEs constituted for 5 or more DL cells and mapped to the UE specific search space in which the DCI format therefor is given by the C-RNTI.
Otherwise, a 1-bit field is applied.
SRS request (e.g., 2 bits)
PUSCH starting position (e.g., 2 bits)
PUSCH terminating symbol (e.g., 1 bit): The value of 0 indicates a last symbol of a last scheduled subframe and the value of 1 indicates a last second symbol of the last scheduled subframe.
Channel access type (e.g., 1 bit)
Channel access priority class (e.g., 2 bits)
When an information bit number of format 0B is the same as a payload size of DCI format 1, 2, 2A, 2B, 2C, or 2D associated with a DL transmission mode configured in the same serving cell, one 0 bit is added to format 0B.

RNTI Values

Table 9 shows an example of RNTI values and Table 10 shows an example of use of the RNTI values, and a transmission channel and a logical channel related thereto.

TABLE 9

| Value (hexa-decimal) | RNTI |
|---|---|
| 0000 | N/A |
| 0001-0960 | RA-RNTI, C-RNTI, Semi-Persistent Scheduling C-RNTI, Temporary C-RNTI, eIMTA-RNTI, TPC-PUCCH-RNTI, TPC-PUSCH-RNTI, SL-RNTI (see note), G-RNTI, SL-V-RNTI, UL Semi-Persistent Scheduling V-RNTI, SL Semi-Persistent Scheduling V-RNTI, and SRS-TPC-RNTI |
| 0961-FFF3 | C-RNTI, Semi-Persistent Scheduling C-RNTI, eIMTA-RNTI, Temporary C-RNTI, TPC-PUCCH-RNTI, TPC-PUSCH-RNTI, SL-RNTI, G-RNTI, SL-V-RNTI, UL Semi-Persistent Scheduling V-RNTI, SL Semi-Persistent Scheduling V-RNTI, and SRS-TPC-RNTI |
| FFF4-FFF8 | Reserved for future use |
| FFF9 | SI-RNTI |
| FFFA | SC-N-RNTI |
| FFFB | SC-RNTI |
| FFFC | CC-RNTI |
| FFFD | M-RNTI |
| FFFE | P-RNTI |
| FFFF | SI-RNTI |

TABLE 10

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH, BR-BCCH |
| M-RNTI | MCCH Information change notification | N/A | N/A |
| RA-RNTI | Random Access Response | DL-SCH | N/A |
| eIMTA-RNTI | eIMTA TDD UL/DL configuration notification | N/A | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |
| SL-RNTI | Dynamically scheduled sidelink transmission for sidelink communication | SL-SCH | STCH |

TABLE 10-continued

| RNTI | Usage | Transport Channel | Logical Channel |
|---|---|---|---|
| SC-RNTI | Dynamically scheduled SC-PTM control information | DL-SCH | SC-MCCH |
| G-RNTI | Dynamically scheduled SC-PTM transmission | DL-SCH | SC-MTCH |
| SC-N-RNTI | SC-MCCH Information change notification | N/A | N/A |
| CC-RNTI | Providing common control PDCCH information | N/A | N/A |
| SL-V-RNTI | Dynamically scheduled sidelink transmission for V2X sidelink communication | SL-SCH | STCH |
| UL Semi-Persistent Scheduling V-RNTI | Semi-Persistently scheduled uplink transmission for V2X communication (activation, reactivation and retransmission) | UL-SCH | DCCH, DTCH |
| SL Semi-Persistent Scheduling V-RNTI | Semi-Persistently scheduled sidelink transmission for V2X sidelink communication (activation, reactivation and retransmission) | SL-SCH | STCH |
| SRS-TPC-RNTI | SRS and TPC for the PUSCH-less SCells | N/A | N/A |

As described above, Narrowband (NB)-LTE refers to a system for supporting low complexity and low power consumption with a system bandwidth (system BW) corresponding to 1 Physical Resource Block (PRB) of the LTE system.

That is, the NB-LTE system may be primarily used as a communication mode for implementing the internet of things (IoT) by supporting a device (or UE) such as machine-type communication (MTC) in a cellular system. That is, the NB-LTE system may also be referred to as NB-IoT.

Further, the NB-IoT system does not need to allocate an additional band for the NB-IoT system by using the same OFDM parameters such as the subcarrier spacing used in the old LTE system, as the LTE system. In this case, 1 PRB of the legacy LTE system band is allocated for the NB-IoT, which is advantageous in using the frequency efficiently.

The physical channel of the NB-IoT system may be defined as N-Primary Synchronization Signal (N-PSS), N-Secondary Synchronization Signal (N-SSS), N-Physical Channel (N-PBCH), N-PDCCH/N-EPDCCH, N-PDSCH, or the like in the case of downlink. Here, 'N-' may be used for distinguishing from the legacy LTE.

Furthermore, the control channel used in (e)MTC may be defined as MPDCCH.

In the present disclosure, the legacy UE and the enhanced UE may be defined as follows.

Legacy UE: One transport block (TB) may be scheduled by one DCI. A DCI format for multi-TB scheduling may not be recognized.

Enhanced UE: The multi-TB may be scheduled through one DCI, the DCI format for scheduling the multi-TB may also be recognized.

In the present disclosure, monitoring the search space in the present disclosure may mean a process in which decoding the N-PDCCH of a specific area according to the DCI format to be received through the search space, and scrambling the corresponding CRC with a predetermined specific RNTI value then, checking whether it matches (i.e., coincides with) a desired value.

In addition, in the case of the NB-IoT system, since each UE recognizes a single PRB as each carrier, the PRB referred to herein may be interpreted as the same meaning as the carrier.

In addition, DCI format N0, DCI format N1, and DCI format N2 referred to herein may refer to DCI format N0, DCI format N1, and DCI format N2 described above (e.g., defined in the 3GPP specification).

Further, the embodiments proposed by the present disclosure is described based on a relationship between the radio frame and the subframe, but this may be similarly applied even to a relationship between the frame and the subframe in a next-generation wireless communication system (e.g., NR system), of course. That is, the radio frame in the present disclosure may mean the frame.

Furthermore, in the embodiments proposed in the present disclosure, mapping data and/or information to the resource (or resource allocation for the data and/or the information) may be configured in units of slots constituting the subframe in addition to the unit of the subframe. As an example, SIB1-NB may be mapped in units of slot in the subframe. Here, the number of OFDM symbols constituting the slot and the number of slots per frame and/or subframe may be configured differently according to numerology and/or a cyclic prefix (CP) length.

In the LTE LAA of the old NB-IoT system (e.g., NB-IoT system of Release 14), only multi subframe scheduling for PUSCH transmission is introduced. Referring to DCI format 0B, the eNB may indicate a total number of subframes to be scheduled through the corresponding DCI and this may be determined based on a value of a parameter maxNumberOfSchedSubframes-Format0B-r14 transmitted through RRC signaling.

Further, one HARQ process number may be notified through the field of the HARQ process number and the HARQ process number may be determined in ascending order according to the total number of subframes to be scheduled.

A new data indicator and a redundancy version may be delivered by using 1 bit for each subframe and other MCS/resource allocation/timing offset, etc., may be commonly applied.

In the old NB-IoT system, only a single HARQ process is first used, but thereafter, two HARQ processes are introduced. In this case, an HARQ process number may indicate how many different information the UE may store in a buffer of the UE until retransmission/reception is completed from initial transmission/reception.

That is, when a single HARQ process UE receives the DCI once and receives a DL grant or UL grant, the single HARQ process UE may not perform an operation for a next DL grant or UL grant until all retransmission of the corresponding HARQ process ID is completed.

Accordingly, the UE does not perform a UE specific search space monitoring operation until all retransmission for the corresponding HARQ process ID is completed. However, two HARQ process UEs may process two different DL grants or UL grants.

Hereinafter, in the present disclosure, single HARQ and two HARQ will be separately described and the present disclosure will be described based on multi subframe scheduling introduced in LTE LAA.

In the legacy NB-IoT, since a single TB is designed to be repeatedly transmitted to multiple subframes, the method described in the present disclosure is expressed as multi TB scheduling.

Figure 7:
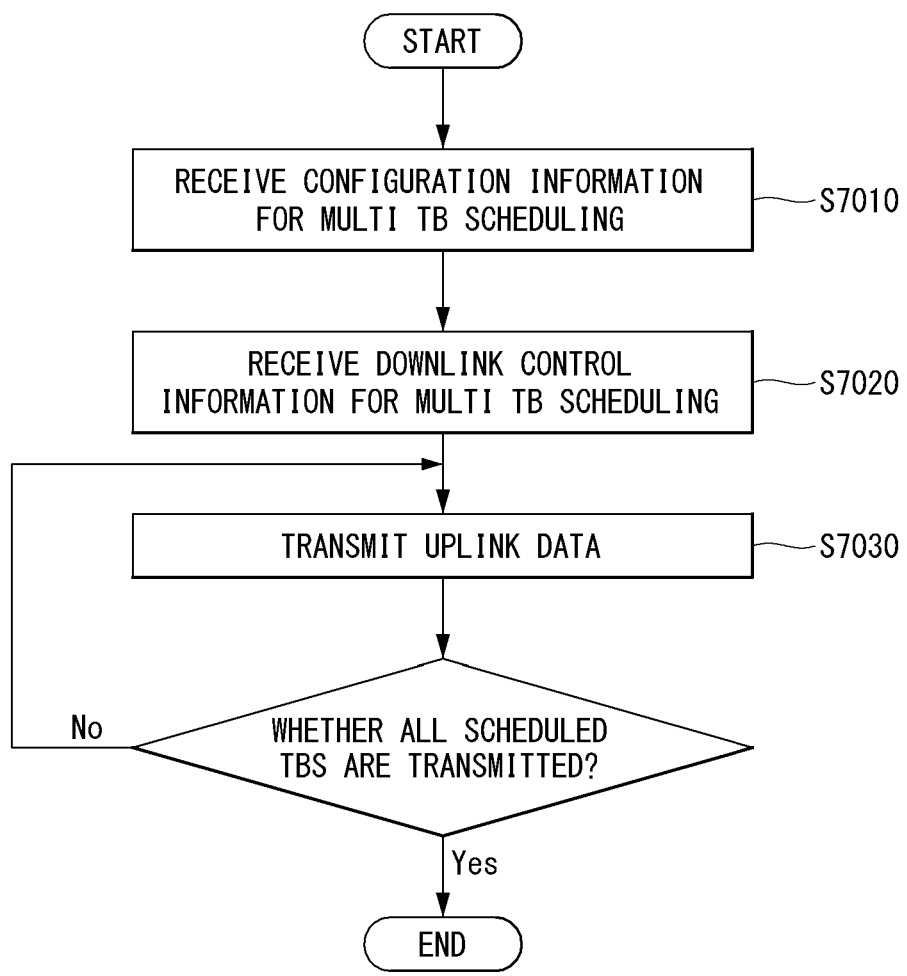
FIG. 7 and FIG. 8 are flowcharts illustrating an example of a UE operation of performing multi TB scheduling of one or more physical channels/signals to which a method proposed in the present disclosure may be applied.
Figure 8:
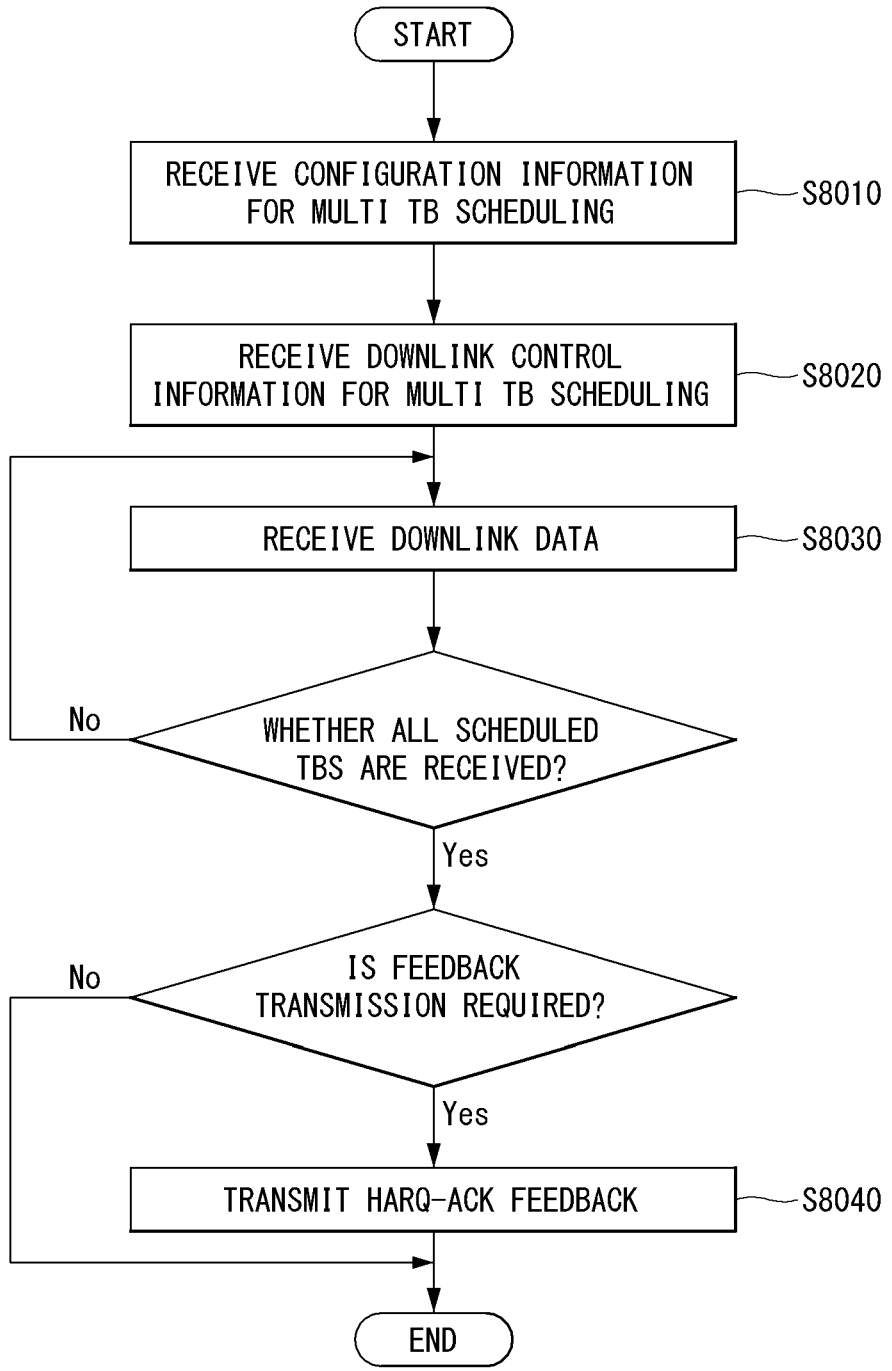

FIGS. 7 and 8 are flowcharts illustrating an example of a UE operation of performing multi TB scheduling of one or more physical channels/signals to which a method proposed in the present disclosure may be applied.

FIG. 7 illustrates an example of uplink transmission of the UE and FIG. 8 illustrates an example of downlink reception of the UE.

Referring to FIG. 7, the UE may receive configuration information for multi TB scheduling in order to transmit uplink data to the eNB (S7010) and receive DCI for multi TB scheduling based on the configuration information (S7020).

Thereafter, the DCI may include scheduling information for transmitting the uplink data to the eNB.

Thereafter, the UE may transmit the uplink data based on a scheduled TB to the eNB based on the received DCI (S7030).

In this case, the UE may continuously transmit the uplink data to the eNB until all scheduled TBs are transmitted.

FIG. 8 illustrates an example of downlink reception of the UE.

The UE may receive the configuration information for the multi TB scheduling in order to receive downlink data from the eNB (S8010) and receive the DCI for the multi TB scheduling based on the configuration information (S8020).

Thereafter, the UE may receive the downlink data based on the scheduled TB from the eNB based on the received DCI (S8030).

In this case, the UE may continuously receive the downlink data from the eNB until all scheduled TBs are received.

When all scheduled TBs are received, the UE may transmit an HARQ-Ack feedback to the eNB according to whether feedback of the received TB is required (S8040).

Figure 9:
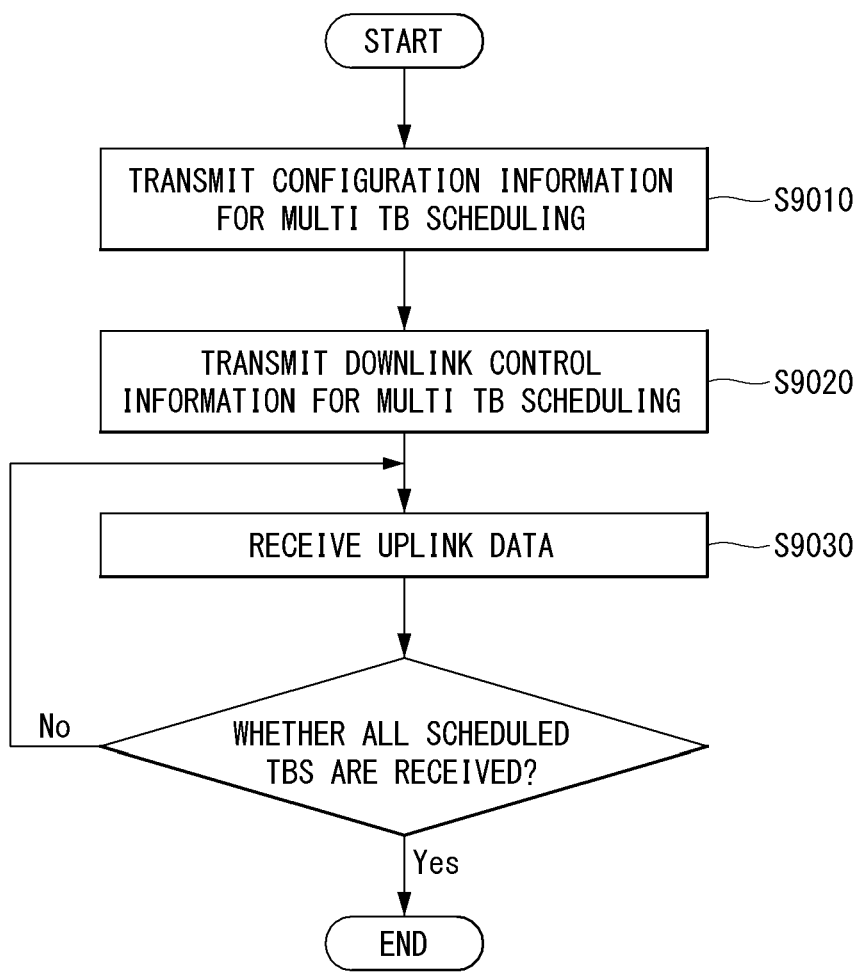
FIG. 9 and FIG. 10 are flowcharts illustrating an example of a BS operation of performing multi TB scheduling of one or more physical channels/signals to which a method proposed in the present disclosure may be applied.
Figure 10:
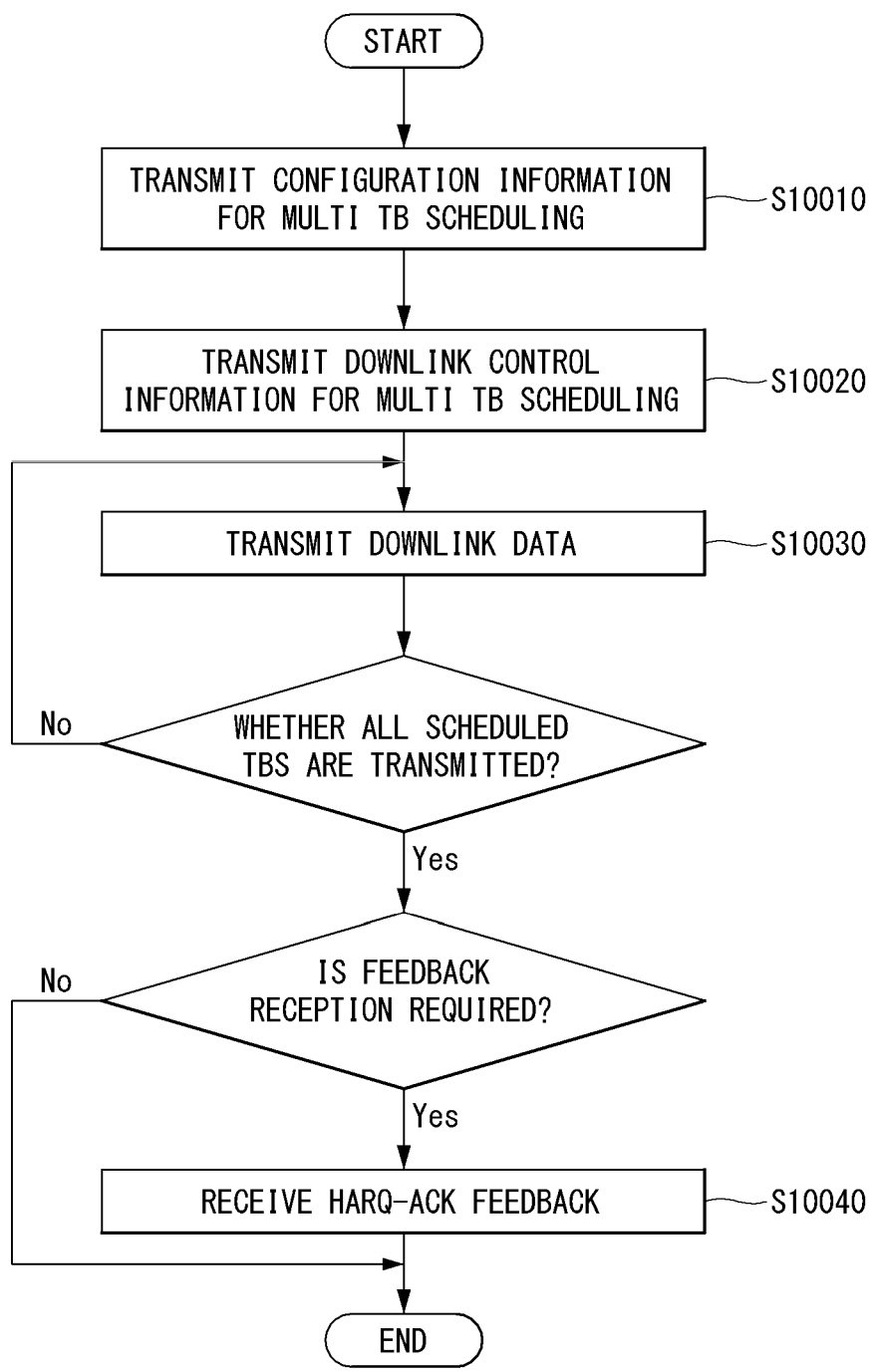

FIGS. 9 and 10 are flowcharts illustrating an example of a eNB operation of performing multi TB scheduling of one or more physical channels/signals to which a method proposed in the present disclosure may be applied.

The eNB may transmit the configuration information for the multi TB scheduling to the UE in order to receive the downlink data (S9010) and receive the DCI for the multi TB scheduling based on the configuration information (S9020).

Thereafter, the DCI may include scheduling information for transmitting the uplink data to the eNB.

Thereafter, the eNB may receive the uplink data based on the scheduled TB from the UE based on the transmitted DCI (S9030).

In this case, the eNB may continuously receive the uplink data from the UE until all scheduled TBs are received.

FIG. 10 illustrates an example of downlink transmission of the eNB.

The eNB may transmit the configuration information for the multi TB scheduling to the UE in order to transmit the downlink data (S10010) and transmit the DCI for the multi TB scheduling based on the configuration information (S10020).

Thereafter, the eNB may transmit the downlink data based on the scheduled TB to the UE based on the received DCI (S10030).

In this case, the eNB may continuously transmit the downlink data to the UE until all scheduled TBs are transmitted.

When all scheduled TBs are transmitted, the eNB may receive the HARQ-Ack feedback from the UE according to whether feedback of the received TB is required (S10040).

Figure 11:
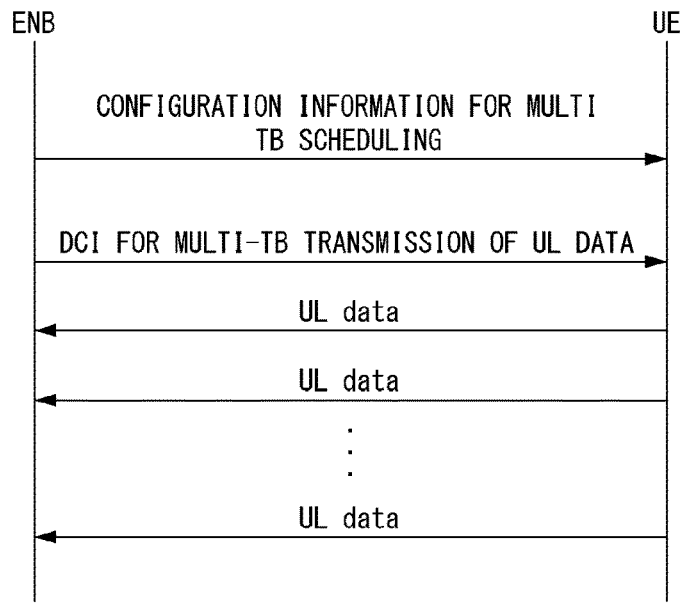
FIG. 11 is a flowchart illustrating an example of signaling between a BS and a UE performing multi TB scheduling of one or more physical channels/signals to which a method proposed in the present disclosure may be applied.
Figure 11:
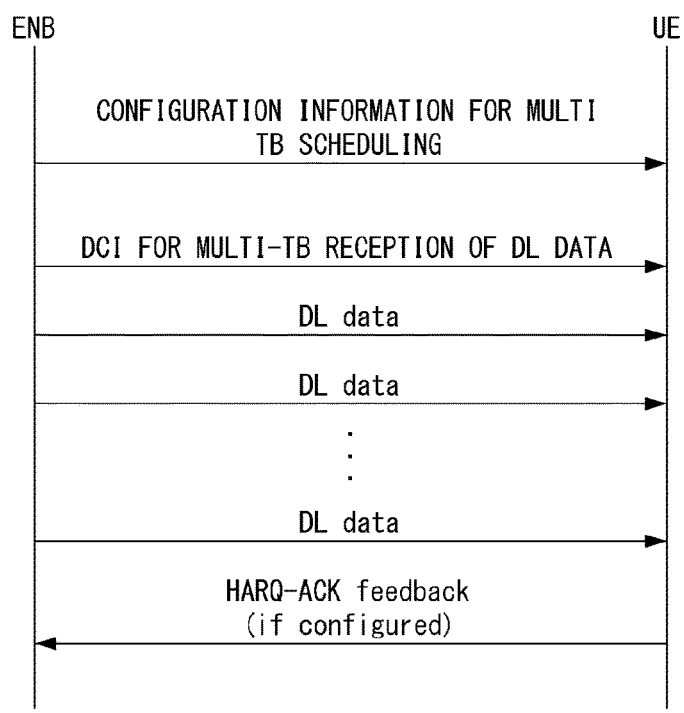

FIG. 11 is a flowchart illustrating an example of signaling between a BS and a UE performing multi TB scheduling of one or more physical channels/signals to which a method proposed in the present disclosure may be applied.

FIG. 11 illustrates an example of signaling for the method for transmitting/receiving the uplink data and downlink data between the UE and the eNB described in FIGS. 7 to 10.

FIG. 11(*a*) illustrates an example of the method for transmitting/receiving the uplink data between the eNB and the UE through the multi-TB scheduling and FIG. 11(*b*) illustrates an example of the method for transmitting/receiving the downlink data between the eNB and the UE through the multi-TB scheduling.

A detailed method is described in FIGS. 7 to 10, and as a result, the detailed method will be omitted.

Hereinafter, the multi-TB scheduling in the NB-IoT for the single HARQ process proposed in the present disclosure will be described.

Multi TB Scheduling in NB-IoT for Single HARQ Process

First, multi TB scheduling for downlink or uplink not requiring retransmission will be described.

For example, single cell point to multipoint (SC-PTM) (e.g., single cell-multicast control channel (SC-MCCH) or single cell-multicast traffic channel (SC-MTCH)) transmission may correspond to downlink data transmission not requiring retransmission.

Hereinafter, the present disclosure will be described based on SC-PTM transmission, but the present disclosure is not limited thereto and it is apparent that the present disclosure may also be applied to another transmission scheme not requiring retransmission.

When the multi TB scheduling is applied to the SC-PTM, the multi TB scheduling may be used for SC-MTCH transmission and the UE may monitor the multi TB scheduling by obtaining a carrier on which the NPDCCH scheduling the NPDSCH delivering the SC-MTCH is transmitted and used G-RNTI information, through the SC-MCCH. Further, the SC-MCCH may be used for transmission of the SC-MTCH.

Figure 12:
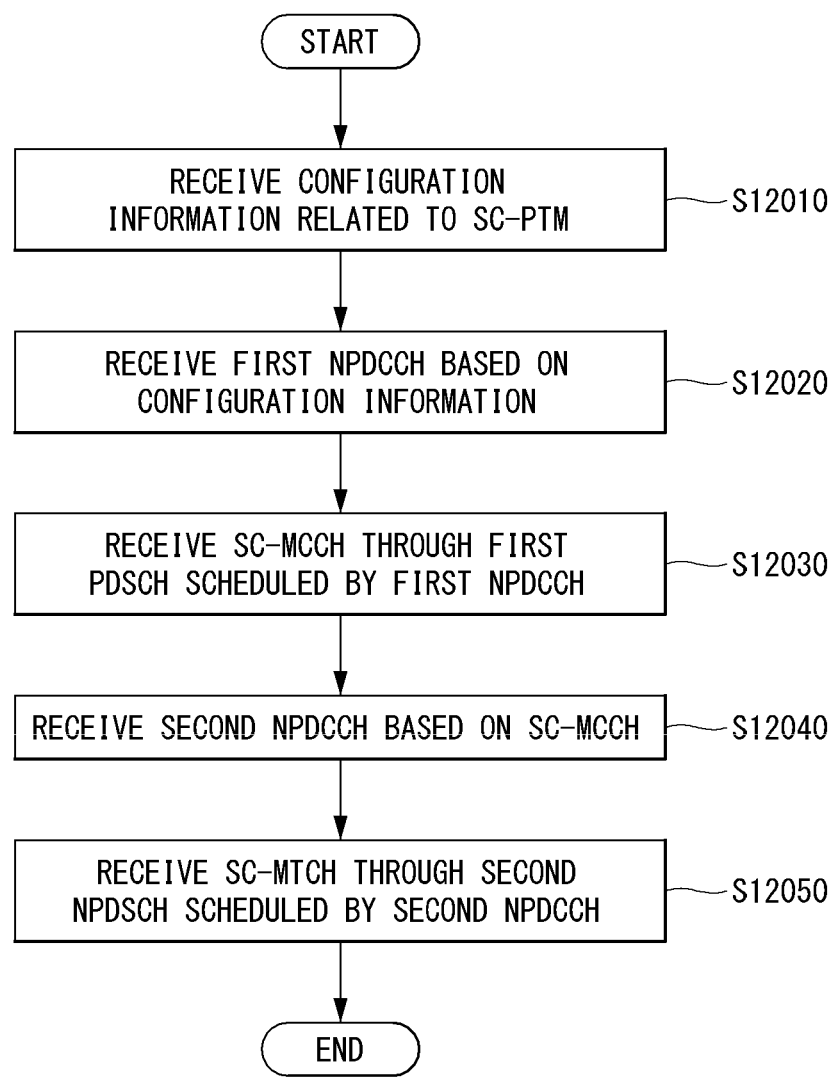
FIG. 12 is a flowchart illustrating an example of a UE operation related to a sing cell point to multipoint (SC-PTM) to which a method proposed in the present disclosure may be applied.

FIG. 12 is a flowchart illustrating an example of a UE operation related to a sing cell point to multipoint (SC-PTM) to which a method proposed in the present disclosure may be applied.

Referring to FIG. 12, when a multi TB is scheduled in a UE, scheduling information related to a TB may be transmitted through DCI.

Specifically, the UE may receive, from an eNB, configuration information (e.g., higher layer signaling) related to an SC-PTM procedure (S12010).

When a configuration related to the SC-PTM procedure is predetermined, step S12010 may be omitted.

Thereafter, the UE may receive (or monitor) a first NPDCCH in a search space configured based on the configuration information transmitted from the eNB. In this case, DCI for scheduling a first NPDSCH on which an SC-MCCH is delivered may be delivered (i.e., transmitted) through the corresponding first NPDCCH (S12020).

Thereafter, the UE may be delivered (i.e., receive), from the eNB, the SC-MCCH through the first NPDSCH scheduled by the first NPDCCH (S12030).

The UE may receive (or monitor) a second NPDCCH based on the delivered SC-MCCH (in the configured search space) (S12040).

In this case, DCI for scheduling a second NPDSCH through which an SC-MTCH is delivered may be delivered (i.e., transmitted) through the corresponding second NPDCCH. In this case, scheduling information for the multi TB may be transmitted by using DCI for a legacy UE or the scheduling information for the multi TB may be transmitted by configuring separate DCI.

Thereafter, the UE may be delivered (i.e., receive), from the eNB, the SC-MTCH through the second NPDSCH scheduled by the second NPDCCH (S12050).

Figure 13:
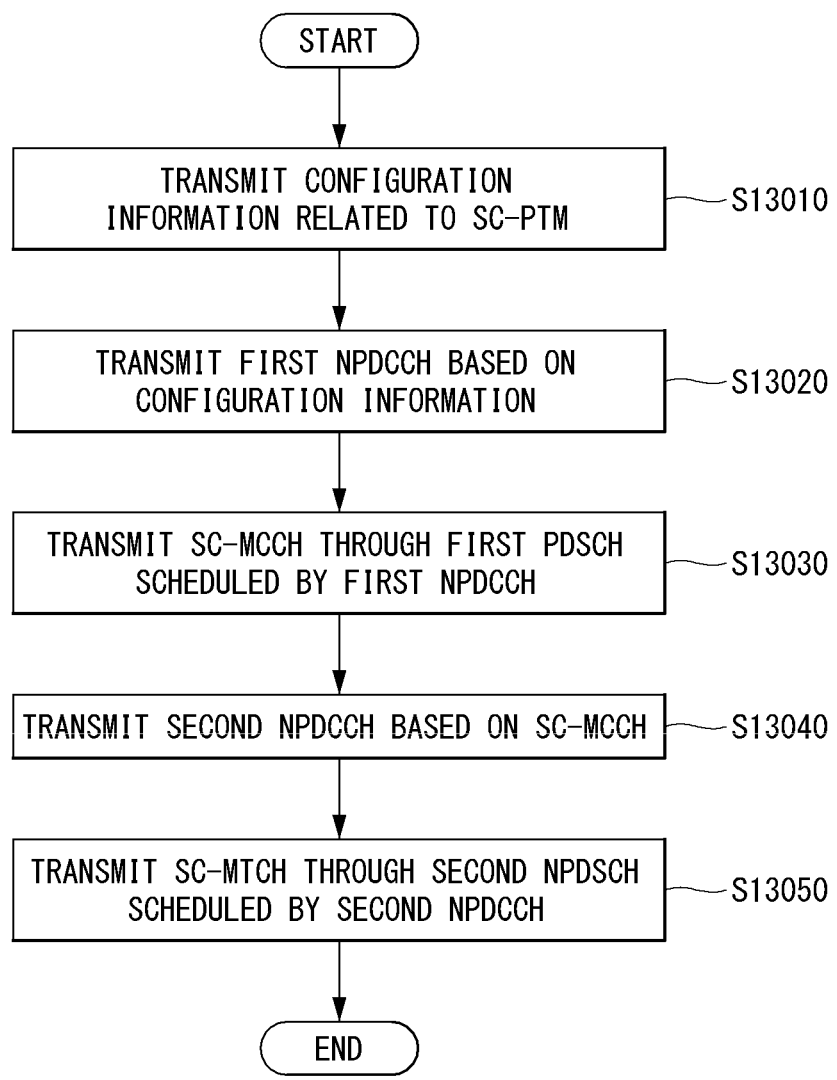
FIG. 13 is a flowchart illustrating an example of a BS operation related to a sing cell point to multipoint (SC-PTM) to which a method proposed in the present disclosure may be applied.

FIG. 13 is a flowchart illustrating an example of a BS operation related to a sing cell point to multipoint (SC-PTM) to which a method proposed in the present disclosure may be applied.

Specifically, the eNB may transmit, to the UE, configuration information (e.g., higher layer signaling) related to an SC-PTM procedure (S13010).

When a configuration related to the SC-PTM procedure is predetermined, step S13010 may be omitted.

Thereafter, the eNB may deliver (i.e., transmit), to the UE, DCI for scheduling a first NPDSCH through which an SC-MTCH is delivered through a first NPDCCH (S13020).

Thereafter, the eNB may deliver (i.e., transmit), to the UE, an SC-MCCH through the first NPDSCH scheduled by the first NPDCCH (S13030).

The eNB may transmit a second NPDCCH based on the delivered SC-MCCH (in the configured search space) (S13040).

In this case, DCI for scheduling a second NPDSCH through which the SC-MTCH is delivered may be delivered (i.e., transmitted) through the corresponding second NPDCCH. Thereafter, the eNB may transmit, to the UE, the SC-MTCH through the second NPDSCH scheduled by the second NPDCCH (S13050).

Hereinafter, the multi TB scheduling proposed in the present disclosure may be used with respect to transmission of the SC-MCCH and/or transmission of the ST-MTCH.

Figure 14:
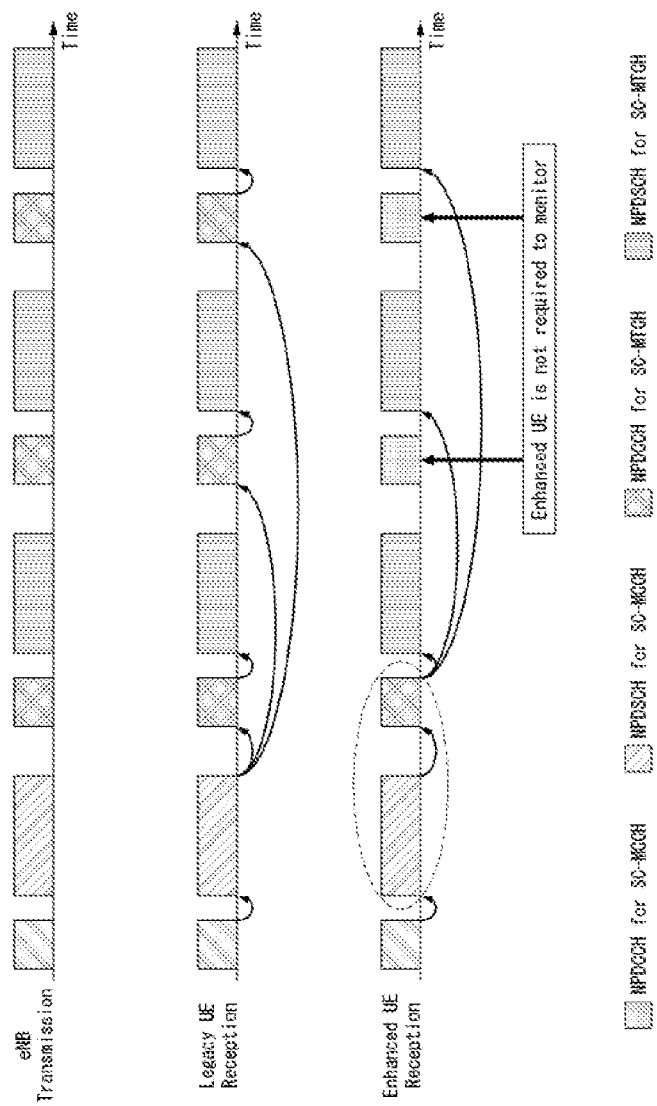
FIG. 14 is a diagram illustrating an example of multi TB scheduling for a single cell multicast control channel (SC-MCCH) proposed in the present disclosure.

Embodiment 1_Indicating Multi TB Scheduling Information by Using Legacy DCI and SC-MCCH Payload FIG. 14 is a diagram illustrating an example of multi TB scheduling for a single cell multicast control channel (SC-MCCH) proposed in the present disclosure.

Referring to FIG. 14, the eNB may transmit, to the UE, scheduling of a multi TB and information related to scheduling through old legacy DCI and an NPDSCH for transmission of an SC-MCCH without configuring new DCI.

Specifically, the eNB may transmit an NPDCCH (first NPDCCH) for the SC-MCCH as illustrated in FIG. 14. In this case, the eNB may transmit, to the UE, configuration information related to an SC-PTM before transmission of the NPDCCH.

Thereafter, the eNB may transmit the SC-MCCH through an NPDSCH (first NPDSCH) scheduled by a first NPDCCH. In this case, the eNB may incorporate indication information indicating whether to schedule a multi TB in the first NPDSCH.

An enhanced UE may recognize that the multi TB is scheduled through the indication information and receive second DCI through an NPDCCH (second NPDCCH) for a subsequently transmitted SC-MTCH.

The eNB may transmit the second NPDCCH based on a first PDSCH and transmit the SC-MTCH through an NPDSCH (second NPDSCH) scheduled by the second NPDCCH.

In this case, second DCI may include scheduling information for receiving the SC-MTCH through the NPDSCH (second NPDSCH), and the second NPDCCH and the second NPDSCH may be repeatedly transmitted with a constant period until all scheduled multi TBs are transmitted.

In this case, a legacy UE may not recognize indication information indicating whether to schedule multi TBs transmitted from the eNB and scheduling information related to scheduling of the multi TBs in the second DCI transmitted through the second NPDCCH.

Accordingly, the legacy UE should receive all NPDCCHs and NPDSCHs transmitted by the eNB.

However, the enhanced UE may recognize whether to schedule multi TBs through the indication information indicating whether to schedule multi TBs included in the first NPDSCH transmitted from the eNB.

When multi TBs are scheduled, the UE may receive the second DCI transmitted through the second NPDCCH and receive a second NPDSCH subsequently transmitted through the scheduling information of the multi TBs included in the second DCI.

In this case, the scheduling information may include at least one of the number of actually scheduled TBs, a scheduling delay for multi TBs, and/or the number of repetition times for multi TBs.

The second NPDSCH may be repeatedly transmitted until all scheduled multi TBs are transmitted and scheduling information related to transmission of the second NPDSCH may be the same.

The enhanced UE need not continuously receive the second NPDCCH before the second NPDSCH. Accordingly, when the enhanced UE recognizes whether to schedule multi TBs through the first NPDSCH and receives the scheduling information related to transmission of multi TBs through the second NPDCCH, the enhanced UE may receive the second NPDSCH which is repeatedly transmitted without receiving the second NPDCCH subsequently transmitted.

That is, since the UE may know whether to schedule multi TBs and the scheduling information through the first NPDSCH and the second NPDCCH, the UE may receive the second NPDSCH which is repeatedly transmitted without monitoring the second NPDCCH subsequently transmitted.

That is, Embodiment 1 may be configured in such a manner that the scheduling information of multi TBs for each SC-MTCH (for example, for each G-RNTI value) may be included in the SC-MCCH payload. In this case, whether to schedule multi TBs may be explicitly indicated by on/off through a flag of 1 bit or whether to schedule multi TBs may be implicitly indicated through setting a specific parameter value (e.g., G-RNTI) to one of predetermined values.

For example, a specific range (e.g., FF00 to FFF3) of the G-RNTI value may be configured as a G-RNTI indicating scheduling of multi TB and the scheduling information of multi TBs related thereto may be additionally transmitted to the SC-MCCH and DCI (second DCI) for scheduling an actual SC-MTCH may be transmitted as before.

In this case, since the legacy UE may not recognize whether the corresponding G-RNTI value indicates the scheduling of the multi TBs, the legacy UE may monitor the first NPDSCH scheduling the SC-MTCH according to an old operation and also receive the SC-MTCH scheduled by the corresponding NPDCCH.

On the contrary, since the enhanced UE may recognize that the corresponding G-RNTI value indicates whether to schedule multi TBs, the enhanced UE may receive the SC-MTCH scheduled with multi TBs by combining the scheduling information of multi TBs received through the SC-MTCH and remaining information (e.g., MCS, resource allocation, the number of repetition times, etc.) received through the legacy DCI.

In this case, the scheduling information for scheduling the multi TBs may be configured as follows. In respect to the number of actually scheduled TBs, a maximum TB number may be semi-statically delivered to the UE through an SIB and the UE may recognize the number of actually scheduled TBs by interpreting the number of actually delivered TBs according to the delivered value.

Furthermore, only one value for the scheduling delay for the multi TBs may be notified to the UE and the scheduling delay transmitted to the UE may be configured to be used as a scheduling delay between all TBs (e.g., an interval from a last subframe in which an NPDSCH for delivering the previous TB is transmitted up to a first subframe in which an NPDSCH for delivering a next TB is transmitted).

Furthermore, a scheduling delay value may be independently configured as large as the number of TBs actually scheduled for dynamic scheduling of the eNB and transmitted to the UE.

Furthermore, only one value for the number of repetition times for the multi TBs may also be transmitted to the UE and configured to be used as the number of repetition times for all TBs and the number of repetition times may be independently configured as large as the number of TBs actually scheduled for the dynamic scheduling of the eNB and transmitted to the UE.

In this case, the eNB generates and transmits new DCI for the NPDSCH to the legacy UEs as illustrated in FIG. 14, but the scheduling information such as the MSC, the resource allocation, the number of repetition times, etc., included in each DCI may be scheduled similarly to the information included in the previously transmitted DCI.

The enhanced UE may obtain the indication information indicating whether to schedule multi TBs through the SC-MCCH payload, and receive the scheduling information transmitted through the NPDCCH for the SC-MTCH and recognize whether to schedule multi TBs and the scheduling information for transmission of multi TBs.

The enhanced UE may recognize that the NPDCCH for the SC-MTCH subsequently transmitted includes the same scheduling information as the NPDCCH for the SC-MTCH previously transmitted.

Accordingly, the enhanced UE may receive NPDSCHs for transmission of the scheduled multi TBs without monitoring the NPDCCH for the SC-MTCH subsequently transmitted.

Such a method may decrease a broadcasting load of the eNB. That is, even when the eNB schedules the SC-MTCH with a single TB for the legacy UE, the eNB incorporates and transmits additional information for the enhanced UE in the SC-MCCH, and as a result, the enhanced UE may recognize and receive the additional information like the multi TB scheduling.

Furthermore, a DCI field for an additional DCI format need not be separately received for the multi TB scheduling.

Figure 15:
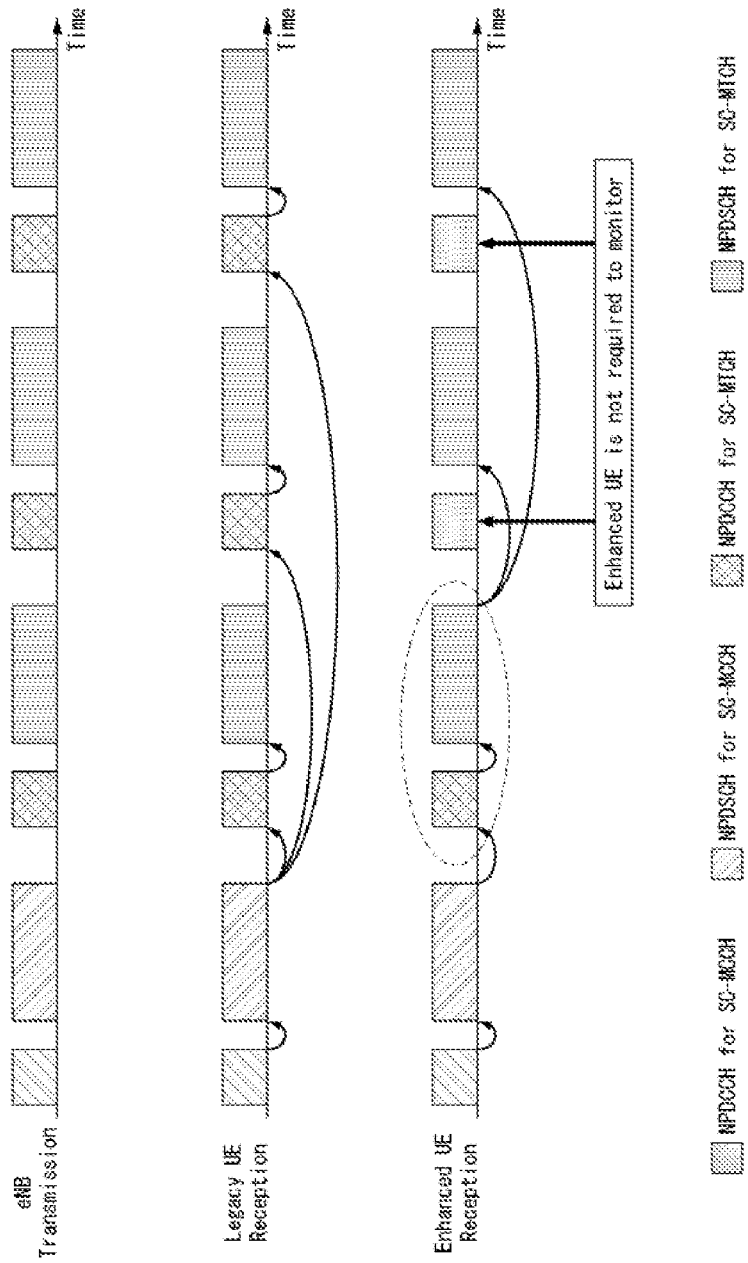
FIG. 15 is a diagram illustrating another example of multi TB scheduling for a single cell multicast control channel (SC-MCCH) proposed in the present disclosure.

Embodiment 1-1_Indicating Multi TB Scheduling Information by Using Legacy DCI and SC-MTCH Payload FIG. 15 is a diagram illustrating another example of multi TB scheduling for a single cell multicast control channel (SC-MCCH) proposed in the present disclosure.

Referring to FIG. 15, the indication information indicating whether to schedule multi TBs may be included in the payload of the SC-MTCH rather than the payload of the SC-MCCH and transmitted unlike FIG. 14.

Specifically, as illustrated in FIG. 15, the indication information indicating whether to schedule multi TBs may be transmitted through the SC-MTCH payload rather than the SC-MCCH payload unlike FIG. 14.

In Embodiment 1-1, up to an operation in which the UE receives the second NPDSCH for delivering the SC-MTCH is the same as the operation of the legacy UE, but the enhanced UE may recognize whether the multi TBs are scheduled through the indication information included in the SC-MTCH payload.

Thereafter, the UE may not monitor the second NPDCCH for scheduling the SC-MTCH subsequently transmitted based on the scheduling information for transmission of the multi TBs included in the second NPDCCH for the SC-MTCH and the indication information included in the second NPDSCH.

In this case, the scheduling information may include whether TBs to be subsequently continuously transmitted, a scheduling delay up to a TB subsequently transmitted, the number of repetition times of the TB subsequently transmitted, and the like.

The scheduling information for scheduling the multi TBs may be configured as follows. Information indicating whether there is a TB transmitted after transmission of the second NPDSCH including the indication information may be expressed as the 1-bit field and a maximum scheduling TB number may be semi-statically configured through the SIB.

When the multi TBs are scheduled as large as the maximum scheduling TB number, the UE may expect that information for the TB subsequently transmitted is not transmitted to a last TB any longer.

Furthermore a scheduling delay of up to the TB (e.g., from a last subframe in which the NPDSCH for delivering the previous TB is transmitted up to a first subframe in which the NPDSCH for delivering the next TB is transmitted) may be given as an offset of a first obtained scheduling delay value or given as a new value.

In this case, when there is no corresponding information, a value which is the same as a previously transmitted scheduling delay value may be used and the number of repetition times of the TB subsequently transmitted may be given as an offset of the first obtained repetition time value or given as a new value.

That is, as illustrated in FIG. 15, the eNB transmits new DCI to the legacy UEs each time, but the MCS, the resource allocation, the number of repetition times, etc., to be included in the corresponding DCI may be included in the scheduling information and transmitted similarly to the information included in the previously transmitted DCI.

As illustrated in FIG. 15, as the enhanced UE receives whether the multi TBs are scheduled through the SC-MTCH payload and the scheduling information, the enhanced UE may not monitor the NPDCCH for the SC-MTCH subsequently transmitted.

Such a method may decrease the broadcasting load of the eNB. That is, even when the eNB schedules the SC-MTCH with a single TB for the legacy UE, the eNB incorporates and transmits additional information for the enhanced UE in the SC-MCCH, and as a result, the enhanced UE may recognize and receive the additional information like the multi TB scheduling.

Embodiment 2_Indicating Multi TB Scheduling Through Compact DCI/Wake Up Signal (WUS)

Embodiment 2 is an example of a method for scheduling multi TBs through compact DCI (or wake-up signal) instead of enhanced DCI for scheduling multi TBs.

In this case, the compact DCI means DCI using a small payload by comparison with a legacy DCI format (e.g., DCI format N0, N1, or N2).

Since the eNB need not allocate the search space because the DCI payload is small when using the compact DCI, there is a gain in terms of resource management and since the UE has only to monitor the search space only for a shorter time, there is an advantage in terms of battery saving of the UE.

Furthermore, the wake-up signal is introduced for the purpose of reducing consumed energy while monitoring a paging search space by the UE with a signal introduced in NB-IoT/eMTC.

Basically, delivering multi TB scheduling information by using the SC-MCCH or SC-MTCH payload may be similar to Methods 1 and 1-1, but the MCS, the resource allocation, the number of repetition times, etc., delivered through the legacy DCI may be configured to be transmitted between scheduled multi TBs by using the compact DCI or wake-up signal so as to be more dynamically configured than the proposed methods.

In this case, the compact DCI may be easily created by removing only an unnecessary element from the legacy DCI format.

Further, the search space for the compact DCI may be newly configured and the corresponding information may be differently configured for each TMGI through the SIB or through the SC-MCCH payload.

The RNTI value used in this case may be configured to adopt a G-RNTI value corresponding to the corresponding TMGI. Since the MCS, the resource allocation, the number of repetition times, etc., which are independent may be provided while scheduling multi TBs by using such a method, the eNB may efficiently manage the resource.

Embodiment 3_Introduction of New DCI for Multi TB Scheduling

A separate DCI format may be configured for scheduling multi TBs. Hereinafter, in the present disclosure, a new DCI format for scheduling multi TBs is referred to as enhanced DCI.

That is, the separate DCI format for scheduling multi TBs may be configured in addition to the old configured DCI format and the eNB transmits the DCI of the enhanced DCI format to the UE to schedule the multi TBs.

Specifically, when the eNB configures the separate DCI format for scheduling the multi TBs and schedules the multi TBs, the eNB transmits the enhanced DCI through the NPDCCH.

When the enhanced DCI is transmitted from the eNB while the enhanced UE monitors the DCI in the search space, the enhanced UE may receive the enhanced DCI and obtain the scheduling information related to the scheduling of the multi TBs and transmit/receive the multi TBs through the received scheduling information.

In other words, SC-MTCH information which may be recognized and decoded by the legacy UE and the enhanced UE may be basically included in the SC-MCCH payload and transmitted and SC-MTCH information which may be recognized and decoded by only the enhanced UE may be additionally included and transmitted.

That is, the legacy UE may not decode and recognize the SC-MTCH information for the enhanced UE even by receiving an SC-MCCG payload.

In this case, in respect to the SC-MTCH information which may be recognized and decoded by only the enhanced UE, information (e.g., a scheduling carrier index, an SC-RNTI, search space information for the SC-MTCH, etc.) included in the legacy SC-MTCH information and transmitted may be configured as an independent value and delivered and enhanced UEs for receiving the information may be configured to recognize that the DCI for scheduling the SC-MTCH is the enhanced DCI and monitor the corresponding DCI.

When using such a method, the UE need not blind-decode different DCI sizes.

Scheduling information (e.g., the number of scheduled TBs, a scheduling delay, etc.) which may be transmitted through the enhanced DCI may be configured through the following method.

Hereinafter, described methods are only to be separated for convenience of description and some components may be replaced or may be coupled with each other and applied.

(1) The Number of Scheduling TBs (Method 1): The maximum number of multi TBs to be used for multi TB scheduling of each SC-MTCH may be notified to the UE through a system information block (SIB) (e.g., SIB 20) and the number of actually scheduled TBs may be transmitted to the UE through the enhanced DCI for scheduling the SC-MTCH.

That is, the SIB may include the maximum number of scheduled TBs and the enhanced DCI may include the number of actually scheduled TBs.

Each SC-MTCH may be configured to follow the maximum number of common multi TBs in order to prevent the number of fields of the enhanced DCI from being significantly increased or configured to include the maximum number of independent multi TBs for each SC-MTCH.

(Method 2): The maximum number of multi TBs to be used for multi TB scheduling may be configured to be included in the payload of the SC-MCCG for each SC-MTCH and the number of actually scheduled TBs may be indicated to the UE through the enhanced DCI for actually scheduling the SC-MTCH.

In this case, each SC-MTCH may be configured to include the maximum number of common multi TBs or the maximum number of independent multi TBs for each SC-MTCH in order to prevent the number of fields of the enhanced DCI from being significantly increased.

In this case, scheduling flexibility is higher than the scheduling flexibility in indicating the maximum number of scheduled TBs through the SIB.

(Method 3): The number of actually scheduled TBs may be notified to the UE through the enhanced DCI. In this case, since the size of the DCI field may be larger in order to incorporate the number of scheduled TBs, the number of multi TBs which may be maximally scheduled may be limited.

When such a method is used, the eNB may dynamically configure the number of scheduled TBs.

(Method 4): The scheduling information for scheduling the multi TBs may be delivered to the UE by using an explicit field or a specific parameter in the SC-MCCH rather than the enhanced DCI. In this case, the number of TBs for actually scheduling the SC-MTCH may be indicated for each SC-MTCH by using the explicit field.

In this case, the maximum number of scheduled multi TBs may be predetermined in the SIB or SC-MCCH or defined only in a standard. Further, the eNB may implicitly indicate the number of specific TBs actually scheduled to the UE by configuring a specific parameter value (e.g., G-RNTI) to one of pre-promised values.

For example, at least one specific value of the G-RNTI may indicate the number of specific TBs (e.g., FFF0 may indicate 1 TB, FFF1 may indicate 2 TB, FFF2 may indicate 3 TB, and FFF3 may indicate 4 TB).

When the UE receives, from the eNB, a G-RNTI corresponding to the number of scheduled TBs, the UE may recognize that the multi TBs are scheduled through the value of the G-RNTI and the number of actually scheduled TBs.

In such a method, since a field indicating the number of separately scheduled TBs need not be added to the enhanced DCI field, the size of the DCI may be reduced.

(2) Scheduling Delay (Method 1): An actual scheduling delay value may be transmitted to the UE through the enhanced DCI. In this case, only one value for the scheduling delay value may be transmitted to the UE and the transmitted scheduling delay value may be used as a scheduling delay value between all TBs (e.g., an interval from a last subframe in which an NPDSCH for delivering the previous TB is transmitted up to a first subframe in which an NPDSCH for delivering a next TB is transmitted).

Furthermore, the scheduling delay value may be independently delivered to the UE as large as the number of TBs actually scheduled for dynamic scheduling of the eNB.

In this case, the scheduling delay value may be configured based on a normal subframe or configured based on a valid subframe.

When the scheduling delay value is independently transmitted, the eNB may indicate a scheduling delay to the UE fully dynamically.

(Method 2): The enhanced DCI may include both an actual scheduling delay value for TB transmission and an offset value (scheduling delay offset value) for each scheduling delay value. In this case, for up to an NPDSCH for delivering a TB which is first transmitted, a delay may be determined with the scheduling delay value transmitted through the DCI and for from an NPDSCH for delivering a second TB, a starting subframe of the NPDSCH may be determined by using a value obtained by using both the scheduling delay and the scheduling delay offset.

For example, when the scheduling delay is referred to as 'X' and the scheduling delay offset is referred to as 'P', a starting subframe of the NPDSCH for scheduling an N-th TB may be expressed as n+X+(N−1)*P.

In this case, n may indicate a last subframe in which the NPDCCH for scheduling the SC-MTCH is transmitted or a last subframe in which the NPDSCH for transmitting the SC-MTCH which is transmitted immediately before is transmitted.

The values may be configured based on the normal subframe or configured based on the valid subframe.

In Method 2, the length of the enhanced DCI may be made to be smaller and the dynamic scheduling delay may be indicated.

(Method 3): The scheduling delay value may be configured to be not transmitted through the enhanced DCI but delivered through the explicit field of the SC-MCCH payload or by using a specific parameter.

In this case, configurable scheduling delay values may follow legacy values and the scheduling delay value may be indicated for each SC-MTCH by using a new value.

Further, the eNB may implicitly indicate the scheduling delay of the actual NPDSCH to the UE by configuring a specific parameter value (e.g., G-RNTI) to one of the pre-promised values.

For example, at least one specific value of the G-RNTI may indicate a specific scheduling delay (e.g., FFF0 may indicate 12 SFs, FFF1 may indicate 14 SFs, FFF2 may indicate 16 SFs, and FFF3 may indicate 20 SFs).

When the UE receives the G-RNTI corresponding to the scheduling delay value from the eNB, the UE may recognize an actual scheduling delay through the value of the G-RNTI.

In such a method, since a field indicating the scheduling delay need not be separately added to the enhanced DCI field, the size of the DCI may be reduced.

Similarly to the LTE LAA, information such as the MCS or the resource allocation may be commonly used.

Further, in the case of retransmission, a method for downlink or uplink may be additionally considered.

Embodiment 4_Method for Transmitting Scheduling Information of Multi TBs Through Enhanced DCI and Starting Transmission/Reception of Next TB when Retransmission is Completed If a delay may be endured due to NB-IoT characteristics, when the scheduling information related to multi TBs is transmitted through one enhanced DCI and all retransmission of an HARQ process corresponding to the previous TB is completed, initial transmission/reception corresponding to the next TB may start.

In this case, when the UE performs initial transmission/reception of the next TB, the UE which is subjected to the multi TB scheduling may be indicated with a transmission/reception time (e.g., scheduling delay) for a TB subsequent through the corresponding compact DCI or wake up signal, resource allocation, or MCS by monitoring and decoding the compact DCI or the wake up signal from a situation in which transmission/reception related to one TB is terminated through the enhanced DCI in order to prevent ambiguity with the eNB.

In Method 4, the UE may receive an RRC signaling so as to monitor the enhanced DCI or the search space for the enhanced DCI may be configured independently through the SIB.

Embodiment 5_Configuring Separate NPDSCH for Multi TBs

Figure 16:
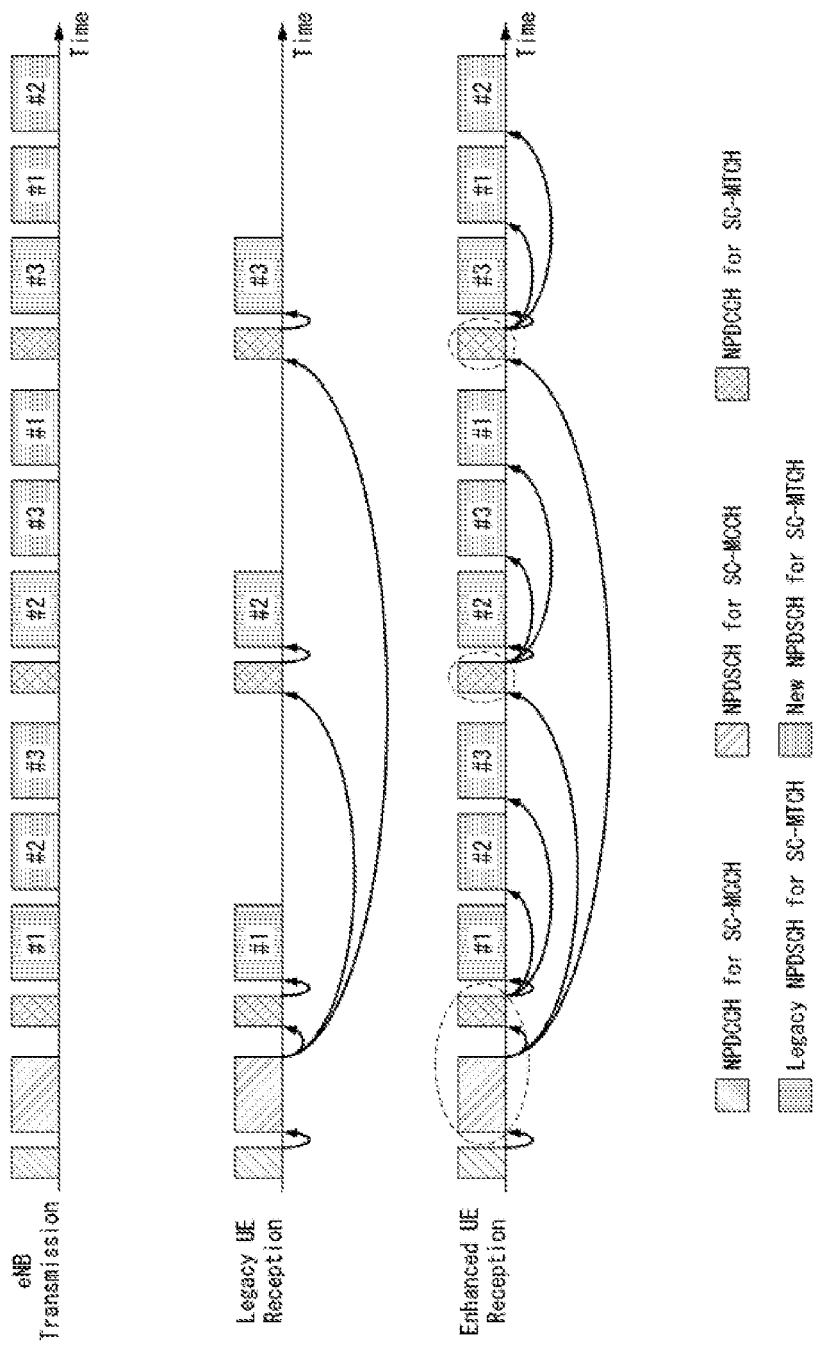
FIG. 16 is a diagram illustrating yet another example of multi TB scheduling for a single cell multicast control channel (SC-MCCH) proposed in the present disclosure.

FIG. 16 is a diagram illustrating yet another example of multi TB scheduling for a single cell multicast control channel (SC-MCCH) proposed in the present disclosure.

Referring to FIG. 16, at least one new NPDSCH for the SC-MTCH may be generated in the legacy NPDSCH for the SC-MTCH and the enhanced UE may recognize the legacy NPDSCH and at least one new NPDSCH as a multi TB scheduling NPDSCH by using the legacy DCI and the SC-MCCH payload without configuring the enhanced DCI (e.g., DCI for scheduling the multi TBs).

Specifically, when the multi TBs are scheduled unlike a normal legacy NPDSCH, the eNB may generate at least one new NPDSCH for scheduling of the multi TBs in addition to the legacy NPDSCH and transmit the SC-MTCH to the UE.

The legacy UE may not recognize and decode at least one new generated NPDSCH as the NPDSCH generated for scheduling of the multi TBs and only the enhanced UE may recognize and decode at least one new generated NPDSCH.

That is, in an SC-MTCH NPDCCH search space, only the legacy DCI may be transmitted and in addition to the legacy SC-MTCH NPDSCH (e.g., legacy NPDSCH), a new SC-MTCH NPDSCH (e.g., new NPDSCH) for the enhanced UE may be additionally configured and transmitted.

The eNB may incorporate scheduling information of a new configured SC-MTCH NPDSCH in the SC-MCCH payload and transmit the scheduling information together so as for the enhanced UE to recognize the scheduling information together with the information included in the payload of the DCI transmitted in the SC-MTCH NPDCCH search space.

In this case, the indication information indicating whether to schedule the multi TBs may be included in the NPDSCH for the SC-MCCH and transmitted.

The UE may be configured to receive the legacy NPDSCH and a new NPDSCH, and one or more new NPDSCHs may be generated and transmitted.

In this case, the scheduling information for scheduling of the multi TBs may be configured as follows according to the transmission times of the legacy NPDSCH and the new NPDSCH.

First, when the new NPDSCH is transmitted at a later time than the legacy NPDSCH, the eNB may transmit, to the UE, SF gap which is a subframe interval from a transmission termination time of the legacy SC-MTCH NPDSCH to a starting point of the new SC-MTCH NPDSCH, and additionally transmit, to the UE, a difference in RA, MCS, TBS, etc., between both NPDSCHs.

Second, when the new NPDSCH is transmitted at an earlier time than the legacy NPDSCH, the eNB may transmit a scheduling delay value of the new SC-MTCH NPDSCH to the UE and additionally transmit, to the UE, the difference in RA, MCS, and TBS between both NPDSCHs.

In a first case, since the new NPDSCH may be transmitted in a search space (e.g., type 2A-CSS) for the legacy UE, the legacy UE monitors the CSS in order to find DCI which is not transmitted, and as a result, power consumption may increase.

Accordingly, the new NPDSCH may be transmitted at the earlier time than the legacy NPDSCH in order to decrease the power consumption of the legacy UE.

Third, a transmission position of the new NPDSCH may be determined according to the same value as a specific parameter (e.g., scheduling delay, etc.) of the legacy NPDSCH and a specific parameter (e.g., RU, the number of repetition times, etc.) of the new NPDSCH.

That is, when a scheduling delay enough to transmit the new NPDSCH is provided for the legacy NPDSCH, the new NPDSCH may be transmitted at the earlier time than the legacy NPDSCH.

Otherwise, the new NPDSCH may be transmitted at the later time than the legacy NPDSCH.

In other words, when the scheduling delay of the legacy NPDSCH is longer than a transmission time of the new NPDSCH, there is no collision even though the new NPDSCH is transmitted at the earlier tan the legacy NPDSCH.

However, if not, since the transmission time of the legacy NPDSCH is returned before transmission of the new NPDSCH is completed, the legacy NPDSCH may be transmitted earlier than the new NPDSCH in this case.

Even though the new NPDSCH is configured to be earlier than the legacy NPDSCH through the SC-MCCH payload by the eNB, if the scheduling delay of the legacy NPDSCH is not enough to transmit the new NPDSCH (for example, by considering the SF number and a level of the number of repetition times), the transmission of the new NPDSCH may be configured after the transmission of the legacy NPDSCH.

In this case, the enhanced UE may combine the legacy SC-MTCH NPDSCH and the new SC-MTCH NPDSCH and recognize the combined SC-MTCH NPDSCHs as a multi TB scheduled NPDSCH, and receive both SC-MTCH NPDSCHs.

Since a separate carrier or a separate search space need not be defined for one service, the eNB may not send the same service information to different positions twice and transmit the scheduling information through the old DCI.

However, since the new SC-MTCH NPDSCH should be additionally transmitted before or after the legacy SC-MTCH NPDSCH, a reception delay of the legacy UEs may increase.

For example, as illustrated in FIG. 16, two new NPDSCHs may be added after the legacy NPDSCH and in the case of the legacy NPDSCH, entire SC-MTCH information may be divided into three and transmitted.

That is, when the legacy UE should receive all legacy DCI and receive respective legacy NPDSCHs, the legacy UE may receive the entire SC-MTCH information. However, the enhanced UE receives the new NPDSCHs transmitted subsequently to the legacy NPDSCH to receive the entire SC-MTCH information.

In other words, there a more gain in delay than the legacy UE, and if decoding is successfully completed and the NPDSCHs need not be subsequently received, the power consumption may be reduced. Meanwhile, if decoding is not successfully completed, subsequently transmitted legacy DCI may be received once again, and the legacy NPDSCH and the new NPDSCH may be subsequently received.

Embodiment 5-1

Figure 17:
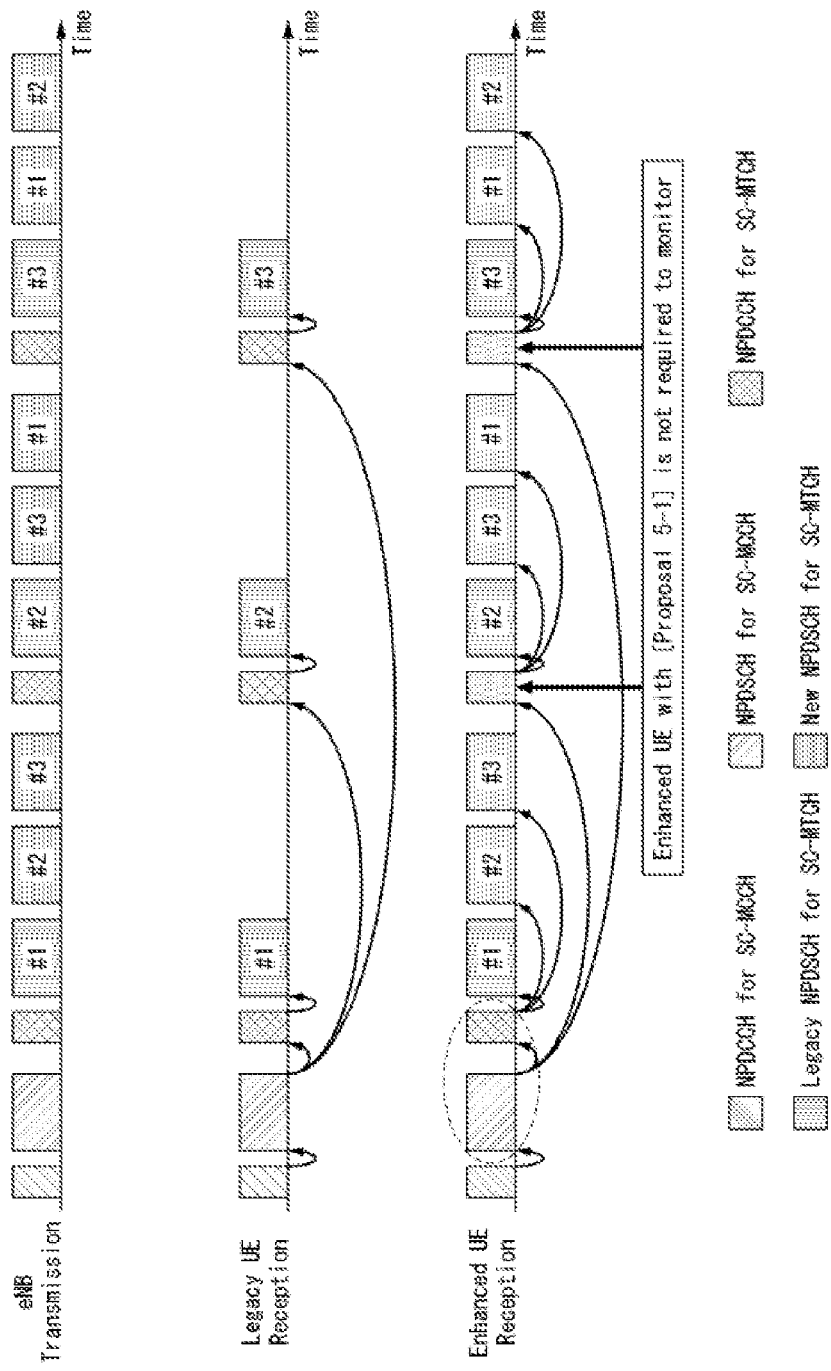
FIG. 17 is a diagram illustrating still yet another example of multi TB scheduling for a single cell multicast control channel (SC-MCCH) proposed in the present disclosure.

FIG. 17 is a diagram illustrating yet another example of multi TB scheduling for a single cell multicast control channel (SC-MCCH) proposed in the present disclosure.

Referring to FIG. 17, unlike FIG. 16, when the UE monitors the DCI the legacy NPDSCH and the new NPDSCH in the search space, the UE may then receive the legacy NPDSCH and the new NPDSCH without searching separate DCI.

Specifically, the method described in FIG. 14 or 15 may be applied to Embodiment 5 described in FIG. 15.

That is, Embodiment is a method for recognizing the legacy NPDSCH and at least one new NPDSCH as multi TBs by using the SC-MCCH payload and one legacy DCI. Here, additionally, like the method described in FIG. 14 or 15, a plurality of legacy NPDSCHs and a plurality of new NPDSCHs may be recognized as the multi TBs by using the SC-MCCH and one legacy DCI.

In other words, the eNB incorporates the indication information related to whether to schedule the multi TBs in the NPDSCH for the SC-MCCH and transmits the indication information and incorporates the scheduling information for the scheduling of the multi TBs in the DCI of the NPDCCH for the CS-MTCH and transmits the scheduling information.

In this case, the scheduling information may include the information described above.

Thereafter, the eNB may transmit, to the UE, the legacy NPDSCH scheduled through the DCI and at least one new NPDSCH and perform such an operation periodically repeatedly.

For example, as illustrated in FIG. 17, the eNB may transmit, to the UE, the DCI for scheduling the legacy NPDSCH and the new NPDSCH through the NPDCCH for the SC-MTCH and then transmit, to the UE, one legacy NPDSCH and two new NPDSCHs.

Thereafter, the eNB may transmit, to the UE, the DCI for scheduling the legacy NPDSCH and the new NPDSCH through the NPDCCH for the SC-MTCH again until all scheduled multi TBs are transmitted and then transmit, to the UE, one legacy NPDSCH and two new NPDSCHs repeatedly.

In this case, the DCI included in the NPDCCH for the SC-MTCH transmitted from the eNB may include the same or similar scheduling information. That is, the repeatedly transmitted NPDSCH may be scheduled through one DCI.

In this case, when the UE recognizes whether to schedule the multi TBs through the NPDSCH for the SC-MCCH and then receives the DCI for scheduling the legacy NPDSCH and the new NPDSCH, the UE may receive the plurality of NPDSCHs and the plurality of new NPDSCHs without receiving the subsequently transmitted DCI (or by skipping the DCI).

When such a method, the search space which should be monitored by the enhanced UE is reduced, thereby reducing the power consumption of the enhanced UE.

For example, as illustrated in FIG. 17, the enhanced UE may receive DCI (first DCI) for scheduling the NPDSCH for the SC-MCCH through the NPDCCH for the SC-MCCH. Thereafter, the UE may receive the NPDSCH for the SC-MCCH based on the first DCI and when the method described in FIG. 14 is used, the UE may recognize whether to schedule the multi TBs through the indication information included in the NPDSCH.

However, when the method described in FIG. 15 is to be used, the indication information is not included in the NPDSCH.

Thereafter, the enhanced UE may receive DCI (second DCI) for scheduling the legacy NPDSCH for the SC-MTCH and the new NPDSCH through the NPDCCH for the SC-MTCH.

In this case, the second DCI may include the scheduling information for scheduling the legacy NPDSCH for the SC-MTCH and the new NPDSCH.

Since the enhanced UE knows both information on legacy NPSCHs to be present and information on the new NPDSCHs through the second DCI, the enhanced UE may receive an immediately next NPDSCH and the new NPDSCHs without receiving legacy DCI which is subsequently transmitted.

In this case, when the method described in FIG. 15 is used, the indication information indicating whether to schedule the multi TBs may be included in the legacy NPDSCH for the SC-MTCH which is first transmitted and the enhanced UE may recognize whether to schedule the multi TBs through the indication information.

When such a method is used, the UE need not monitor the DCI in a specific search space, and as a result, there is an effect that the power consumption of the UE may be reduced.

In Embodiments 5 and 5-1 described in FIGS. 16 and 17, NPDSCHs #1, #2, and #3 may include the same information regardless of a transmission position. However, the proposed method is not continuously limited only to a scheme of repeatedly transmitting the same information and also not limited to a case where the same information is cycled.

As described above, a relationship and information of the legacy NPDSCH and the new NPDSCHs may be indicated by the payload of the SC-MCCH. Furthermore, a structure may also be considered in which new NPDSCHs are not interlaced with the legacy NPDSCH.

For example, in FIGS. 16 and 17, when the legacy NPDSCHs are #1, #2, and #3, respectively, new NPDSCHs may become NPDSCHs containing different information like #4 to #9.

Such a method may be used when information expressed by small bits among the same information is delivered to the legacy NPDSCH (e.g., low quality broadcast) and information expressed by more bits is delivered to the enhanced NPDSCH (e.g., high quality broadcast).

Embodiment 6_Method for Independently Configuring New NPDSCH

The new NPDSCH is present, which is independent from the legacy NPDSCH for the SC-MTCH and the enhanced UE may recognize the multi TB scheduling NPDSCH by using the legacy DCI and the SC-MCCH payload without enhanced DCI (e.g., DCI for scheduling the multi TBs).

Specifically, in the SC-MTCH NPDCCH search space, only the legacy DCI may be transmitted and an NPDSCH of a new SC-MTCH for the enhanced UE may be independently configured regardless of the legacy SC-MTCH NPDSCH unlike Embodiment 5.

The eNB may incorporate scheduling information of the new SC-MTCH NPDSCH in the SC-MCCH payload and transmit the scheduling information together so as for the enhanced UE to decode and recognize the scheduling information together with the information included in the payload of the legacy DCI to be transmitted to the SC-MTCH NPDCCH search space.

Additionally, the eNB may indicate whether the legacy SC-MTCH NPDSCH is included in the multi TB scheduling NPDSCH through a specific method (e.g., a specific field or reserved state of the legacy DCI for scheduling the SC-MCCH payload or SC-MTCH NPDSCH).

When the legacy SC-MTCH NPDSCH is included in the multi TB scheduling NPDSCH, the enhanced UE may recognize both the legacy SC-MTCH NPDSCH and the new SC-MTCH NPDSCH as the multi TB scheduling NPDSCH and receive both SC-MTCH NPDSCHs.

When the legacy SC-MTCH NPDSCH is included in the multi TB scheduling NPDSCH, the transmission times of the legacy NPDSCH and the new NPDSCH may be configured according to a specific rule as in Embodiment 5.

In Embodiment 6, a separate carrier or a separate search space need not be defined for one service and the enhanced DCI is not required. However, the eNB need to send the same service information once or more (for example, each of the service information for the legacy UE and the service information for the enhanced UE should be transmitted).

Further, the new SC-MTCH NPDSCH should be additionally transmitted before or after the legacy SC-MTCH NPDSCH.

Embodiment 7_Method for Transmitting Separate Enhanced DCI for Enhanced NPDSCH

The legacy NPDSCH for the SC-MTCH and the new NPDSCH for the SC-MTCH are present, and the enhanced UE may recognize the multi TB scheduling NPDSCH by using the legacy DCI and the enhanced DCI (e.g., DCI for scheduling the multi TBs), and the SC-MCCH payload.

Specifically, in the SC-MTCH NPDCCH search space, the enhanced DCI for scheduling the multi TBs may also be transmitted in addition to the legacy DCI. In this case, since scheduling information related to scheduling of multi TBs which are not transmitted through the legacy DCI may be included in the enhanced DCI, a payload size of the enhanced DCI may be smaller or equal to the payload size of the legacy DCI.

Further, the new SC-MTCH NPDSCH for the enhanced UE may be configured in the legacy SC-MTCH NPDSCH, and the eNB may additionally transmit the scheduling information of the new SC-MTCH NPDSCH to the SC- MCCH payload and the payload of the enhanced DCI so as for the enhanced UE to decode and recognize the scheduling information together with information included in the payload of the legacy DCI to be transmitted in the SC-MTCH NPDCCH search space.

The G-RNTI value for the enhanced DCI may be additionally indicated in addition to the G-RNTI value for the legacy DCI for a specific service, and only when the G-RNTI value for the enhanced DCI is configured, the enhanced UE may be configured to monitor the enhanced DCI.

In this case, the enhanced UE may simultaneously monitor and receive the legacy DCI and the enhanced DCI in the same search space, and when the value of the G-RNTI for the enhanced DCI is not configured, the eNB may regard that the multi TBs are not scheduled and the enhanced UE may also perform a single TB scheduling operation by receiving the legacy DCI.

Alternatively, the eNB may explicitly indicate whether the enhanced DCI is transmitted for each service (e.g., indication information related to whether to support the multi TB scheduling), and the enhanced UE should be able to receive both information delivered to the legacy DCI and information delivered to the enhanced DCI in order to know complete multi TB scheduling information.

When the legacy DCI is not detected, the enhanced UE may determine that any DCI is not detected in the corresponding search space regardless of whether to detect the enhanced DCI and when both the legacy DCI and the enhanced DCI are detected, the enhanced UE may receive the multi TB scheduling NPDSCH by using information included in two DCIs.

Unlike such a method, while the enhanced UE does not continuously monitor two DCIs but monitors only the legacy DCI, when the legacy DCI is detected, the enhanced UE may start monitoring the enhanced DCI.

In this case, the enhanced DCI may be applied to the compact DCI or WUS like signal described above and when a new search space to which the compact DCI is transmitted is additionally generated, only the enhanced UE monitors the corresponding search space to receive the multi TB scheduling information.

In this case, information related to the search space to which the compact DCI is transmitted may be delivered through the SC-MCCD payload and as described in Embodiment 5, the transmission times of the legacy NPDSCH and the new NPDSCH may be configured according to a specific rule.

When the method of Embodiment 7 is used, since the separate carrier need not be defined for one service, the eNB may not send the service information to different positions twice.

However, the enhanced DCI (or WUS like signal) should be configured in order to dynamically deliver multi scheduling information and the new SC-MTCH NPDSCH should be additionally transmitted before or after the legacy SC-MTCH NPDSCH.

Embodiment 8_Method for Independently Configuring New NPDSCH and Configuring Enhanced DCI for New NPDSCH The new NPDSCH for the SC-MTCH is present, which is independent from the legacy NPDSCH for the SC-MTCH, and the enhanced UE may recognize the multi TB scheduling NPDSCH by using the legacy DCI and the enhanced DCI (e.g., DCI for scheduling the multi TBs), and the SC-MCCH payload.

Specifically, through the SC-MTCH NPDCCH search space, the enhanced DCI for scheduling the multi TBs may be transmitted in addition to the legacy DCI. In this case, the enhanced DCI may include scheduling information (e.g., a scheduling delay between multi NPDSCHs, the number of TBs, a multi TB dedicated MCS index, etc.) related to the scheduling of the multi TBs which are not transmitted to the legacy DCI.

Accordingly, the payload size of the enhanced DCI may be equal to or smaller than the payload size of the legacy DCI. Furthermore, the new SC-MTCH NPDSCH for the enhanced UE may be independently configured regardless of the legacy SC-MTCH NPDSCH.

The eNB may add and transmit the scheduling information of the new SC-MTCH NPDSCH to the SC MCC payload and the payload of the enhanced DCI so as for the enhanced UE to decode and recognize the scheduling information together with the information included in the payload of the legacy DCI to be transmitted in the SC-MTCH NPDSCH search space.

Embodiment 8 is different from Embodiment 7 in that the eNB may independently configure the legacy SC-MTCH NPDSCH and the enhanced SC-MTCH NPDSCH.

Additionally, the eNB may indicate whether the legacy SC-MTCH NPDSCH is included in the multi TB scheduling NPDSCH through a specific method (e.g., a specific field or reserved state of the legacy (or enhanced) DCI for scheduling the SC-MCCH payload or SC-MTCH NPDSCH).

When the legacy SC-MTCH NPDSCH is included in the multi TB scheduling NPDSCH, the enhanced UE may recognize both the legacy SC-MTCH NPDSCH and the new SC-MTCH NPDSCH as the multi TB scheduling NPDSCH and receive both SC-MTCH NPDSCHs as described in Embodiment 7.

When the legacy SC-MTCH NPDSCH is included in the multi TB scheduling NPDSCH, the transmission times of the legacy NPDSCH and the new NPDSCH may be configured according to a specific rule as described in Embodiment 5.

In such a method, since the separate carrier need not be defined for one service, the eNB need not transmit the same service information to different positions twice. However, the enhanced DCI (or WUS like signal, etc.) for dynamically delivering the multi scheduling information may be required.

Furthermore, the new SC-MTCH NPDSCH should be additionally transmitted before or after the legacy SC-MTCH NPDSCH.

As yet another embodiment of the present disclosure, the following collision handling may be additionally applied to Embodiments 5 to 8. That is, when a collision (e.g., including even a part or all, or a processing time) occurs between the SC-MTCH NPDCCH search space and the new NPDSCH, a priority indicating which operation the UE will first perform) should be determined.

First, when the eNB configures the new NPDSCH to collide with the SC-MTCH NPDCCH search space, the UE may regard that the new NPDSCH is not transmitted and monitor the SC-MTCH NPDCCH search space.

That is, monitoring the SC-MTCH NPDCCH search space may have a higher priority than receiving the new NPDSCH.

In this case, the UE may continuously monitor the SC-MTCH NPDCCH search space and may not miss that the eNB dynamically schedule the SC-MTCH NPDSCH.

Second, when the eNB configures the new NPDSCH to collide with the SC_MTCH NPDCCH search space, the UE may receive the new NPDSCH without monitoring the SC_MTCH NPDCCH search space.

That is, receiving the new NPDSCH may have the higher priority than monitoring the SC-MTCH NPDCCH search space.

In this case, when the eNB indicates the multi TB scheduling to the enhanced UE, the UE may determine that the multi TB scheduling is indicated to transmit the new NPDSCH, and as a result, it may be preferable that the enhanced UE receives the new NPDSCH. Meanwhile, since a UE that does not know information in which a new corresponding NPDSCH is transmitted does not detect the DCI in spite of monitoring the search space, the UE should monitor a next search space.

Embodiment 9_Method for Re-Searching DCI when Searching DCI is Skipped

Figure 18:
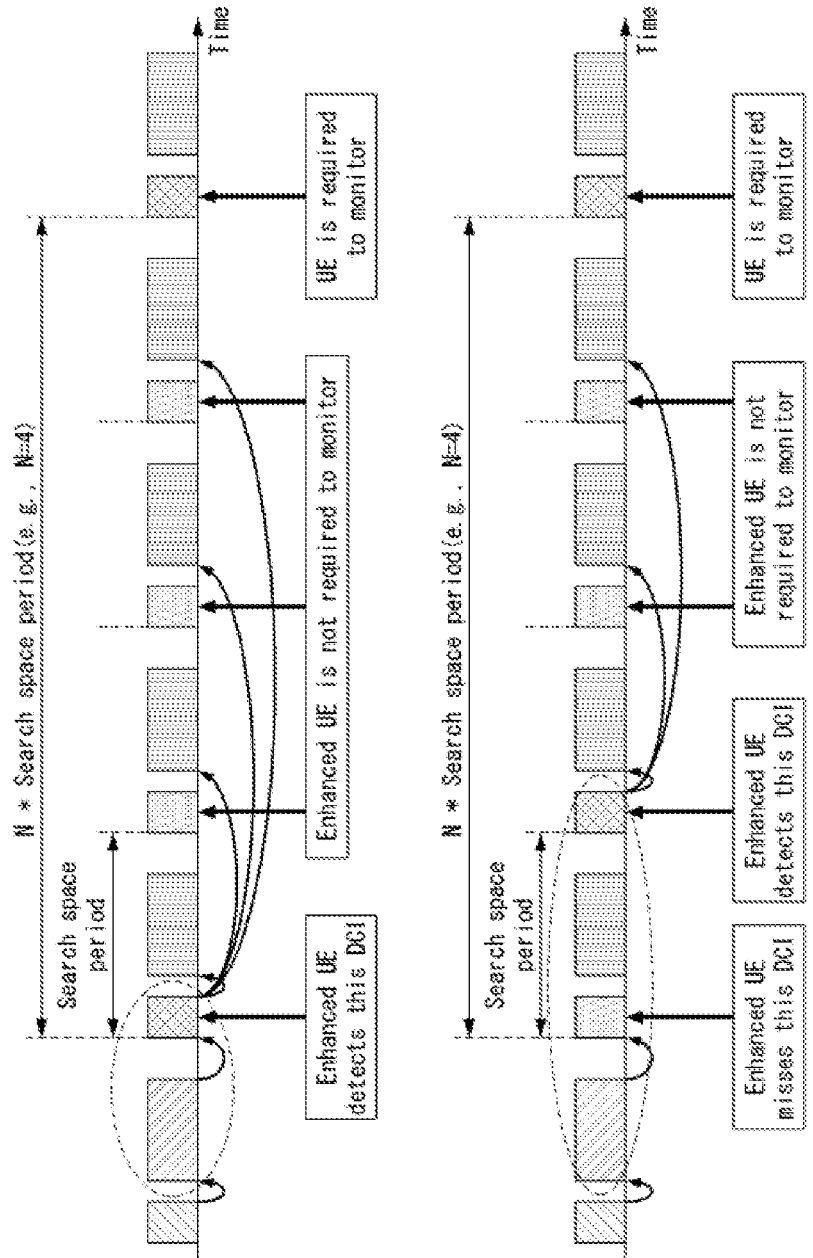
FIG. 18 is a diagram illustrating further still yet another example of multi TB scheduling for a single cell multicast control channel (SC-MCCH) proposed in the present disclosure.

FIG. 18 is a diagram illustrating further still yet another example of multi TB scheduling for a single cell multicast control channel (SC-MCCH) proposed in the present disclosure.

In the methods described in Embodiments 1 to 8, in embodiments in which the enhanced UE may know that subsequently transmitted NPDSCHs are the multi TB scheduling through the SC-MCCH payload or the SC-MTCH payload and the legacy DCI (e.g., for the DCI for scheduling the SC-MTCH), there may be a case where the UE is not capable of receiving the DCI for scheduling the NPDSCH for transmitting the multi TBs by skipping the DCI.

In this case, as illustrated in FIG. 18, the UE receives the DCI transmitted in the search space after the skipped DCI again to recognize the scheduling information for the multi TB scheduling. In this case, period information (or number information) indicating the number of NPDSCHs for the SC-MTCH which the UE may receive without monitoring the DCI after receiving the DCI once may be included in the DCI and transmitted to the UE.

For example, when the period information is configured to a value acquired by multiplying a search space period by the number of NPDSCHs which may be received after first DCI reception as illustrated in FIG. 18, the UE may search DCI for TB scheduling in a search space after a time indicated by the period information again.

In this case, when the UE is not capable of search first DCI by skipping the first DCI as illustrated in FIG. 18(b), the UE may monitor and receive the DCI in the subsequent search space and receive the NPDSCH for transmitting the multi TBs without searching the DCI up to the time indicated by the period information.

Specifically, the enhanced UE may determine that the legacy DCI subsequently transmitted is skipped through the SC-MCCH payload or the SC-MTCH payload and the legacy DCI.

In this case, the UE may be configured to monitor the legacy DCI requisitely every multi TB scheduling refresh period which is the period information configured by the eNB.

When it is assumed that the period of the search space in which the corresponding legacy DCI may be transmitted is T, the UE should requisitely monitor the legacy in a search space which is present every T*N times.

In this case, when a search space which is first present based on a 'specific time' is expressed as a first search space, the legacy DCI may be configured to be continuously monitored in an N*n+1-th (n=0, 1, 2, . . . ) search space.

In this case, the 'specific time' may be SFN or HSFN and may be a modification period or a period of a search space in which the DCI for scheduling the SC-MCCH is delivered. When the legacy DCI is skipped in the corresponding search space, the UE may monitor the legacy DCI at a position of the next search space.

In such a scheme, when searching the legacy DCI in a specific search space is successful, the UE may implicitly know how many multi TBs are subsequently scheduled and the UE may know where a last NPDSCH is terminated in advance.

Thereafter, the UE may be configured to need to monitor the legacy DCI again from a subsequently located search space.

As illustrated in FIG. 18, when the eNB configures N to 4, the enhanced UE should continuously monitor the legacy DCI in a 4n+1-th (n=0, 1, 2, . . . ) search space after receiving the SC-MCCH.

FIG. 18(a) illustrates a case where the enhanced UE receives and successfully searches DCI which is first located. Accordingly, the enhanced UE may not receive the legacy DCI a total of three times after successfully searching the corresponding legacy DCI.

FIG. 18(b) illustrates a case where the enhanced UE receives the SC-MCCH and may not receive the first legacy DCI by skipping the legacy DCI. Since the enhanced UE may not receive the DCI, the enhanced UE monitors the legacy DCI in the next search space again and in this case, when the enhanced UE successfully searches the corresponding DCI, the UE may then receive the NPDSCH without receiving the legacy DCI a total of two times.

Additionally, the eNB may configure Embodiment 9 as N times of the search space period of the legacy DCI, but Embodiment 9 may also be applied to a situation in which the eNB indicates the SFN or HSFN as a reference or a specific timing window and also applied to a situation indicated as a form related to the period of the search space in which the DCI for scheduling the SC-MCCH is transmitted.

The method of Embodiment 9 may be as follows in a case defined based on an absolute time such as the SFN or HSFN.

The eNB may be configured to continuously monitor the search space in which the legacy DCI which is present after the radio frame equal to or larger than specific SFN may be delivered to the UE and the UE may be configured to skip search spaces after decoding the legacy DCI.

In this case, the specific SFN may be given by combining a predetermined equation and a number configured by the eNB, such as SFN mod K=0 (for example, K=64, SFN=0, 64, 128, 192, . . . ) or the eNB may directly configure a specific SFN set to the UE.

Alternatively, when the legacy DCI is successfully decoded even once while monitoring the search space in time order during a 'specific timing window', monitoring another search space within the corresponding timing window may be skipped.

The 'specific timing window' may be expressed as the SFN or HSFN which is based on the absolute time or expressed as a multiple of a search space period in which the corresponding legacy DCI may be searched.

For example, the eNB may indicate K SFNs as the 'specific timing window' by starting from SFN 0 and if the eNB indicates K as 64, respective timing windows such as SFN 0 to SFN 63 and SFN 64 to SFN 127, etc., may be configured as in the example presented above and the same operation as the aforementioned example may be performed.

Additionally, after DCI skip is applied to the UE, an operation for skipping the DCI may be turned off according to the following rule.

First, by adding a separate indicator (e.g., DCI skipping off indicator) for turning off the skip operation of the DCI to the SC-MTCH payload, the eNB may explicitly indicate the turn-off of the skip operation of the DCI to the UE.

Further, when the NPDSCH for delivering the SC-MTCH has a specific resource form (e.g., when the number of repetition times of the NPDSCH is larger or smaller than a threshold designated by the eNB or a predetermined threshold), the operation for skipping the DCI may be configured to be turned off.

Alternatively, the period of the search space in which the DCI for scheduling the SC-MTCH known through the SC-MCCH may be searched is larger than configured by the eNB or a predetermined threshold, the operation for skipping the DCI may be configured to be turned off.

In this case, turning off the operation for skipping the DCI may be the same as a meaning that the UE should monitor the search space in which the legacy DCI (e.g., DCI for scheduling the SC-MTCH) may be delivered.

Further, among the embodiments, in a method in which the enhanced UE may know that the NPDSCHs subsequently transmitted are the multi TB scheduling through the SC-MCCH payload or SC-MTCH payload and the legacy DCI (e.g., DCI for scheduling the SC-MTCH), the eNB may notify, to the UE, the number of times (e.g., RMIN) of minimally repeatedly transmitting the NPDSCH (e.g., NPDSCH for delivering the SC-MTCH) which is scheduled by the multi TBs through the SC-MCCH payload or SC-MTCH payload.

In this case, the eNB may variably configure the number of repetition times of the NPDSCH each time by using the legacy DCI, but the enhanced UE may skip the corresponding legacy DCI, and as a result, the number of repetition times of the actual NPDSCH may be received based on a value known in DCI which first search is successful.

However, when the number of repetition times which is known in the DCI of which initial search is successful is a significantly large value and other NPDSCHs are repeatedly transmitted with a value smaller than the corresponding number of repetition times, the enhanced UE recognizes that the NPDSCH is transmitted in a region where the eNB does not transmit the NPDSCH and decodes unnecessary values at an invalid position.

Accordingly, when the eNB notifies, to the UE, the defined RMIN in advance, the UE may know the minimum number of repetition times of the NPDSCHs in which the multi TBs are scheduled.

Accordingly, the UE may be configured to receive and decode the NPDSCHs as large as the corresponding RMIN and when the number of repetition times included in the legacy DCI which is additionally successfully searched is lager than RMIN, the UE may determine that the corresponding number of repetition times only to the NPDSCH scheduled by the corresponding DCI and may be configured not to apply the number of repetition times of other NPDSCHs.

Additionally, in a method in which the enhanced UE may know that the NPDSCHs subsequently transmitted are the multi TB scheduling through the SC-MCCH payload or SC-MTCH payload and the legacy DCI (e.g., DCI for scheduling the SC-MTCH), the eNB may notify, to the enhanced UE, the number of times not used or the number of repetition times usable by the legacy DCI (e.g., DCI for scheduling the SC-MTCH) through the SC-MCCH payload or the SC-MTCH payload.

In this case, when the enhanced UEs monitor the search space in which the legacy DCI is delivered, the number of NPDCCH candidates which should be subjected to blind decoding may be reduced.

For example, when RMAX of the corresponding search space delivered through the SIB is 16, the UE should detect the DCI by decoding a total of 15 NPDCCH candidates of one NPDCCH candidate corresponding to the number of repetition times of 16, two NPDCCH candidates corresponding to the number of repetition times of 8, four NPDCCH candidates corresponding to the number of repetition times of 4, and eight NPDCCH candidates corresponding to the number of repetition times of 2 for the NPDCCH candidates in the corresponding search space.

In such a situation, when the eNB notifies, to the UE, that RMAX/8 (e.g., 16/8=2) is not used among the corresponding number of repetition times of NPDCCH through the SC-MCCH payload or SC-MTCH payload, the enhanced UE just need to blind-decode only seven NPDCCH candidates except for old fifteen NPDCCH candidates, and as a result, power consumption of the UE may be reduced and it may be advantageous in terms of management of a buffer.

When it is notified that only RMAX/2 (e.g., 16/2=8) among the numbers of repetition times of the NPDCCH is used through the SC-MCCH payload or SC-MTCH payload, the enhanced UE needs to perform blind decoding only in two NPDCCH candidates of which the number of repetition times is 8 among old 15 NPDCCH candidates.

Furthermore, when the eNB notifies, to the enhanced UE of which the skip of the DCI is permitted, that respective legacy DCIs for scheduling the combined NPDSCHs by the multi TB scheduling are the same as each other, the UE may search the legacy DCI like searching an already known signal without performing DCI blind decoding in a subsequent search space through the corresponding information. In this case, a battery life-span of the UE may increase.

Multi TB Scheduling of NB-IoT for Two HARQ Processes

Hereinafter, a method for scheduling the multi TBs when supporting two HARQ processes will be described. In the case of two HARQ processes, since there may be a case of allocating only grants in the same direction (e.g., uplink or downlink) and a case of allocating grants in different directions, two cases for the multi TB scheduling will be separately described.

First, operations of the UE and the eNB related to two HARQ processes will be described.

Figure 19:
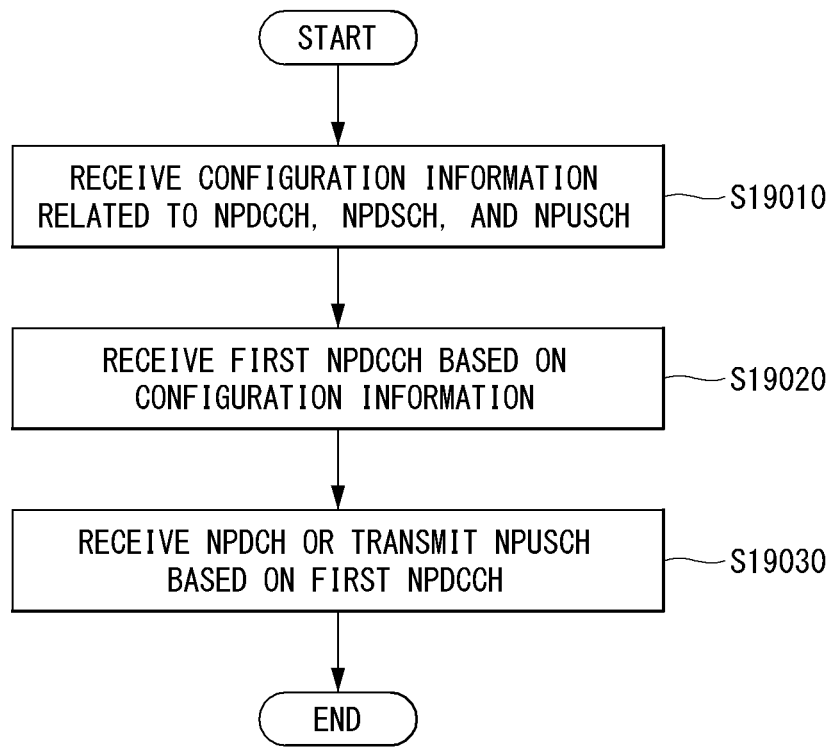
FIG. 19 is a flowchart illustrating an example of a UE operation related to a unicast to which a method proposed in the present disclosure may be applied.

FIG. 19 is a flowchart illustrating an example of a UE operation related to a unicast to which a method proposed in the present disclosure may be applied.

First, the UE may receive, from the eNB, configuration information related to NPDCCH, NPDSCH, and/or NPUSCH procedures through a higher layer signaling (S19010). In this case, when a configuration related to the NPDCCH, NPDSCH, and/or NPUSCH procedures is predefined (e.g., fixed), step S19010 may be omitted.

The UE may receive (or monitor) a first NPDCCH in a search space configured based on the configuration information. In this case, the UE may be delivered (i.e., receive), from the eNB, a DL grant of scheduling an NPDSCH or a UL grant of scheduling an NPUSCH through the corresponding first NPDCCH (S19020).

The UE may receive the NPDSCH or transmit the NPUSCH according to information indicated by the DL grant or the UL grant allocated from the eNB (S19030).

Figure 20:
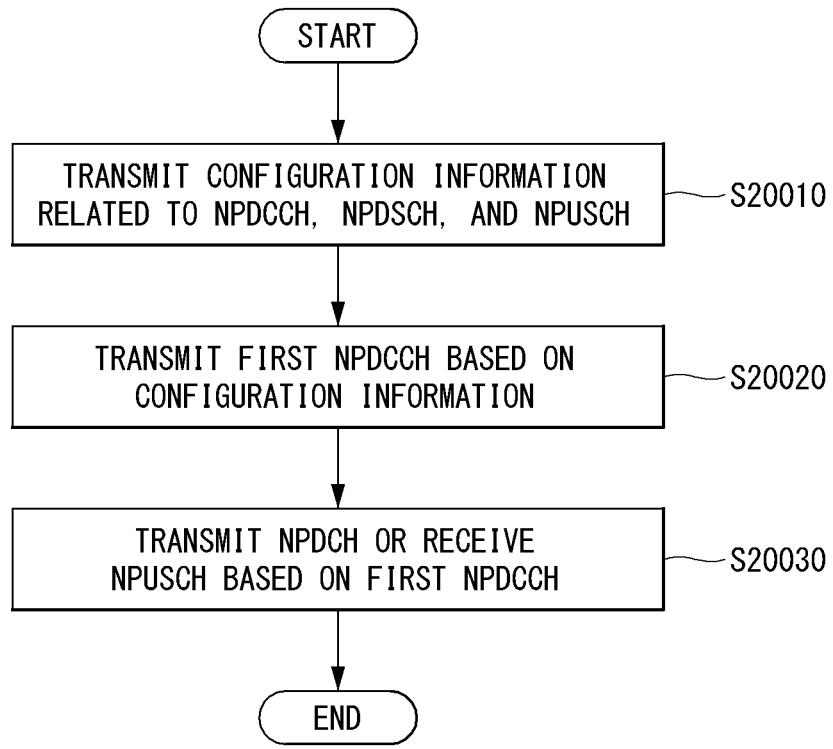
FIG. 20 is a flowchart illustrating an example of a BS operation related to a unicast to which a method proposed in the present disclosure may be applied.

FIG. 20 is a flowchart illustrating an example of a BS operation related to a unicast to which a method proposed in the present disclosure may be applied.

First, the eNB may transmit, to the UE, configuration information related to NPDCCH, NPDSCH, and/or NPUSCH procedures through a higher layer signaling (S20010). In this case, when a configuration related to the NPDCCH, NPDSCH, and/or NPUSCH procedures is pre-defined (e.g., fixed), step S20010 may be omitted.

The eNB may transmit a first NPDCCH in a search space configured based on the configuration information. In this case, the eNB may deliver (i.e., transmit), to the UE, a DL grant of scheduling the NPDSCH or a UL grant of scheduling the NPUSCH through the corresponding first NPDCCH (S20020).

The eNB may transmit the NPDSCH or receive the NPUSCH according to information indicated by the DL grant or the UL grant (S20030).

Referring to the procedures described in FIGS. 19 and 20 described above, the multi TB scheduling proposed in the present disclosure may be used or applied for transmission and reception of the NPDSCH/NPUSCH.

Hereinafter, a multi TB scheduling method for two following cases will be described.

Case 1: NPDSCHs, NPUSCHs
Case 2: NPDSCH+NPUSCH, NPUSCH+NPDSCH,

Embodiment 10_Multi TB Scheduling Method in Case of Case 1

First, a method for scheduling multi TBs delivering data of the same direction will be described. First, an HARQ process number, resource allocation, MCS, scheduling delay, etc., may be configured so that NPDSCHs (NPUSCHs) for scheduling multi TBs share a common value.

Further, the following parameters may be dynamically configured for efficient multi TB scheduling.

(1) Maximum Number of Scheduling TBs

The maximum number of scheduling TBs considering two HARQ processes may be 2. If the maximum number is 2, the UE knows that multi TBs (e.g., 2 TBs) are delivered through enhanced DCI in advance, information need not be additionally separately notified through the DCI.

However, a case where the maximum number of scheduling TBs is 3 or more (e.g., when the UE receives three or more NPDSCHs based on the enhanced DCI) may be considered. For example, when the maximum number of scheduling TBs is 'T' (T is a positive integer larger than 2), the eNB and the UE may perform the HARQ process through the HARQ process number indicated through the DCI for a first NPDSCH and a second NPDSCH.

A third NPDSCH may be received through the HARQ process number used by the first NPDSCH after a scheduling delay (or by a scheduling delay predetermined by the RRC or SIB) from a time when all HARQ processes of the first NPDSCH are terminated.

A fourth NPDSCH may also be received through the HARQ process number used by the second NPDSCH after a scheduling delay (or by a scheduling delay predetermined by the RRC or SIB) from a time when all HARQ processes of the second NPDSCH are terminated.

In such a method, the HARQ process numbers of odd-numbered NPDSCHs are the same and the HARQ process numbers of even-numbered NPDSCHs are the same, data may be transmitted and received without timing ambiguity between the UE and the eNB.

Unlike such a method, the HARQ process number of the third NPDSCH may start to be transmitted by using an HARQ process number in which the HARQ process is first terminated of the first NPDSCH or the second NPDSCH.

When such a method, resource utilization is improved, and as a result, a data rate of a system is improved.

(2) MCS

When two or more TBs are scheduled through the enhanced DCI, it is preferable that target MCLs of corresponding multi TBs should be the same or similar, the multi TBs may have a similar code rate and a similar repetition level.

Accordingly, one MCS value and $N_{SF}$ (e.g., the number of subframes required for TB of Repetition=1) are indicated through the enhanced DCI and a first TB may be interpreted as an indicated value and only $N_{SF}$ is indicated from a second TB, and as a result, the MCS may be selected to have the same value as a code rate made by the MCS and the $N_{SF}$ used in the previous TB.

Alternatively, only the MCS value is indicated from the second TB, and as a result, $N_{SF}$ may be selected to have the same value the code rate made by the MCS and the $N_{SF}$ used in the previous TB.

In such a configuration, the MCS and the $N_{SF}$ just need to be indicated only once for the first TB and only the MCS or the $N_{SF}$ just needs to be indicated from the subsequent TB.

(3) Scheduling Delay

When two or more TBs are scheduled by the enhanced DCI, a method for indicating the scheduling delay by the enhanced DCI may be significantly divided by the following methods.

(Method 1): An actual scheduling delay value may be delivered to the UE through the enhanced DCI. In this case, only one value for the scheduling delay value may be transmitted to the UE and the transmitted scheduling delay value may be used as a scheduling delay between all TBs (e.g., an interval from a last subframe in which an NPDSCH for delivering the previous TB is transmitted up to a first subframe in which an NPDSCH for delivering a next TB is transmitted).

The scheduling delay value may be independently delivered to the UE as large as the number of TBs actually scheduled for dynamical scheduling of the eNB. In this case, when all scheduling delay values are independently delivered through the enhanced DCI, if the number of scheduled TBs becomes large, the corresponding field may also be large together.

Accordingly, the values may be configured to be determined based on a normal subframe and configured to be determined based on a valid subframe. As compared with a method similarly used among all TBs by using one value, in a method for independently delivering the scheduling delay values for each TB, the scheduling delay may be completely dynamically transmitted to the UE.

(Method 2): Both the actual scheduling delay value and a scheduling delay offset may be transmitted through the enhanced DCI. In this case, the position of the NPDSCH for delivering the first TB may be determined according to the indicated scheduling delay value and by transmitting both the scheduling delay and the scheduling delay offset from the NPDSCH for delivering the second TB, the UE may determine the starting subframe according to a value calculated by using the scheduling delay value and the scheduling delay offset value.

For example, when the scheduling delay is referred to as 'X' and the scheduling delay offset is referred to as 'P', a starting subframe of the NPDSCH for scheduling an N-th TB may be expressed as n+X+(N−1)*P.

In this case, n may indicate a last subframe in which the NPDCCH for scheduling the multi TBs is delivered or indicate a last subframe in which an NPDSCH transmitted just immediately before is delivered. The values may be configured to be determined based on the normal subframe and configured to be determined based on the valid subframe.

In such a method, the length of the enhanced DCI may be made to be small and a certain degree of dynamic scheduling delay may be indicated.

Embodiment 11_Multi TB Scheduling Method in Case of Case 2

Next, a method for scheduling multi TBs delivering data of an opposite direction will be described. First, an HARQ process number, resource allocation, MCS, scheduling delay, etc., may be configured so that NPDSCH and the NPUSCH for scheduling multi TBs share a common value.

For efficient multi TB scheduling, parameters mentioned in Case 1 of Embodiment 10 may be configured similarly even in Case 2 in Embodiment 11. Additionally, interlacing the NPDSCH and the NPUSCH may also be considered in a TDD situation and the UE and the eNB may perform additional operations including grant mixing, UCI piggyback, and the like.

Embodiment 11-1_Method for Scheduling NPUSCH Transmission Earlier

When the NPDSCH is scheduled to be additionally received while the NPUSCH transmission is performed earlier in the multi TB scheduling, a retransmission grant of the NPUSCH transmitted by the UE as above may be delivered through the NPDSCH.

When the NPDSCH is scheduled to be additionally received while the NPUSCH transmission is performed earlier through the multi TB scheduling, the eNB may incorporate a retransmission UL grant for the NPUSCH earlier transmitted by the UE in subsequently scheduled NPDSCH data and transmit the retransmission UL grant.

In this case, the UE should transmit the NPUSCH corresponding to the corresponding retransmission UL grant and may be configured to deliver ACK/NACK corresponding to NPDSCH data scheduled earlier together.

When such a method is used, since a search space which the UE need not monitor is generated when receiving the corresponding retransmission UL grant through the NPDSCH, the power consumption of the UE may be reduced.

Embodiment 11-2_Case where UL Grant or DL Grant Indicated to be Next Performed is Included in Part of NPDSCH When the UL grant or DL grant is incorporated in the NPDSCH and transmitted without using the enhanced DCI for scheduling the multi TBs, the UE may transmit and receive a next NPUSCH or NPDSCH.

Embodiment 11-2 may also correspond to a case where the UL grant or DL grant indicated to be next performed is incorporated in a part of the corresponding NPDSCH after receiving the DL grant through the legacy DCI.

When the UE receives such a UL grant or DL grant, the UE may transmit the NPUSCH or receive the NPDSCH through the subframe after a scheduling delay included in the UL/DL grant from a termination time (or from a time of terminating the corresponding HARQ process) of the NPDSCH which is previously received.

The UL/DL grant may include all scheduling information included in the legacy DCI.

In Embodiment 11-2, the multi TB scheduling is available without the enhanced DCI, and when the UL/DL grant is received through the NPDSCH, since a search space which the UE need not monitor is generated, the power consumption of the UE may be reduced.

For example, the UE that receives the DL grant through an initial NPDCCH receives an NPDSCH for the DL grant. Actual data is also included in the corresponding NPDSCH, but the UL grant or DL grant may also be included.

When the UL grant is included, the UE may transmit the NPUSCH in a resource scheduled by the corresponding UL grant and deliver the ACK/NACK for the NPDSCH data which is previously received together.

When the DL grant is included, the UE may transmit, to the eNB, the ACK/NACK for the NPDSCH data which is previously received through the NPUSCH which is already scheduled while receiving the NPDSCH corresponding to the corresponding DL grant.

Multi-TB Scheduling with Different DCI Payload Size

When the payload size of the DCI for scheduling a single TB and the payload size of the DCI for scheduling the multi TBs are different from each other, the multi TB scheduling may be activated/deactivated through the DCI without configuring an additional search space.

That is, when the payload size of the DCI for scheduling the single TB and the payload size of the DCI for scheduling the multi TBs are different from each other, 1 bit for indicating activation of the DCI for scheduling the multi TBs is added to the DCI for scheduling the single TB and 1 bit for indicating deactivation of the multi TB scheduling is added to the DCI for scheduling the multi TBs to schedule the multi TBs with no increase of a BD of the UE without introducing the additional search space.

Hereinafter, the operation of the UE will be described.

Figure 21:
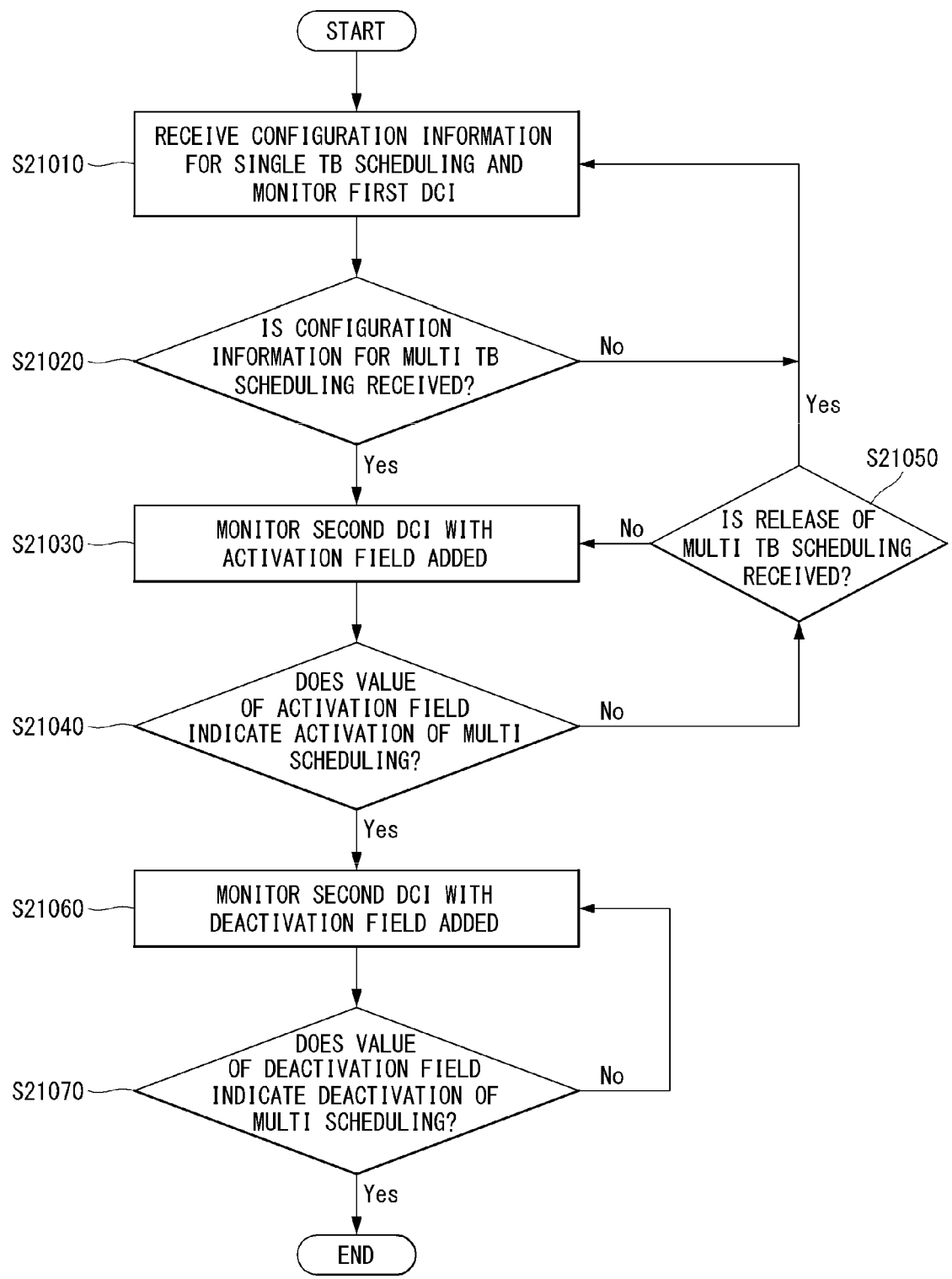
FIG. 21 is a flowchart illustrating an example of a UE operation for multi TB scheduling to which a method proposed in the present disclosure may be applied.

FIG. 21 is a flowchart illustrating an example of a UE operation for multi TB scheduling to which a method proposed in the present disclosure may be applied.

The UE may receive, from the eNB, configuration information for single TB scheduling and/or configuration information for multi TB scheduling through a higher layer signaling and the UE may monitor first DCI (e.g., single-TB scheduling DCI) pre-defined for the single TB scheduling in a search space (S21010).

When the UE receives, from the eNB, configuration information related to the multi TB scheduling, the UE may monitor second DCI (e.g., single-TB scheduling DCI with an activation field added) including a specific field indicating whether the multi scheduling is activated in the first DCI, in the search space (S21020 and S21030).

The UE may monitor second DCI or third DCI (e.g., multi TB scheduling DCI) pre-defined for the multi TB scheduling in a subsequent search space according to a value indicated by the specific field (S21040 and S21060).

For example, when the specific field indicates activation of the multi TB scheduling, the UE may monitor the third DCI in the subsequent search space. However, when the specific field does not indicate the activation of the multi TB scheduling, the UE determines whether to receive, from the eNB, a release of the multi TB scheduling (S21050).

Upon receiving the release of the multi scheduling, the UE returns to step S21010 again to receive, from the eNB, the configuration information for the single TB scheduling and/or the configuration information for the multi TB scheduling through the higher layer signaling and the UE may monitor the first DCI (e.g., single-TB scheduling DCI) pre-defined for the single TB scheduling in the search space.

However, when the UE does not receive the release of the multi TB scheduling, the UE returns to step S21030 to monitor the second DCI in the search space.

In this case, the third DCI may include a 1 bit field indicating whether the multi TB scheduling is deactivated.

When the 1 bit field has a value of 0 which does not indicate the deactivation of the multi scheduling, the UE may monitor the third DCI in a search space subsequent to the search space in which the third DCI is received and when the 1 bit field has a value of 1 indicating the deactivation of the multi TB scheduling, the UE may monitor the second DCI (S21070).

Hereinafter, the operation of the eNB will be described.

Figure 22:
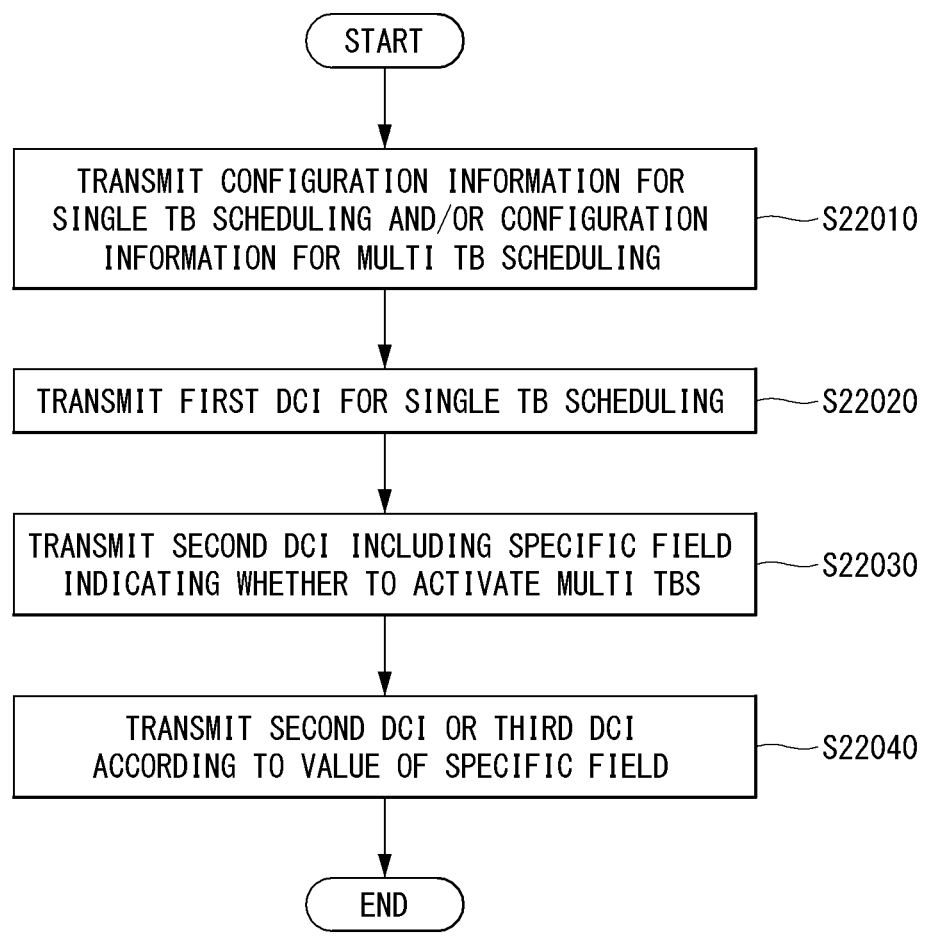
FIG. 22 is a flowchart illustrating an example of a BS operation for multi TB scheduling to which a method proposed in the present disclosure may be applied.

FIG. 22 is a flowchart illustrating an example of a BS operation for multi TB scheduling to which a method proposed in the present disclosure may be applied.

The eNB may transmit, to the UE, configuration information for single TB scheduling and/or configuration information for multi TB scheduling (S22010).

The eNB may transmit, to the UE, first DCI (e.g., single-TB scheduling DCI) pre-defined for the single TB scheduling, a search space (S22020).

When the eNB delivers, to the UE, configuration information related to the multi TB scheduling, the eNB may transmit second DCI (e.g., single-TB scheduling DCI with an activation field added) including a specific field indicating whether the multi scheduling is activated in the first DCI, in the search space (S22020).

The eNB may transmit second DCI or third DCI (e.g., multi TB scheduling DCI) pre-defined for the multi TB scheduling in a subsequent search space according to a value indicated by the specific field.

In this case, the third DCI may include a 1 bit field indicating whether the multi TB scheduling is deactivated. When the 1 bit field has a value of 0 which does not indicate the deactivation of the multi scheduling, the eNB may transmit the third DCI in a search space subsequent to the search space in which the third DCI is received and when the 1 bit field has a value of 1 indicating the deactivation of the multi TB scheduling, the UE may transmit the second DCI (S22030).

By using such a method, the multi TB scheduling may be activated or deactivated without an additional search space or blind decoding of the UE even when a size of the DCI for scheduling the single TB and the size of the DCI for scheduling the multi TBs are different from each other.

However, when the UE may not normally receive the DCI transmitted by the eNB in using the corresponding method, a DCI size mismatch between the UE and the eNB may occur.

When such a problem occurs, the UE continuously fails to monitor the search space and system performance deteriorates. Accordingly, in this case, a problem may be solved through the following method.

Embodiment 12

After the activation of the multi TB scheduling is indicated through the DCI for the single TB scheduling, a timing (on the contrary, after the deactivation of the multi TB scheduling is indicated through the DCI for the multi TB scheduling, the same principle may also be applied to a timing at which a search space in which the DCI for the single TB scheduling is reached) at which a search space in which the DCI for the multi TB scheduling should be monitored is reached may be accurately defined.

In this case, the UE and the eNB may transmit and receive the NPDSCH, the NPUSCH, etc., from and to each other and the UE and the eNB may confirm that the DCI is not skipped through the corresponding transmission and reception process.

For example, when the value of the activation field indicating the activation of the multi TB scheduling in the single TB scheduling is '1' (for example, when the eNB indicates to start monitoring for the multi TB scheduling) and the DCI for the corresponding single TB scheduling indicates the DL grant, the corresponding disclosure may be performed through the following method.

(1) First, both ACK/NACK transmission and retransmission for an HARQ process ID indicated to the corresponding DL grant are completed and the eNB may indicate, to the UE, that the corresponding HARQ process ID is for new data through new single TB scheduling DCI.

In this case, the UE may monitor multi TB scheduling DCI in a search space which is present subsequently.

(2) Second, when the NPDSCH for the corresponding DL grant is received and then the NACK is transmitted and an NDI (e.g., a new data indicator indicating new data) for the same HARQ process ID is then transmitted in a non-toggle state or when the NPDSCH for the corresponding DL grant is received and the NDI for the same HARQ process ID is then in a toggle state after transmitting the ACK, the UE may thereafter monitor the DCI for the multi TB scheduling in a search space which is present after transmitting A/N corresponding to the DCI transmitted together with the corresponding NDI.

In this case, the DCI indicating that the corresponding HARQ process ID is the new data may also be skipped together with the DCI indicating that the activation field for activating the multi TB scheduling is 1. Accordingly, since the eNB may also perform confirmation even after sending a response thereto and performing a DTX search with a DM-RS of an HARQ feedback at least, the UE should be able to monitor the search space after transmitting the A/N for the DCI transmitted together with the corresponding NDI.

In schemes (1) and (2), by considering a processing delay of a low complexity UE, a gap which is as large as a processing delay may be added to an accurate time of applying DCI monitoring for actual multi TB scheduling is applied.

As another example of the present disclosure, the corresponding method will be described with a detailed example as follows for a case where the value of the activation field for the DCI activation of the multi TB scheduling in the DCI for the single TB scheduling is 1 (for example, when the eNB indicates, to the UE, to start the monitoring for the scheduling of the multi TB) and the corresponding single TB scheduling DCI indicates the UL grant.

(1) First, when retransmission for the HARQ process ID indicated to the corresponding UL grant is fully completed and the eNB indicates that the corresponding HARQ process ID is for the new data through the new single TB scheduling DCI, the UE may monitor the multi TB scheduling DCI in a search space which is present subsequently.

(2) Second, after the same HARQ process ID is again scheduled (regardless of whether the NDI is toggled) after transmitting the NPUSCH for the corresponding UL grant, the UE may monitor the multi TB scheduling DCI in the search space which is present after transmitting the NPUSCH scheduled with the new single TB scheduling DCI.

In schemes (1) and (2), by considering a processing delay of a low complexity UE, a gap which is as large as a processing delay may be added to an accurate time of applying DCI monitoring for actual multi TB scheduling is applied.

When the accurate timing is defined as above, the UE and the eNB may transmit and receive one or more NPDSCHs, NPUSCHs, etc., to and from each other until monitoring by changing a DCI format and the UE and the eNB may confirm that the DCI is not skipped through the corresponding transmission and reception process.

Embodiment 13

Some candidates of a specific UE specific search space (e.g., USS) may be continuously configured for the single TB scheduling. That is, in the USS which is present after receiving the configuration information related to the multi TB scheduling from the eNB through the RRC signaling, a minimum of k (k is a positive integer equal to or larger than 1) NPDCCH candidates may be used for the single TB scheduling.

In addition, remaining NPDCCH candidates acquired by subtracting k from all NPDCCH candidates may be configured for the multi TB scheduling.

When the NPDCCH is configured as above, since the UE may continuously perform a fallback operation without the increase of the blind decoding operation of the UE in spite of skipping the DCI transmitted from the eNB, the problems described above may be solved.

However, the candidate of the existing search space should be divided.

Embodiment 13-1

In Embodiment 13, since a single search space is divided, there is a concern that reception performance of the UE will deteriorate. Accordingly, Embodiment 13-1 proposes a method for maintaining the reception performance of the UE.

Specifically, a specific UE specific search space (e.g., USS) may be defined for the single TB scheduling and the remaining USS may be used for the multi TB scheduling.

That is, after the UE receives the configuration information related to the multi TB scheduling from the eNB through the RRC signaling, the USS which is present is counted from a hyper frame starting time, and as a result, the USS may be divided into a USS for the single TB scheduling and a USS for the multi TB scheduling according to the corresponding USS is even numbered or odd numbered.

In such a configuration, the UE may continuously perform the fallback operation without the increase of the blind decoding operation of the UE in spite of skipping the DCI transmitted from the eNB.

As such, in a situation in which the USS is divided into the USS for the single TB scheduling and the USS for the multi TB scheduling, whether to detect the USS which is subsequent may be determined according to scheduling indicated in the above USS.

That is, when the multi TB scheduling DCI is detected through a specific USS, the UE may omit NPDCCH/MPDCCH monitoring in subsequent USSs and the omitted section may include even a section in which ACK/NACK of scheduled multi TBs is completed.

Additionally, when the single TB scheduling DCI is detected through the specific USS, the UE may omit the NPDCCH/MPDCCH monitoring and the omitted section may include even a section in which ACK/NACK of a scheduled single TB is completed.

Embodiment 14

Instead of transmitting both the DCI for the multi TB scheduling and the DCI for the single TB scheduling to the existing single search space, the existing CSS which is present may be used. That is, the search space for the DCI fallback operation may be specified as the CSS.

That is, the USS which is present after the UE receives, from the eNB, the configuration information related to the multi TB scheduling through the RRC signaling may be used as the search space for transmitting the multi TB scheduling and the CSS may be used as the search space for transmitting the single TB scheduling DCI.

In this case, the CSS to be used for the fallback operation may be one of type-1 CSS and type-2 CSS (type-0 CSS may also be considered even for CE mode A of eMTC). When type-2 CSS is used as the search space for the fallback operation, since the structures of the USS and the NPDCCH candidate are similar to each other and the DCI format also adopts DCI format N1 of which payload size continuously matches the unicast in respect to the corresponding search space, the eNB may indicate the single TB scheduling by using DCI format N0 or N1 as it is.

In the case of CE mode B of eMTC, the same scheme may be applied to type-2 CSS mentioned above by using DCI format 6-0/1B. Additionally, since there is type-0 CSS continuously monitored in the case of CE mode A of eMTC, the corresponding CSS may be used for the fallback operation.

The single TB scheduling using DCI format 6-0/1A may be used in type-0 CSS and the multi TB scheduling may be used through the USS.

On the contrary, when type-1 CSS is used as the fallback operation, a DCI format (e.g., DCI format N2) not used for unicast transmission is used in the corresponding search space, and as a result, another method may be applied.

That is, the eNB may indicate the UE to receive the single TB scheduling DCI in the USS by introducing an L bit DCI field (e.g., L=1) into the DCI format N2 scrambled with a UE specific RNTI (e.g., C-RNTI) value.

The eNB may indicate the fallback operation to the UE through the corresponding field. When such a method is used, the DCI payload size matches the DCI payload size through a method such as zero padding in order to minimize an influence on a legacy operation to distinguish the corresponding DCI from DCI indicating the other thing without the increase of the blind decoding operation.

Even in the case of the eMTC, when type-1 CSS is used as the fallback operation, DCI format N2 of the aforementioned method may be changed to DCI format 6-2 and applied.

In Embodiments 1 to 14, a method for scheduling the multi TBs which may be applied to the NB-IoT system is described.

The method proposed in the present disclosure is basically based on DL/DL, but even though DL/DL is changed to UL/UL, DL/UL, or UL/DL, a nature of the present disclosure is not changed. Further, when DL is changed to UL, the NPUSCH may be applied instead of the NPDSCH and NPDSCH reception may be applied to NPUSCH transmission and DCI format N1 may be applied to DCI format N0.

Further, the method described in Embodiments 1 to 14 may be applied to the eMTC. In this case, DCI format N0/N1 may be changed to DCI format 6-0A,B/6-1A,B and applied and NPDSCH/NPUSCH may be changed to PDSCH/PUSCH and applied.

It is apparent that names of other search spaces may also be changed and applied according to names defined in the eMTC. Further, since 8 or more may be supported as the HARQ process number of the eMTC, even when a scheduling direction is irregularly changed like DL/UL/UL/DL/UL without termination in DL/UL or UL/DL, the method described in Embodiments 1 to 14 may be applied.

It is apparent that when various methods among the proposed methods are introduced, the payload size of the DCI monitored by the UE may vary according to the indication of the eNB.

Figure 23:
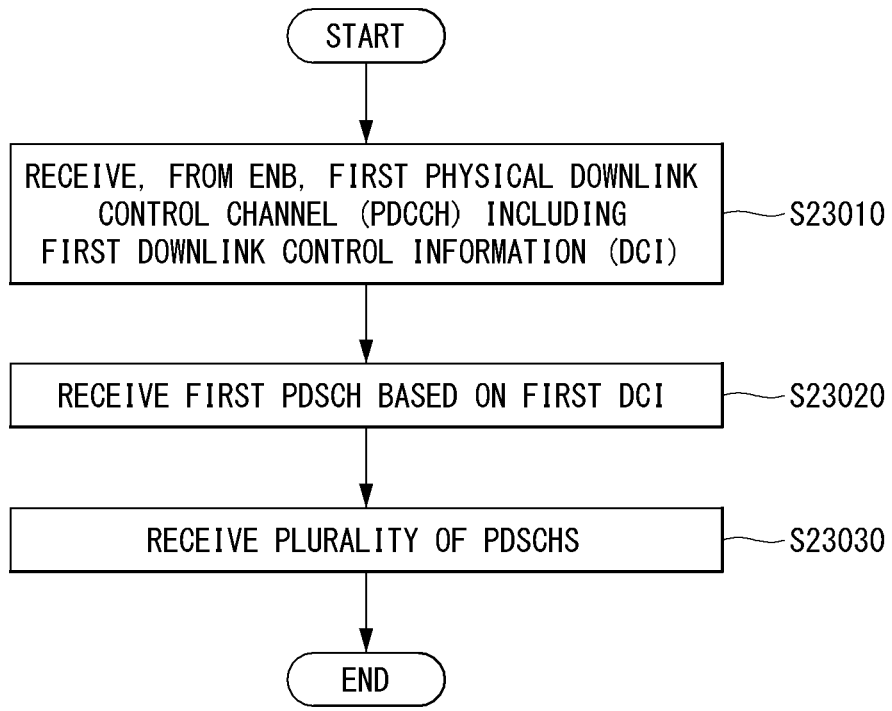
FIG. 23 is a flowchart illustrating an example of a UE operation for receiving downlink data through multi TB scheduling to which a method proposed in the present disclosure may be applied.

FIG. 23 is a flowchart illustrating an example of a UE operation for receiving downlink data through multi TB scheduling to which a method proposed in the present disclosure may be applied.

Referring to FIG. 23, when the multi TBs are configured and the UE receives DCI for scheduling the NPDSCH, the UE may then receive the NPDSCH without monitoring DCI subsequently transmitted.

Specifically, the UE receives, from the eNB, a first Physical Downlink Control Channel (PDCCH) including first Downlink Control Information (DCI) (S23010).

In this case, the PDCCH may be the NPDCCH for the SC-MCCH or the NPDCCH for the SC-MTCH described in Embodiments 1 to 14.

When the PDCCH is the NPDCCH for the SC-MCCH, the first DCI of the PDCCH may include scheduling information for scheduling a first PDSCH and the scheduling information may include the parameters described in Embodiments 1 to 14.

When the PDCCH is the NPDCCH for the SC-MTCH, the first DCI of the PDCCH may include scheduling information for scheduling multi TBs and the scheduling information may include the parameters described in Embodiments 1 to 14.

Thereafter, the UE may receive the first PDSCH based on the first DCI (S23020). In this case, the first PDSCH includes indication information indicating whether a multi transport block is scheduled.

That is, the UE may recognize whether the multi TBs are scheduled according to a value of the indication information.

Thereafter, the UE may receive a plurality PDSCHs (S23030). In this case, at least one PDSCH of the plurality of PDSCHs may be received without receiving a separate DCI according to the indication information.

For example, when the indication information indicates the scheduling of the multi TBs, the UE may receive at least one PDSCH without searching the DCI in a separate search space based on the scheduling information of the multi TBs included in the first DCI.

Figure 25:
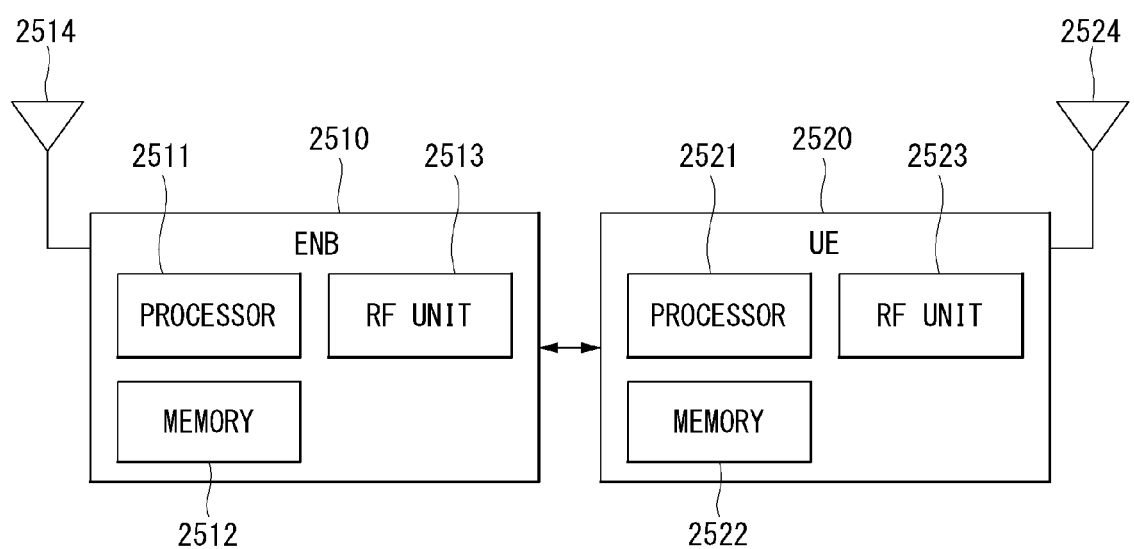
FIG. 25 illustrates a block diagram of a wireless communication device to which methods proposed in the present disclosure may be applied.
Figure 26:
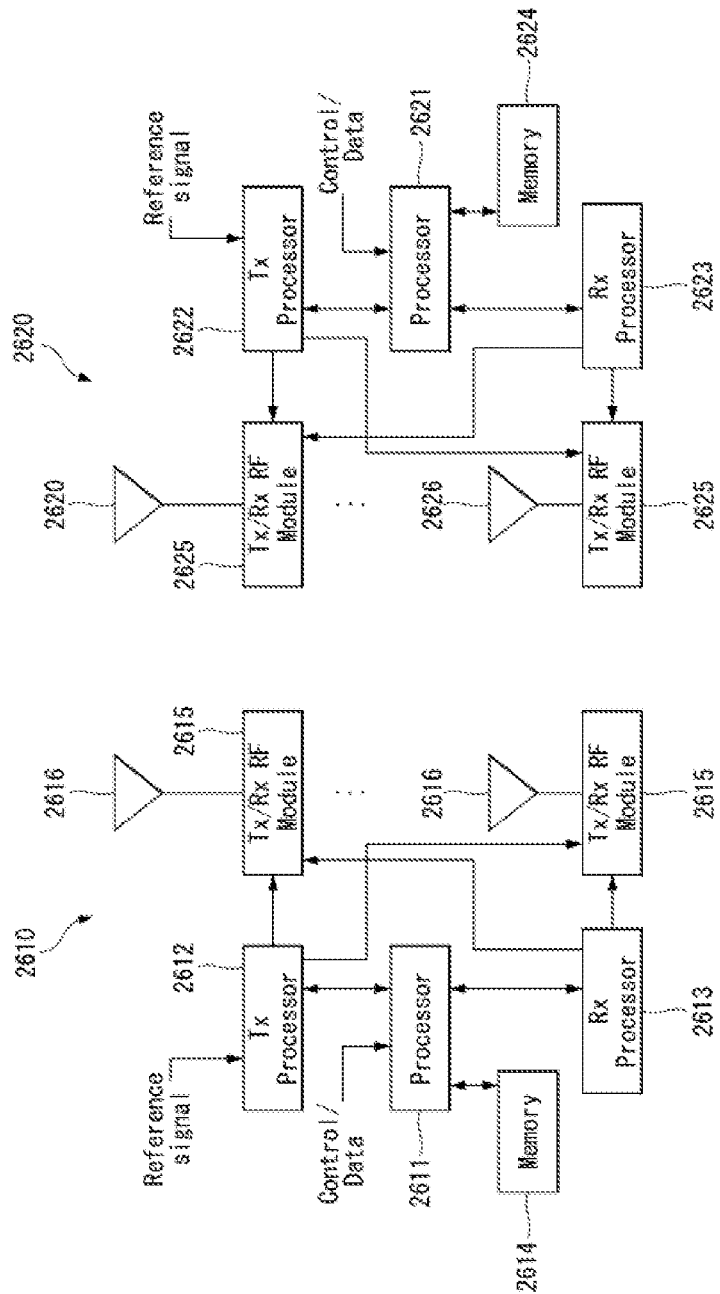
FIG. 26 illustrates another example of the block diagram of a wireless communication device to which methods proposed in the present disclosure may be applied.

In this regard, the operation of the UE described above may be specifically implemented by UE devices 2520 and 2620 illustrated in FIGS. 25 and 26 of the present disclosure. For example, the operation of the UE described above may be performed by processors 2521 and 2621 and/or RF units (or modules) 2523 and 2625.

Specifically, the processors 2521 and 2621 may control to receive, from the eNB, a first Physical Downlink Control Channel (PDCCH) including first Downlink Control Information (DCI) through RF units (or modules) 1723 and 1825.

In this case, the PDCCH may be the NPDCCH for the SC-MCCH or the NPDCCH for the SC-MTCH described in Embodiments 1 to 14.

When the PDCCH is the NPDCCH for the SC-MCCH, the first DCI of the PDCCH may include scheduling information for scheduling a first PDSCH and the scheduling information may include the parameters described in Embodiments 1 to 14.

When the PDCCH is the NPDCCH for the SC-MTCH, the first DCI of the PDCCH may include scheduling information for scheduling multi TBs and the scheduling information may include the parameters described in Embodiments 1 to 14.

Thereafter, the processors 2521 and 2621 may control to receive a first PDSCH based on the first DCI through the RF units (or modules) 2523 and 2625.

In this case, the first PDSCH includes indication information indicating whether a multi transport block is scheduled.

That is, the UE may recognize whether the multi TBs are scheduled according to a value of the indication information.

Thereafter, the processors 2521 and 2621 may control to receive a plurality of PDSCHs through the RF units (or modules) 2523 and 2625.

In this case, at least one PDSCH of the plurality of PDSCHs may be received without receiving a separate DCI according to the indication information.

For example, when the indication information indicates the scheduling of the multi TBs, the UE may receive at least one PDSCH without searching the DCI in a separate search space based on the scheduling information of the multi TBs included in the first DCI.

Figure 24:
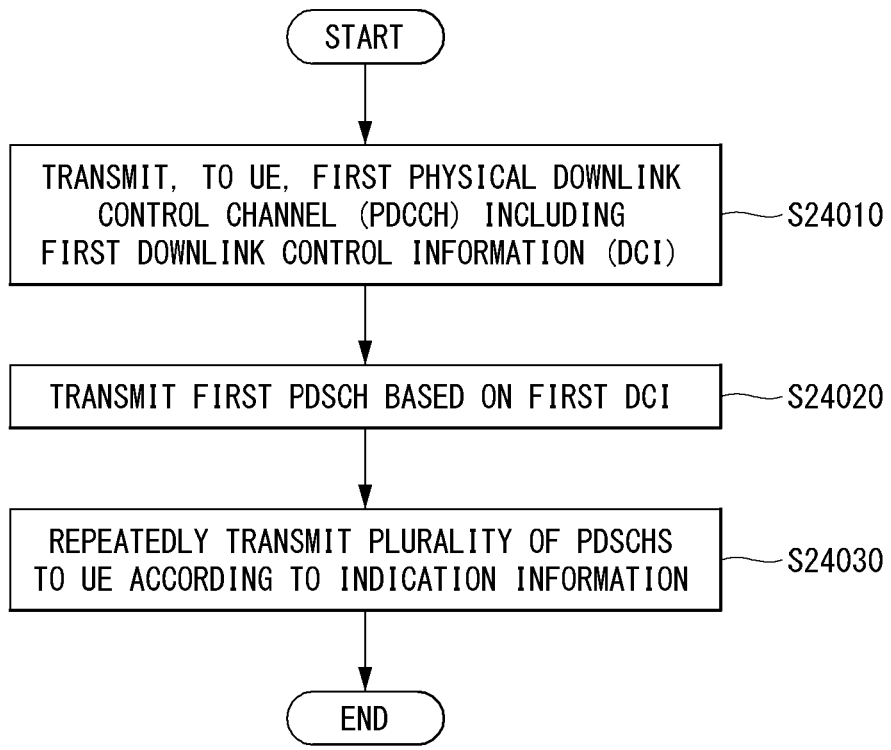
FIG. 24 is a flowchart illustrating an example of an eNB operation for transmitting downlink data through multi TB scheduling to which a method proposed in the present disclosure may be applied.

FIG. 24 is a flowchart illustrating an example of an eNB operation for transmitting downlink data through multi TB scheduling to which a method proposed in the present disclosure may be applied.

Referring to FIG. 24, when multi TBs are configured in the eNB, a plurality of NPDSCHs transmitted from the eNB may be scheduled through one DCI.

Specifically, the eNB transmits, to the UE, a first Physical Downlink Control Channel (PDCCH) including first Downlink Control Information (DCI) (S24010).

In this case, the PDCCH may be the NPDCCH for the SC-MCCH or the NPDCCH for the SC-MTCH described in Embodiments 1 to 14.

When the PDCCH is the NPDCCH for the SC-MCCH, the first DCI of the PDCCH may include scheduling information for scheduling a first PDSCH and the scheduling information may include the parameters described in Embodiments 1 to 14.

When the PDCCH is the NPDCCH for the SC-MTCH, the first DCI of the PDCCH may include scheduling information for scheduling multi TBs and the scheduling information may include the parameters described in Embodiments 1 to 14.

Thereafter, the eNB transmits the first PDSCH based on the first DCI (S24020).

In this case, the first PDSCH includes indication information indicating whether a multi transport block is scheduled.

That is, the eNB transmits the indication information to the UE to notify whether the multi transport block is scheduled to the UE.

Thereafter, the eNB repeatedly transmits the plurality of PDSCHs to the UE according to the indication information (S24030).

When the multi transport block is scheduled, the plurality of PDSCHs which is repeatedly transmitted may be scheduled through one DCI.

In this regard, the operation of the eNB described above may be specifically implemented by eNB devices 2510 and 2610 illustrated in FIGS. 25 and 26 of the present disclosure. For example, the operation of the eNB described above may be performed by the processors 2511 and 2611 and/or RF units (or modules) 2513 and 2615.

Specifically, the processors 2511 and 2611 may control to transmit, to the UE, a first Physical Downlink Control Channel (PDCCH) including first Downlink Control Information (DCI) through RF units (or modules) 1713 and 1815.

In this case, the PDCCH may be the NPDCCH for the SC-MCCH or the NPDCCH for the SC-MTCH described in Embodiments 1 to 14.

When the PDCCH is the NPDCCH for the SC-MCCH, the first DCI of the PDCCH may include scheduling information for scheduling a first PDSCH and the scheduling information may include the parameters described in Embodiments 1 to 14.

When the PDCCH is the NPDCCH for the SC-MTCH, the first DCI of the PDCCH may include scheduling information for scheduling multi TBs and the scheduling information may include the parameters described in Embodiments 1 to 14.

Thereafter, the processors 2511 and 2611 may control to transmit a first PDSCH based on the first DCI through the RF units (or modules) 2513 and 2615.

In this case, the first PDSCH includes indication information indicating whether a multi transport block is scheduled.

That is, the eNB transmits the indication information to the UE to notify whether the multi transport block is scheduled to the UE.

Thereafter, the processors 2511 and 2611 may control to repeatedly transmit a plurality of PDSCHs through the RF units (or modules) 2513 and 2615 according to information.

When the multi transport block is scheduled, the plurality of PDSCHs which is repeatedly transmitted may be scheduled through one DCI.

The NB-IoT is described as an example in FIGS. 7 to 24 and Embodiments 1 to 14 of the present disclosure, but it is apparent that the present disclosure is not limited thereto and may be applied to another field (e.g., MTC).

Overview of Devices to which Present Invention is Applicable

FIG. 25 illustrates a block diagram of a wireless communication device to which methods proposed by the present disclosure may be applied.

Referring to FIG. 25, a wireless communication system includes an eNB 2510 and multiple user equipments 2520 positioned within an area of the base station.

Each of the eNB and the UE may be expressed as a wireless device.

The eNB includes a processor 2511, a memory 2512, and a radio frequency (RF) module 2513. The processor 2511 implements a function, a process, and/or a method which are proposed in embodiment 1 to embodiment 14 above. Layers of a radio interface protocol may be implemented by the processor. The memory is connected with the processor to store various information for driving the processor. The RF module is connected with the processor to transmit and/or receive a radio signal.

The UE includes a processor 2521, a memory 2522, and an RF module 2523.

The processor implements a function, a process, and/or a method which are proposed in embodiment 1 to embodiment 14 above. Layers of a radio interface protocol may be implemented by the processor. The memory is connected with the processor to store various information for driving the processor. The RF module is connected with the processor to transmit and/or receive a radio signal.

The memories 2512 and 2522 may be positioned inside or outside the processors 2511 and 2521 and connected with the processor by various well-known means.

Further, the eNB and/or the UE may have a single antenna or multiple antennas.

The antennas 2514 and 2524 serve to transmit and receive the radio signals.

FIG. 26 illustrates another example of the block diagram of the wireless communication device to which the methods proposed in the present disclosure may be applied.

Referring to FIG. 26, a wireless communication system includes an eNB 2610 and multiple user equipments 2620 positioned within an area of the eNB. The eNB may be represented by a transmitting apparatus and the UE may be represented by a receiving apparatus, or vice versa. The eNB and the UE include processors (2611,2621), memories (2614,2624), one or more Tx/Rx radio frequency (RF) modules (2615,2625), Tx processors (2612,2622), Rx processors (2613, 2623) and antennas (2616, 2611). The processor implements a function, a process, and/or a method which are described above. More specifically, a higher layer packet from a core network is provided to the processor 2611 in DL (communication from the eNB to the UE). The processor implements a function of an L2 layer. In the DL, the processor provides multiplexing between a logical channel and a transmission channel and allocation of radio resources to the UE 2620, and takes charge of signaling to the UE. The transmit (TX) processor 2612 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 2616 via individual Tx/Rx modules (or transceivers, 2615). Each Tx/Rx module may modulate an RF carrier into each spatial stream for transmission. In the UE, each Tx/Rx module (or transceiver, 2625) receives a signal through each antenna 2611 of each Tx/Rx module. Each Tx/Rx module reconstructs information modulated with the RF carrier and provides the reconstructed information to the receive (RX) processor 2623. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 2621.

UL (communication from the UE to the eNB) is processed by the eNB 2610 in a scheme similar to a scheme described in association with a receiver function in the UE 2620. Each Tx/Rx module 2625 receives the signal through each antenna 2611. Each Tx/Rx module provides the RF carrier and information to the RX processor 2623. The processor 2621 may be associated with the memory 2624 storing a program code and data. The memory may be referred to as a computer readable medium.

In the present disclosure, a wireless device may be the eNB, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, an MTC device, an IoT device, a medical device, a pin-tec device (or financial device), a security device, a climate/environmental device, or other devices related to fourth industrial revolution fields or 5G services. For example, the UAV may be a flying object that is not ridden by people but that flies by radio control signals. For example, the MTC device and the IoT device as devices that do not require direct human intervention or manipulation may include a smart meter, a vending machine, a thermometer, a smart bulb, a door lock, or various sensors. For example, the medical device as a device used for the purpose of diagnosis, treatment, alleviation, therapy, or prevention of a disease or a device used for the purpose of inspecting, replacing, or modifying a structure or function may include a treatment equipment, a surgical device, an (in vitro) diagnostic device, a hearing aid, a procedure device, etc. For example, the security device as a device installed to prevent a risk that may occur and to maintain safety may include a camera, a CCTV, a black box, etc. For example, the pin-tec device as a device capable of providing financial services such as mobile payment may include a payment device, a point of sales (POS), etc. For example, the climate/environmental device may mean a device for monitoring or predicting a climate/environment.

In the present disclosure, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD as a head-worn type display device may be used to implement the VR or AR.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the disclosure has been shown and described in connection with examples applied to 3GPP LTE/LTE-A/NR systems, the disclosure may also be applicable to other various wireless communication systems than 3GPP LTE/LTE-A/NR systems.

The invention claimed is:

1. A method for receiving, by a user equipment (UE), multiple transport blocks in a wireless communication system supporting a narrow band-Internet of things (NB-IoT), the method comprising:
    receiving, from a base station, configuration information transmitted via a single cell-multicast control channel (SC-MCCH);
    receiving, from the base station, Downlink Control Information (DCI); and
    receiving multiple transport blocks based on the DCI,
    wherein the configuration information includes a configuration of each single cell-traffic channel (SC-MTCH) related to scheduling of the multiple transport blocks.

2. The method of claim 1, wherein the DCI includes information for a number of the multiple transport blocks.

3. The method of claim 2,
    wherein a cyclic redundancy check (CRC) of the DCI is scrambled with group-radio network temporary identifier (G-RNTI).

4. The method of claim 2,
    wherein a number of transport blocks scheduled for the SC-MTCH is indicated based on the information for the number of the multiple transport blocks.

5. The method of claim 2,
    wherein the maximum number of the multiple transport blocks is pre-defined.

6. The method of claim 1,
wherein the multiple transport blocks are received via narrow band physical shared channel (NPDSCH).

7. The method of claim 1,
wherein the configuration information further includes information indicating a scheduling gap between transport blocks.

8. The method of claim 7,
wherein a scheduling gap between two consecutively transmitted transport blocks among the multiple transport blocks is configured based on the information indicating the scheduling gap.

9. The method of claim 8,
wherein a number of subframes between a first transport block and a second transport block is indicated as a scheduling gap based on the information indicating the scheduling gap.

10. The method of claim 9,
wherein the scheduling gap is a duration from a last subframe at which a NPDSCH including the first transport block is transmitted to a first subframe at which a transmission of a NPDSCH including the second transport block starts.

11. The method of claim 1,
wherein the configuration information is related to single cell-point to multipoint (SC-PTM).

12. A user equipment (UE) receiving multiple transport blocks in a wireless communication system supporting a narrow band-Internet of things (NB-IoT), the UE comprising:
a transceiver for transmitting and receiving a radio signal; and
a processor functionally connected to the transceiver,
wherein the processor is configured to:
receive, from a base station, configuration information transmitted via a single cell-multicast control channel (SC-MCCH),
receive, from the base station, Downlink Control Information (DCI), and
receive multiple transport blocks based on the DCI, and
wherein the configuration information includes a configuration of each single cell-traffic channel (SC-MTCH) related to scheduling of the multiple transport blocks.

13. The UE of claim 12, wherein the DCI includes information for a number of the multiple transport blocks.

14. The UE of claim 13,
wherein a cyclic redundancy check (CRC) of the DCI is scrambled with group-radio network temporary identifier (G-RNTI).

15. The UE of claim 12,
wherein the configuration information further includes information indicating a scheduling gap between transport blocks.

16. A method transmitting, by a base station, multiple transport blocks in a wireless communication system supporting a narrow band-Internet of things (NB-IoT), the method comprising:
transmitting, to a user equipment(UE), configuration information transmitted via a single cell-multicast control channel (SC-MCCH);
transmitting, to the UE, Downlink Control Information (DCI); and
transmitting multiple transport blocks based on the DCI to the UE,
wherein the configuration information includes a configuration of each single cell-traffic channel (SC-MTCH) related to scheduling of the multiple transport blocks.

17. The method of claim 16, wherein the DCI includes information for a number of the multiple transport blocks.

18. The method of claim 17,
wherein a cyclic redundancy check (CRC) of the DCI is scrambled with group-radio network temporary identifier (G-RNTI).

19. The method of claim 16,
wherein the configuration information further includes information indicating a scheduling gap between transport blocks.

20. The method of claim 19,
wherein a scheduling gap between two consecutively transmitted transport blocks among the multiple transport blocks is configured based on the information indicating the scheduling gap.

* * * * *